United States Patent
Leichti et al.

(10) Patent No.: US 12,163,301 B2
(45) Date of Patent: Dec. 10, 2024

(54) COMPOSITE SEA WALL SYSTEM

(71) Applicant: Simpson Strong-Tie Company, Inc., Pleasanton, CA (US)

(72) Inventors: Robert Leichti, San Ramon, CA (US); Gueary Andrew Brigham, Jr., Hendersonville, TN (US); Brad Erickson, Campbell, CA (US); Clarence Lee Lampley, III, Pleasanton, CA (US); Carl Scheffel, Pleasanton, CA (US); Heidy Braverman, San Francisco, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 15/922,589

(22) Filed: Mar. 15, 2018

(65) Prior Publication Data
US 2018/0266065 A1    Sep. 20, 2018

Related U.S. Application Data

(60) Provisional application No. 62/523,102, filed on Jun. 21, 2017, provisional application No. 62/471,866, filed on Mar. 15, 2017.

(51) Int. Cl.
*E02B 3/06* (2006.01)
*E02D 5/03* (2006.01)
(Continued)

(52) U.S. Cl.
CPC ............ *E02B 3/06* (2013.01); *E02D 5/03* (2013.01); *E02D 31/02* (2013.01); *F16B 5/02* (2013.01);
(Continued)

(58) Field of Classification Search
CPC .... E02B 3/06; E02D 5/03; E02D 5/02; E02D 29/02; F16B 5/065; F16B 33/008; F16B 33/006
(Continued)

(56) References Cited

U.S. PATENT DOCUMENTS 3,889,320 A * 6/1975 Koscik ................. F16B 21/088
24/297
4,019,301 A    4/1977 Fox
(Continued)

FOREIGN PATENT DOCUMENTS

CA    2567322    *  5/2007
EP    2025954 A1    2/2009
(Continued)

OTHER PUBLICATIONS

International Search Report and the Written Opinion dated Jun. 13, 2018, in International Patent Application No. PCT/US2018/022719 filed Mar. 15, 2018.

*Primary Examiner* — Sean D Andrish
(74) *Attorney, Agent, or Firm* — Vierra Magen Marcus LLP

(57) ABSTRACT

A marine environment wall protection system, comprises a composite panel having a similar shape to a steel wall to which the composite panel is configured to be attached; at least one non-corroding mechanical fastener having a first portion configured to be disposed in the steel wall, the first portion configured to receive a second portion, the non-corroding mechanical fastener configured to provide a space between the composite panel and the steel wall; and a sealant positioned between the composite panel and the steel wall.

12 Claims, 57 Drawing Sheets

(51) Int. Cl.
- *E02D 31/02* (2006.01)
- *F16B 5/02* (2006.01)
- *F16B 33/00* (2006.01)
- *F16B 37/14* (2006.01)
- *F16B 25/00* (2006.01)
- *F16B 25/10* (2006.01)

(52) U.S. Cl.
CPC .......... *F16B 33/004* (2013.01); *F16B 33/006* (2013.01); *F16B 33/008* (2013.01); *F16B 37/14* (2013.01); *F16B 25/0031* (2013.01); *F16B 25/106* (2013.01)

(58) Field of Classification Search
USPC .................................. 405/274, 276; 411/482
See application file for complete search history.

(56) References Cited

U.S. PATENT DOCUMENTS

| | | | | |
|---|---|---|---|---|
| 4,546,015 | A | | 10/1985 | Lovell |
| 5,380,131 | A | | 1/1995 | Crawford |
| 5,651,634 | A | * | 7/1997 | Kraus ................... F16B 5/0628 D8/382 |
| 7,481,474 | B2 | * | 1/2009 | Higgins ................ F16B 21/086 24/297 |
| 7,549,830 | B2 | * | 6/2009 | Cooley ................. F16B 21/086 24/297 |
| 7,966,711 | B2 | * | 6/2011 | Keener ................. B29C 65/562 29/458 |
| 2006/0099051 | A1 | * | 5/2006 | Moerke ................. F16B 19/008 411/508 |
| 2013/0129450 | A1 | * | 5/2013 | Aoki ....................... B29C 45/03 411/509 |
| 2013/0164099 | A1 | * | 6/2013 | Rosemann ............ F16B 21/086 411/508 |
| 2015/0239199 | A1 | | 8/2015 | Weber |

FOREIGN PATENT DOCUMENTS

| | | |
|---|---|---|
| GB | 2161886 A | 1/1986 |
| JP | 57155437 A | 9/1982 |
| JP | S58-127838 | 7/1983 |
| JP | 58176324 A | 10/1983 |
| JP | 60008058 A | 1/1985 |
| JP | 60246930 A | 12/1985 |
| JP | 62099520 A | 5/1987 |
| JP | 02205691 A | 8/1990 |
| JP | 02221513 A | 9/1990 |
| JP | 03290516 A | 12/1991 |
| JP | 04336113 A | 11/1992 |
| JP | 04364930 A | 12/1992 |
| JP | 2007113230 A | 5/2007 |
| JP | 2008280593 A | 11/2008 |
| WO | 90/09488 | 8/1990 |

* cited by examiner

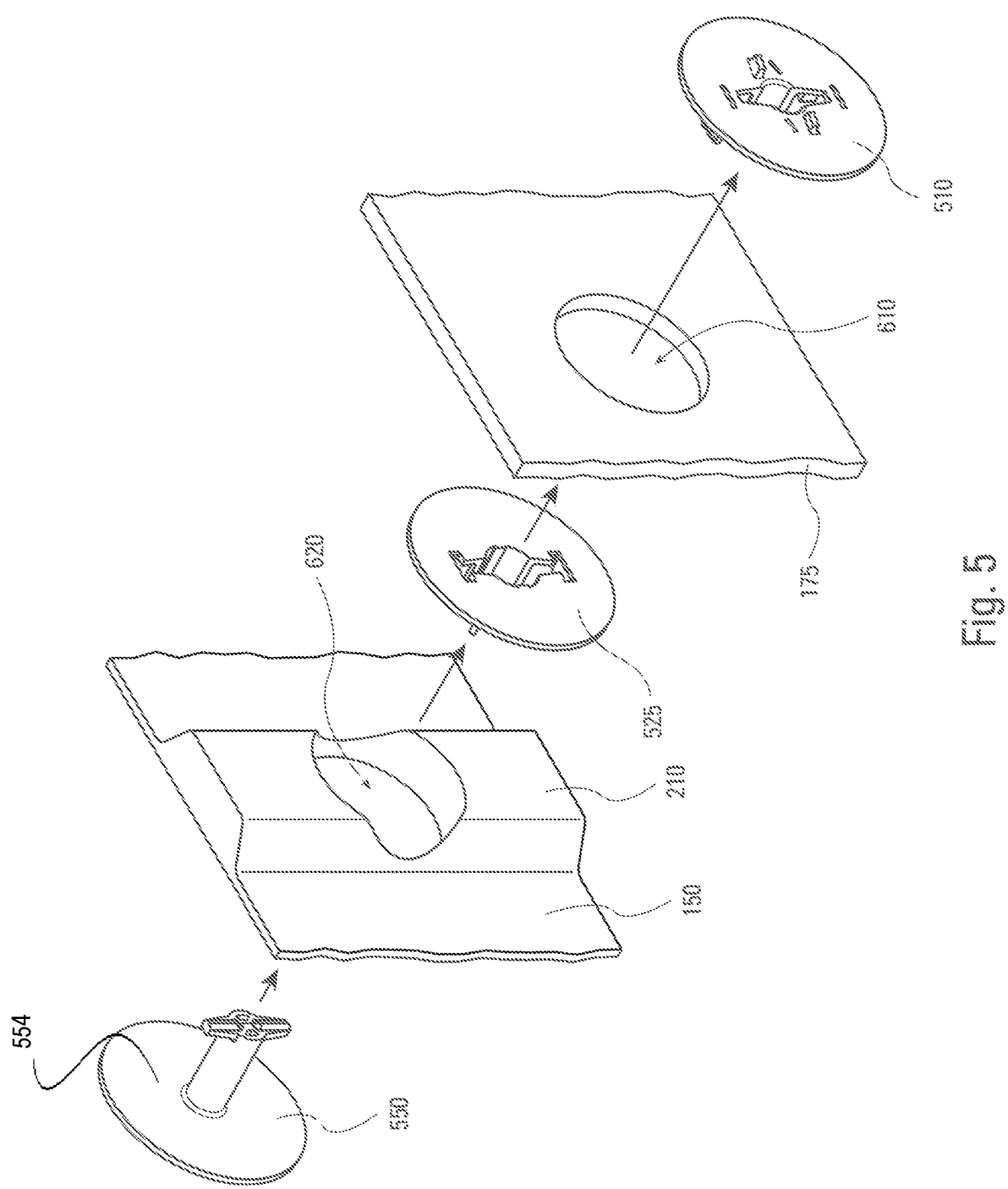

COMPOSITE SEA WALL SYSTEM

CLAIM OF PRIORITY

This application claims the benefit of priority to U.S. Provisional Application No. 62/471,866, filed Mar. 15, 2017 and U.S. Provisional Application No. 62/523,102, filed Jun. 21, 2017, both of which are incorporated herein by reference in their entirety.

BACKGROUND

Steel sheet walls are often used in marine environments to hold back the soil or land to keep it from eroding into the sea. Steel sheet piles are formed in sections and embedded into the sea floor, and connected to each other with an interlocking edge to create a continuous wall between soil and water. Steel sheet piling will corrode in water. While some systems exist for using a corrosion resistant panel to cover the steel, the assembly of such systems is difficult.

SUMMARY

A marine environment wall protection system, comprises a composite panel having a similar shape to a steel wall to which the composite panel is configured to be attached; at least one non-corroding mechanical fastener having a first portion configured to be disposed in the steel wall, the first portion configured to receive a second portion, the non-corroding mechanical fastener configured to provide a space between the composite panel and the steel wall; and a sealant positioned between the composite panel and the steel wall.

Various embodiments of the fasteners are provided. Methods of installing the marine environment protection system are included herein.

One general aspect includes a marine environment wall protection system, including: a composite panel having a similar shape to a steel wall to which the composite panel is configured to be attached. The marine environment wall protection system also includes a sealant material positioned between the composite panel and the steel wall. The marine environment wall protection system also includes at least one non-corroding mechanical fastener having a shaft disposed through the steel wall and the composite panel, the shaft adapted to secure the composite panel to the steel wall and to provide a space between the composite panel and the steel wall.

Implementations may include one or more of the following features. The system where the at least one non-corroding mechanical fastener has the shaft integrally formed with a head, the head and shaft integrally formed from a plastic material. The system where the at least one non-corroding mechanical fastener is formed from one of liquid-crystal polymers, glass filled nylon, polysulfone (PSU), polyethersulfone (PES) or polyether ether ketone (PEEK) thermoplastic polymer. The system where the at least one non-corroding mechanical fastener has the shaft is configured to secure the composite panel to the steel wall during installation of the sealant material between the steel wall and the composite panel. The system where the at least one non-corroding mechanical fastener has a first portion of a shaft and a second portion of the shaft, the first portion separated from the second portion by a retaining collar. The system where the shaft of the at least one non-corroding mechanical fastener includes a first spring lever arm and a second spring lever arm, each arm adapted to be positioned on an opposing side of the steel wall as the shaft is secured in the steel wall. The system where the system includes a plurality of non-corroding mechanical fasteners. The system where the composite panel is included of a plurality of interlocking composite panel assemblies. The system where each composite panel assembly has a first edge forming a tongue and a second edge forming a groove, each assembly connecting to an adjacent assembly by insertion of a respective tongue of one assembly into a groove of an adjacent panel. The system where the at least one non-corroding mechanical fastener shaft a shaft integrally formed with a head, the head and shaft integrally formed from a plastic material, the head including a bore passing therethrough, the bore adapted to receive a non-corroding screw. The system where the head includes a recess connected to the bore, the recess receiving a cap covering the screw. The system further including an underwater sealant provided in the recess and under the cap. The system where the sealant material is a cementous grout or epoxy.

One general aspect includes a fastener for a marine environment wall protection system, including: a head having a diameter. The fastener also includes a shaft integrally formed with the head with a diameter smaller than the diameter of the head, the head and shaft integrally formed from one of liquid-crystal polymers, glass filled nylon, polysulfone (psu), polyethersulfone (pes) or polyether ether ketone (peek) thermoplastic polymer, the shaft adapted to be disposed through a steel wall to secure a composite panel to the steel wall and to provide a space between the composite panel and the steel wall, the fastener configured to secure the composite panel to the steel wall during installation of a sealant material between the steel wall and the composite panel. Other embodiments of this aspect include corresponding computer systems, apparatus, and computer programs recorded on one or more computer storage devices, each configured to perform the actions of the methods.

Implementations may include one or more of the following features. The fastener where the at least one non-corroding mechanical fastener has a first portion of a shaft and a second portion of the shaft, the first portion separated from the second portion by a retaining collar. The fastener where the at least one non-corroding mechanical fastener shaft includes a first spring lever arm and a second spring lever arm, each arm adapted to be positioned on an opposing side of the steel wall as the shaft is secured in the steel wall. The fastener where the at least one non-corroding mechanical fastener shaft a shaft integrally formed with the head, the head and shaft integrally formed from a plastic material, the head including a bore passing therethrough, the bore adapted to receive a non-corroding screw. The fastener where the head includes a recess connected to the bore, the recess receiving a cap covering the screw. The fastener further including an underwater sealant provided in the recess and under the cap.

One general aspect includes a marine environment wall protection system, including: a plurality of composite panels having a similar shape to a steel wall to which the composite panels are configured to be attached. The marine environment wall protection system also includes a sealant material positioned between the composite panels and the steel wall. The marine environment wall protection system also includes a plurality of non-corroding mechanical fasteners, each of the plurality of fasteners having a shaft disposed through one of the plurality of composite panels and the steel wall to secure the at least one of the plurality of composite panels to the steel wall and to provide a space between the at least one of the plurality of composite panels and the steel wall, each of the plurality of fasteners having the shaft integrally formed with a head of the fastener, the head and shaft integrally formed from injection molding one of liquid-crystal polymers, glass filled nylon, polysulfone (PSU), polyethersulfone (PES) or polyether ether ketone (PEEK) thermoplastic polymer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5 and 5A are perspective views from the earthen material side of the steel wall 175.

DETAILED DESCRIPTION

The technology is directed to a seawall system that comprises a steel sheet piling wall upon which is provided a composite panel and either a cementitious grout or epoxy 120 or epoxy therein between. This reduces the corrosion of the steel by preventing oxygen and water flow to the steel. The installation of these panels will eliminate costly repairs or even replacement of the sheet wall. The protection system prolongs the life of the seawall by reducing erosion and corrosion. The composite panel may be formed of fiberglass or a composite material.

The composite panel is molded to fit the profile of the steel seawall, a grout that fills the space between the jacket and the steel wall, and a fastener, multiple embodiments of which are illustrated herein, is used to hold the jacket in place during construction and during the life of the protection system. The fasteners developed for this system comprise an injection-molded fasteners that are pressed through pre-drilled holes in both the sheet pile and a fiberglass reinforced plastic (FRP) panel. In one embodiment, a self-tapping steel fastener is used. The principal function of the fastener is to hold the FRP jacket in position during construction and to maintain assembly integrity during the life of the assembly.

In multiple embodiments, the fastener material is a glass-filled polymer, and the fastener is made by injection molding. Forming the fastener out of a polymer prevents corrosion and allows the fastener to be formed specific to the application. The fastener may comprise a single part or multiple parts that fit in the steel seawall. In some embodiments, the fastener is designed with a large head, and integral retaining ring so that it is easily installed by pushing it through predrilled holes in the jacket and the steel sheet pile. All embodiments are is designed to position and hold the composite panel in an optimal spacing relative to the steel wall. Embodiments of the fastener were evaluated by finite-element analysis to estimate the pull-out capacity and shear capacity as well as physical laboratory tests. Subsequent FEA analyses were calibrated to physical tests so that the computed pull-out and shear nearly approximate the physical results.

In various embodiments, alignment of holes in the jacket and the steel sheet pile improves to fastener performance.

In another embodiment, a method of repair utilizes a composite panel contoured to a corrugated surface of a steel seawall, then fastened to the seawall and back-filled with grout. Once the panels are mounted on the seawall and the seams are sealed, epoxy and cementitious grout is pumped into the gap between the seawall and composite panel. The grout system will bond the composite panel to the steel seawall.

Figure 1:
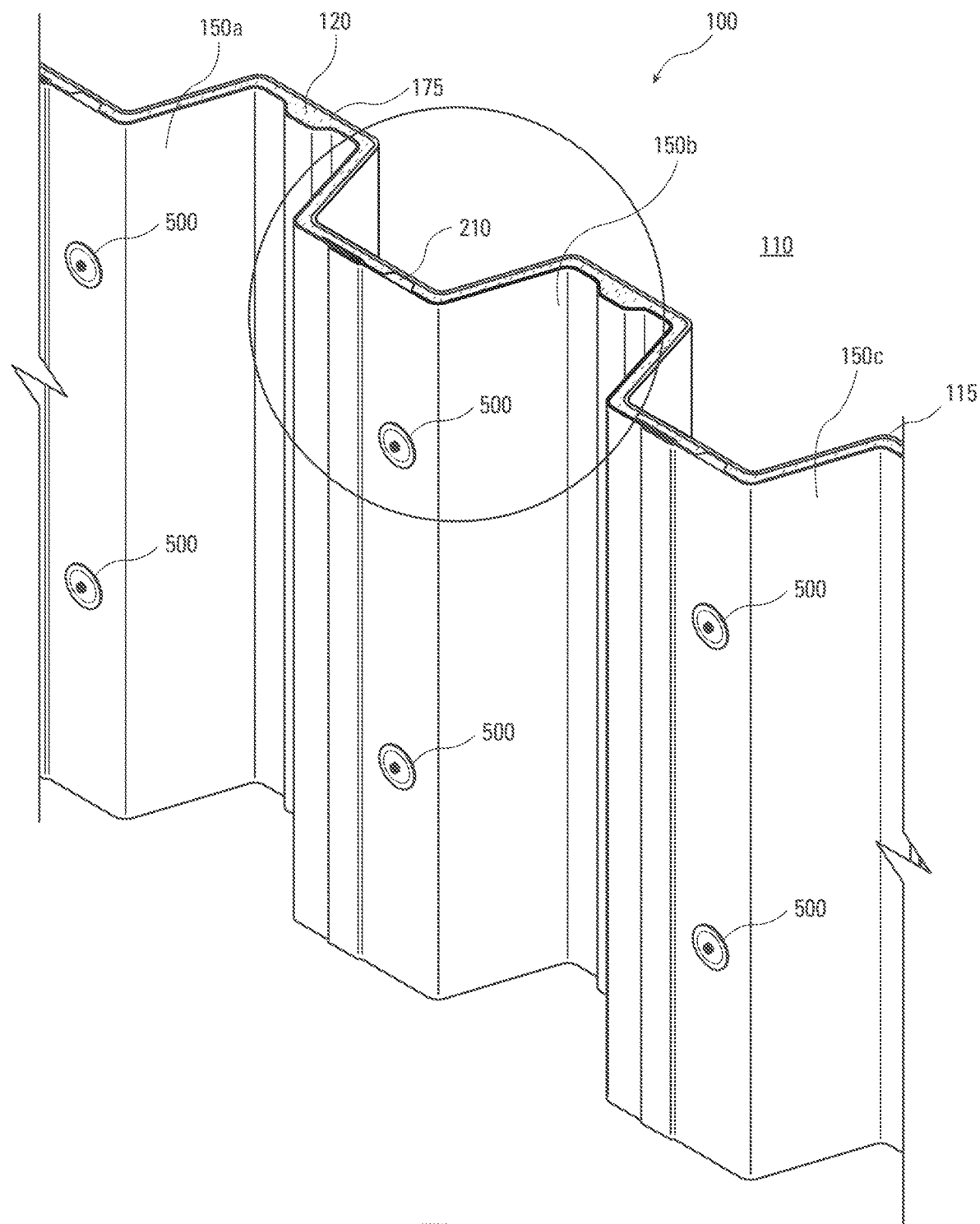
FIG. 1 is a perspective view of a seawall assembly.
Figure 2:
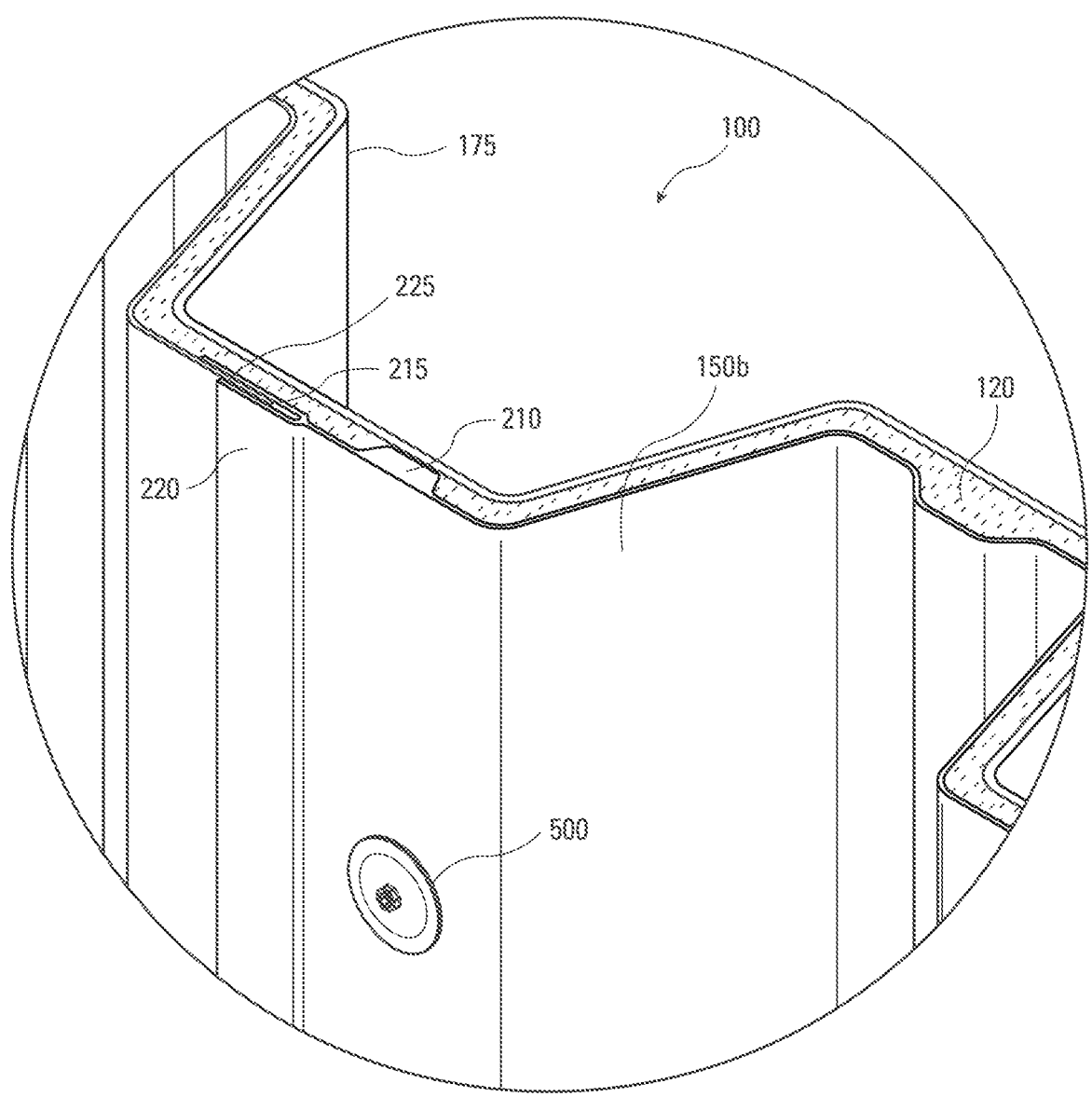
FIG. 2 is an enlarged perspective view of a portion of FIG. 1 as indicted therein.

FIG. 1 is a perspective view of a seawall assembly, and FIG. 2, an enlarged perspective view of a portion of FIG. 1 as indicted therein. The seawall assembly 100 includes a steel wall 175, composite panel 150, fasteners 500 securing the composite panel 150 to the steel wall, and grout or epoxy 120 disposed in a space 115 between the steel wall 175 and the composite panel 150. In one embodiment, the composite panel has a generally corrugated shape.

Referring to FIG. 1, a seawall system 100 comprises a steel sheet metal wall 175 holding back a soil or earthen material 110. A protective composite panel 150 (which may be comprised of a series of panels 150a, 150b . . . ) is secured over the steel wall 175 to protect against corrosion. If the metal wall 175 is already corroded, the corroded steel wall 175 must be cleaned to remove major corrosion, such as by use of high pressure water blasting or mechanical methods to remove the marine growth and existing corrosion.

Between the protective composite panel 150 and the steel wall 175 is a layer of cementitious grout or epoxy 120. In one embodiment, the grout or epoxy 120 is a high-strength, non-metallic, non-segregating grout or epoxy 120 designed with special anti-washout admixtures, corrosion inhibitors and polymers which can be pumped or tremied underwater to between the piling 175 and panel 150. The grout 120, in one embodiment, comprise FX-225 Non-Shrink Underwater Grout 120 available from Simpson Strong-Tie®, Pleasanton, CA The grout or epoxy 120 is sandwiched between the steel sheet piling 175 and the composite panel(s) 150. The epoxy 120 may comprise model FX-70-6 Marine Epoxy Grout also available from Simpson Strong-Tie®.

The composite panel 150 has one side that is exposed to the marine environment and another side that faces the steel wall 175 and the cementitious grout or epoxy 120 layer disposed between the panel 150 and the wall 175. This panel 150 may be formed of several different materials, but is typically formed of an inert, semi-rigid material. For example, fiberglass or vinyl sheet piles may be used as the protective panel 150. The panel 150 can be molded to fit different styles and types of steel walls 175 depending on the construction of the wall 175 to be protected.

The present technology provides a number of different fastening systems for securing the composite panel 150 the steel wall 175 to allow the cementitious grout or epoxy 120 to be filled between the steel wall 175 and composite panel 150, so that water and oxygen will no longer have contact with the steel wall 175.

As illustrated in FIG. 1, a number of fasteners 500 are placed in various locations to secure the composite panel or panel assembly 150 to the steel wall 175. The composite panel 150 may be made up of several sections of panel assemblies 150a, 150b, etc. which are joined together and secured to the steel wall 175. In one embodiment, the composite panel assembly (multiple sections of panels 105a, 150b, 150c, . . . 150n) may include any number of panels has a generally corrugated shape (viewed in top view) matching the steel wall shape.

Details of the various embodiments of fasteners 500 are provided herein. Placement of the fasteners 500 may be a design choice of the installer of the assembly 100, a designer of the composite panel 150, or may be dependent on the embodiment used. In one embodiment, the fastener assemblies are placed two (2) inches off center with respect to each wall section of the composite panel 150.

As illustrated herein, both the steel wall 175 in the composite panel 150 may be formed into corrugated wall assemblies. It will be understood that various types and shapes of composite and steel walls may be utilized in accordance with the present technology. Steel wall 175 may be a continuous steel wall or may be formed into sections which are welded or otherwise secured to adjacent sections to hold back the earthen material 110. Similarly, the composite panel 150 may comprise a number of panel sections 150a, 150b, etc. which are secured to adjacent panels by mechanical interlock comprising a tongue and groove system formed by a groove formed by walls 215, 220, and an edge portion 225 of an opposing side of the composite panel. A composite panel section 150 is illustrated in further detail in FIGS. 11 through 15.

As illustrated in FIG. 2, fasteners 500 may be placed adjacent to a mechanical interlock between respective individual composite panel portions. As illustrated in FIG. 2, the fasteners are placed through a continuous rib closure 210. Each panel section 150a, 150b has a continuous rib closure 210.

Figure 3:
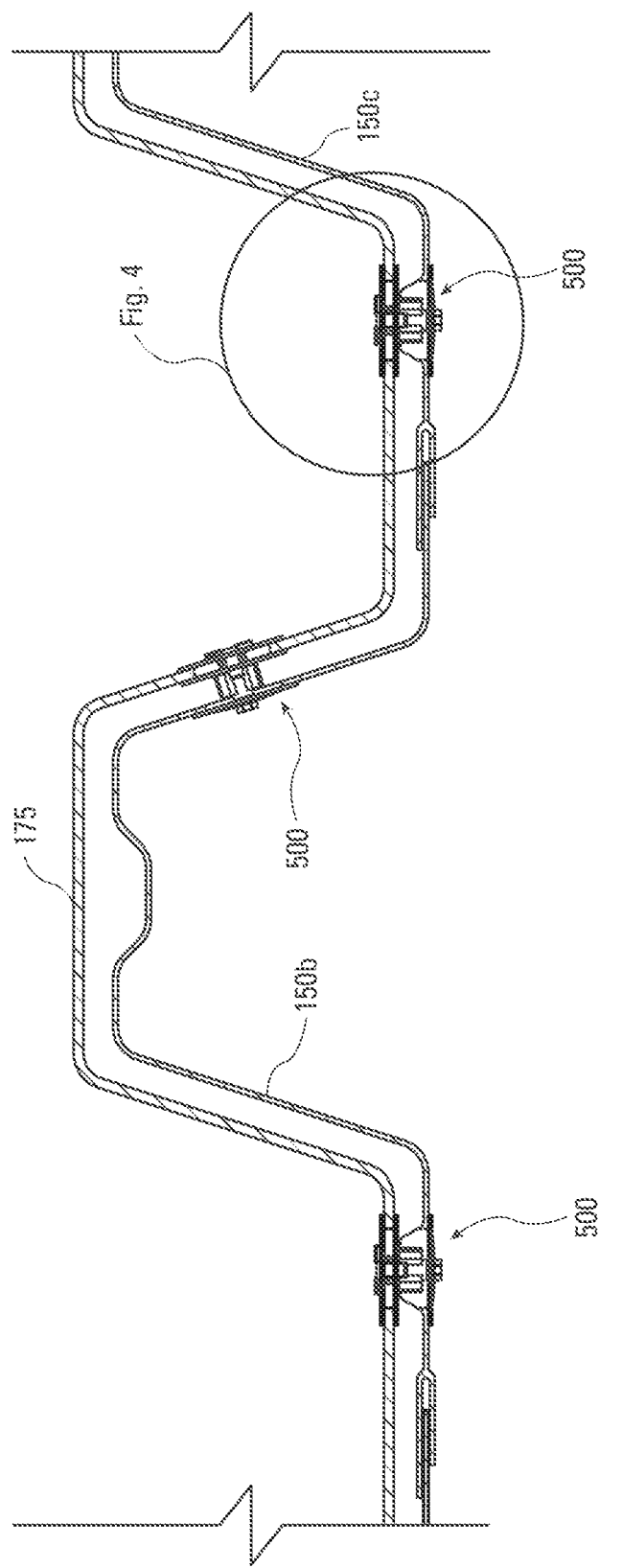
FIG. 3 is a top view of the seawall assembly 100 illustrated in FIGS. 1 and 2.
Figure 4:
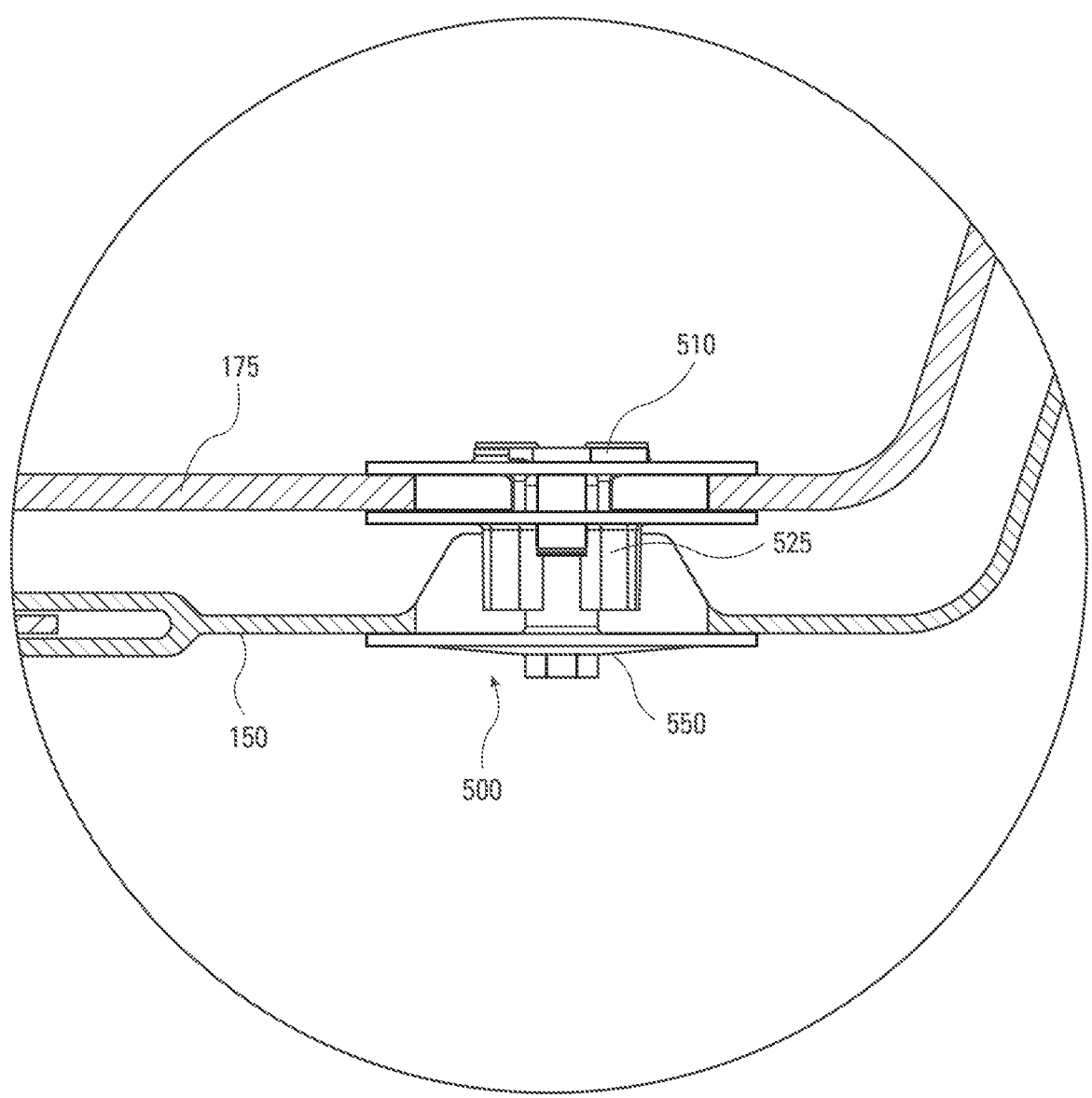
FIG. 4 is an enlarged portion of FIG. 3 illustrating the fastener shown in FIG. 3.

FIG. 3 is a top view of the seawall assembly 100 illustrated in FIGS. 1 and 2. FIG. 4 is an enlarged portion of FIG. 3 illustrating the fastener shown in FIG. 3. As illustrated in FIGS. 3 and 4, a first embodiment of a fastener system includes a bolt element 550, includes a nut element 510, a retaining lock element 525. Additional details of the fastener and its installation into the seawall system 100 is shown and described with respect to FIGS. 6 through 10.

For clarity, the epoxy or grout 120 is removed in the figures illustrating various fastener embodiments.

As illustrated in FIG. 4, the nut element 510 includes a back plate 545, which abuts the earthen bearing side of the steel wall 175. The retaining element likewise includes a plate 520 which abuts the opposing surface (the grout or epoxy 120 side surface) of the steel wall 175 (on one side of the plate 520) and the continuous rib closure 210 on the other side of the plate 520. The bolt element 550 includes a plate 554 which abuts the outer surface of the composite panel 150. As described below, the nut element 510 may be secured to the backside of the steel wall 175 prior to installation of the wall against the earthen surface to be retained. As will be generally understood, a number of nut elements 510 will be secured to the steel wall 175 prior to assembly of the seawall system 100, with the nut elements provided in predrilled boreholes in the steel wall 175.

One retaining element 525 per nut element 510 is used to secure the nut element 510 in place during installation of the steel wall 175. When the composite panel is to be installed over the steel wall 175, the composite panel will be located such that corresponding boreholes in the composite panel are located relative to the boreholes in the steel wall and retaining elements and nut elements installed in the steel wall 175. The bolt element is then passed through a hole in the composite wall 150, the hole aligned with the installed nut element and retaining element, and, using a twist-lock action, the bolt element will be secured in the nut element, thereby securing the composite panel 150 to the steel wall 175.

Figure 5A:
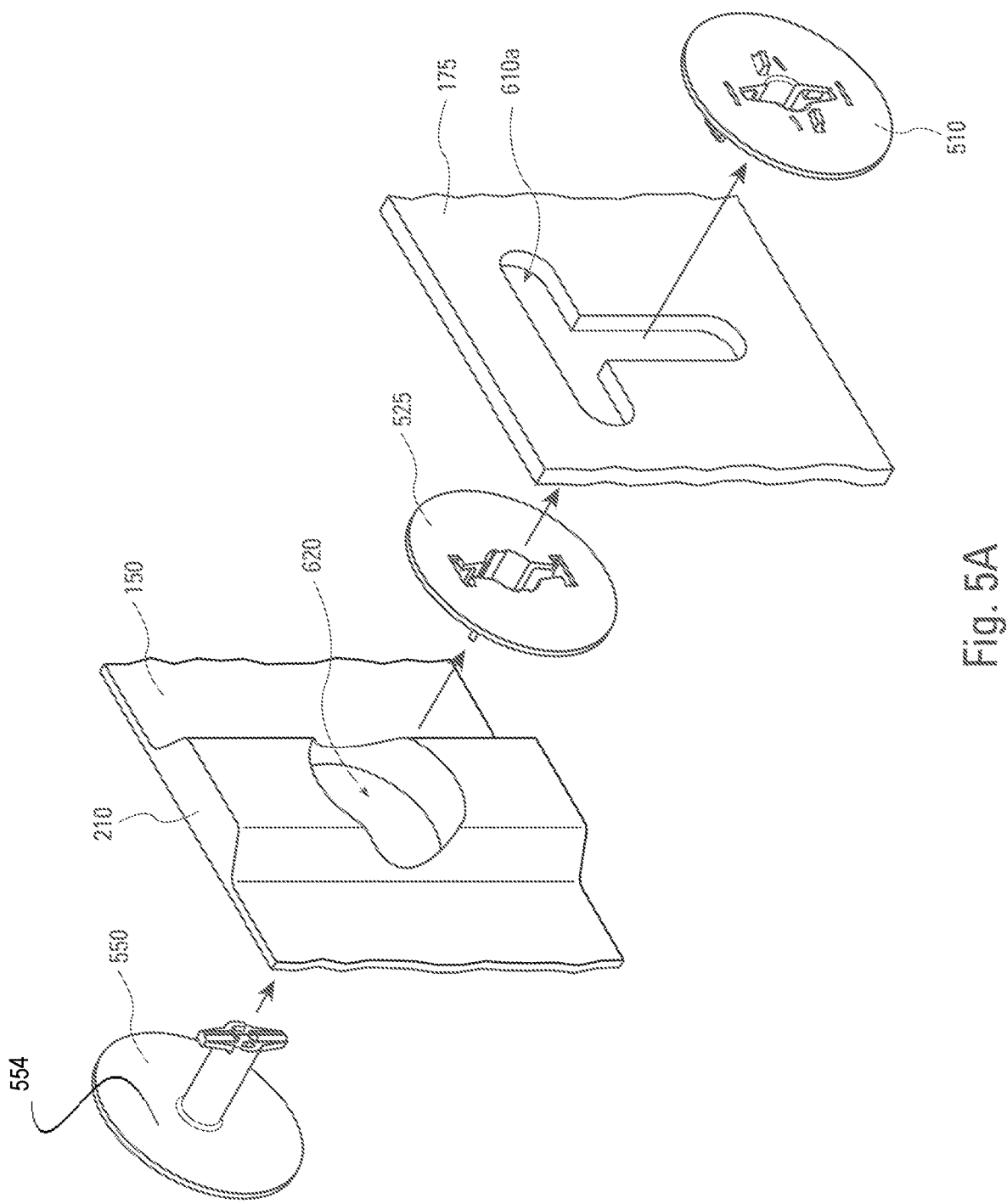
Figure 7:
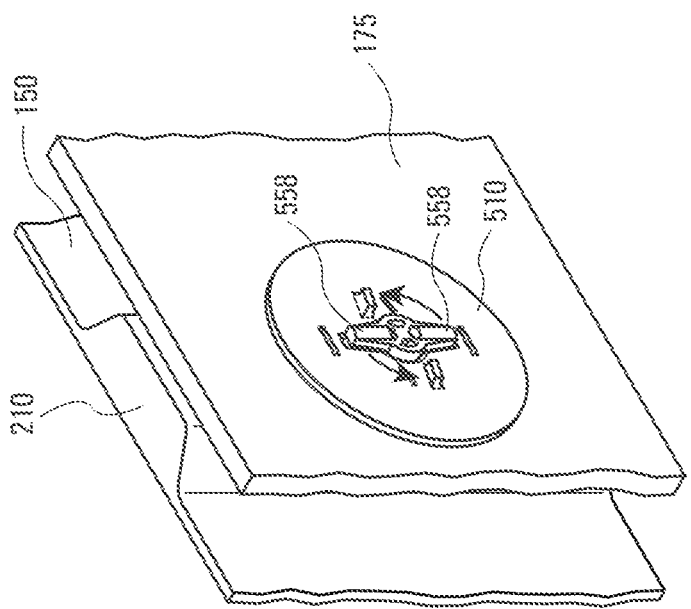
FIGS. 6 and 7 illustrate perspective views of the twist lock assembly from the perspective of the earthen material side of the steel wall.
Figure 6:
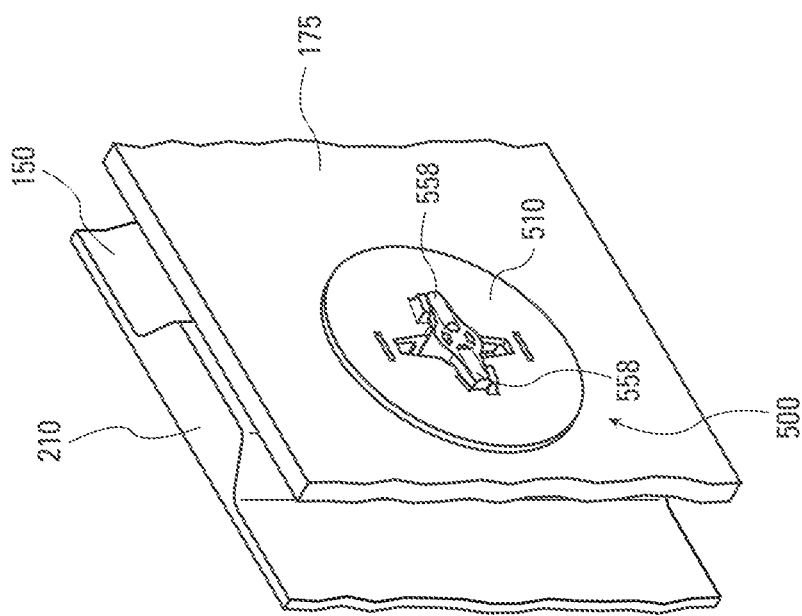
Figure 8:
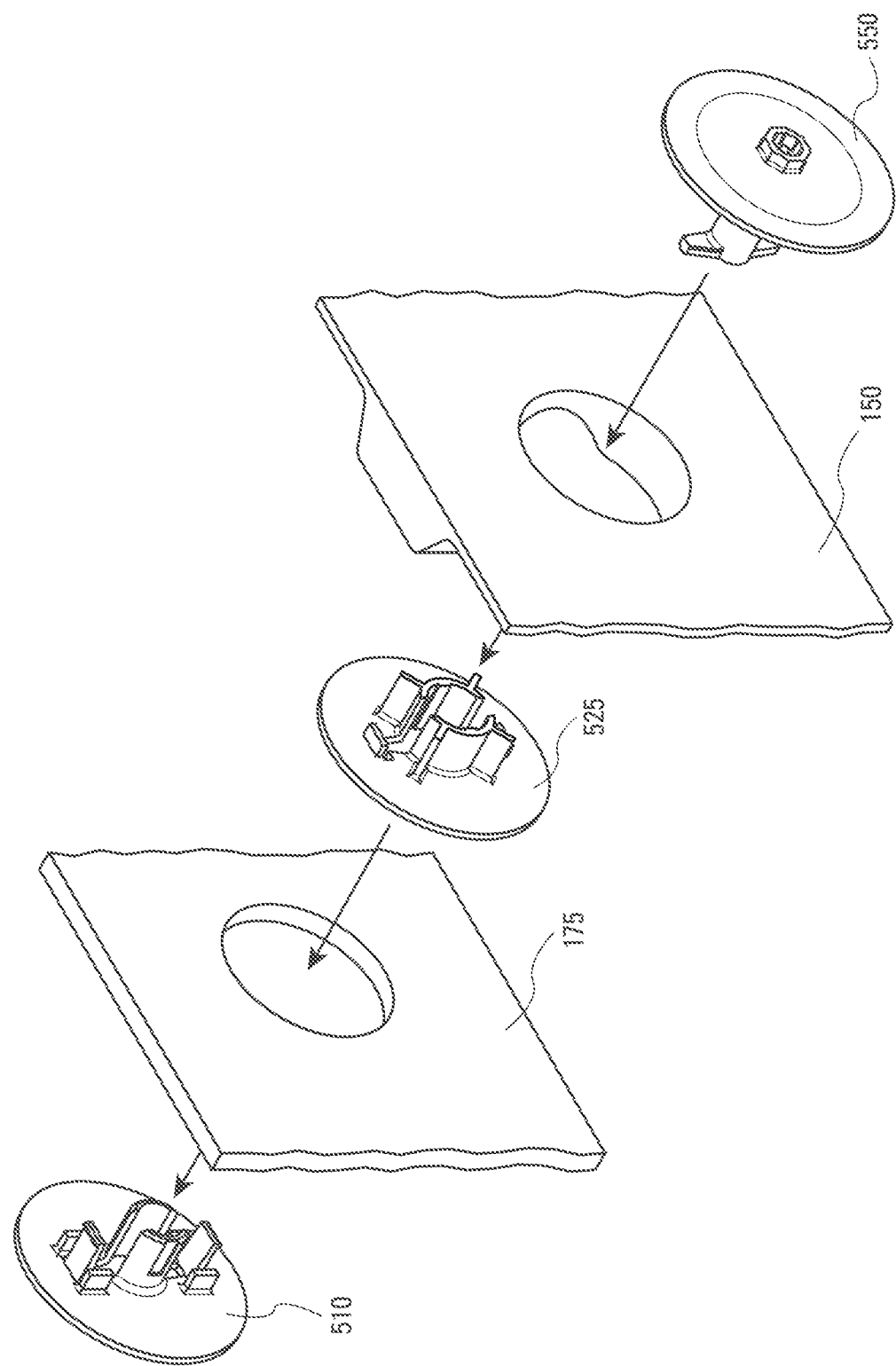
FIGS. 8 and 8A are perspective views from the sea or marine side of the composite panel 150.
Figure 10:
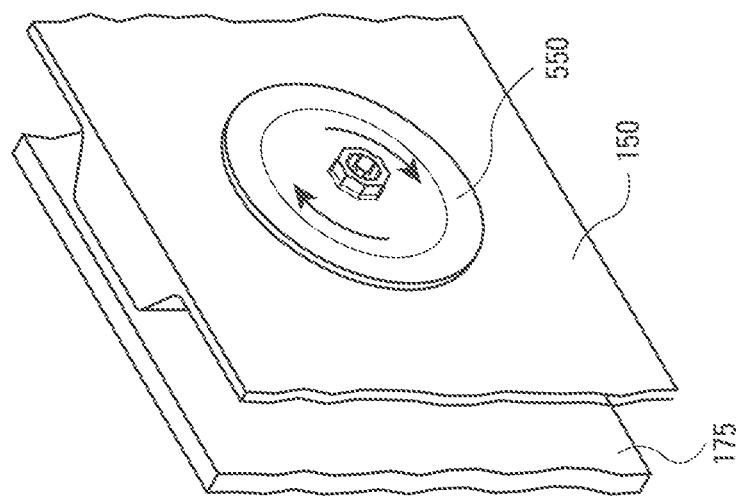
FIGS. 9 and 10 illustrate the twist lock assembly from the perspective of the sea or marine side of the composite panel.
Figure 9:
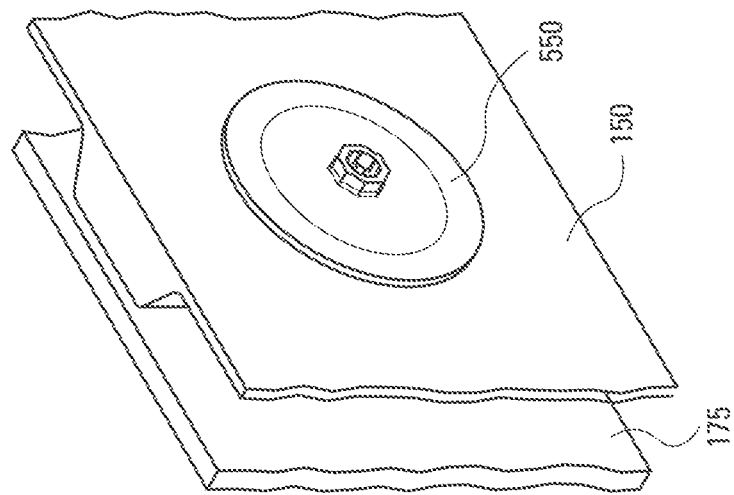

FIGS. 5 through 10 illustrate assembly of the fastener 500 relative to boreholes in the steel wall 175 and the composite panel 150. FIG. 5 is a perspective view from the earthen material side of the steel wall 175, while FIG. 8 is a perspective view from the sea or marine side of the composite panel 150. FIGS. 6 and 7 illustrate perspective views of the twist lock assembly from the perspective of the earthen material side of the steel wall. FIGS. 9 and 10 illustrate the same assembly from the perspective of the sea or marine side of the composite panel.

Figure 8A:
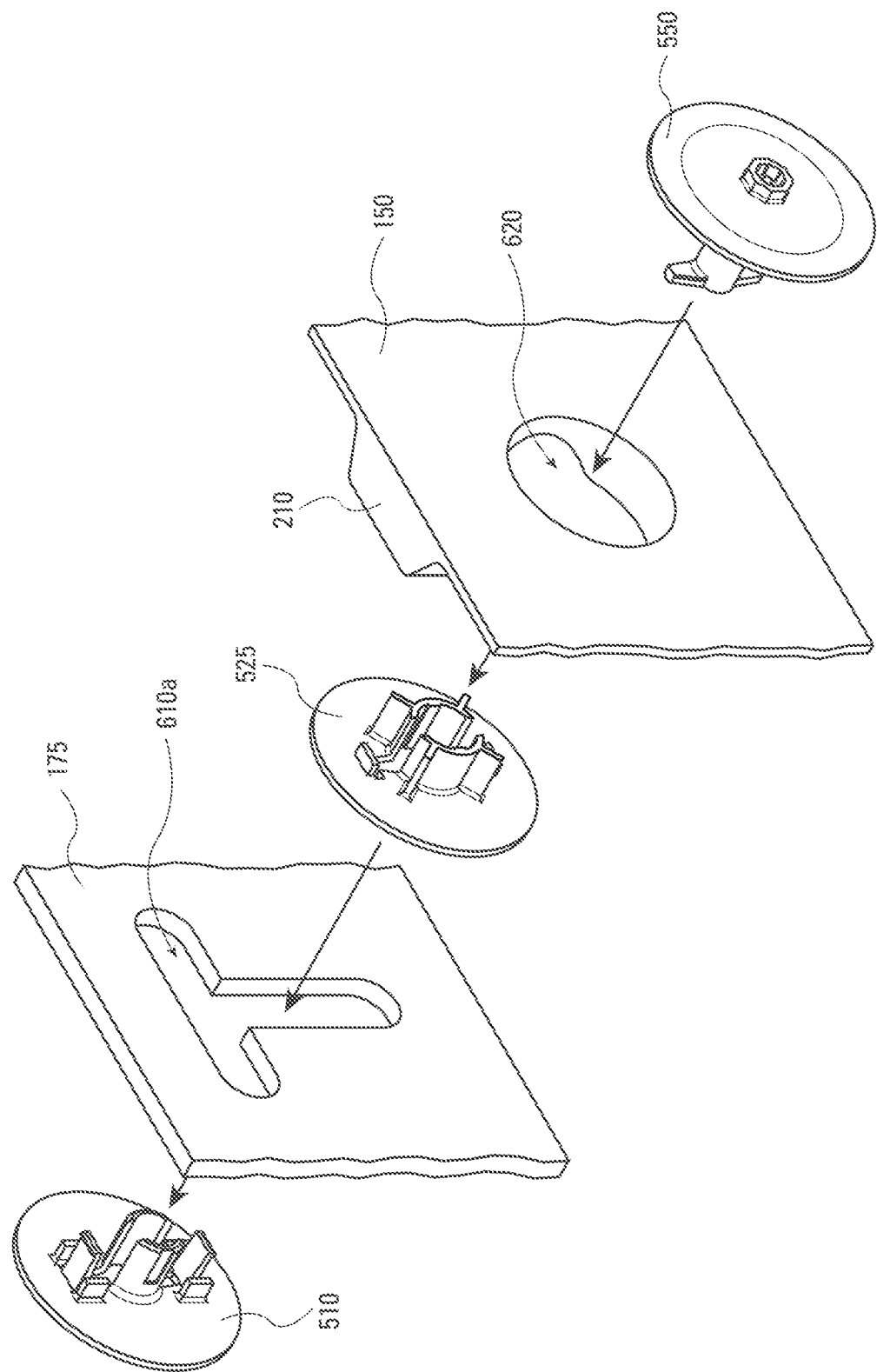

As illustrated in FIGS. 5-10, the nut element 510 will be placed in a borehole 610 in the steel wall 175. The bore hole 610 is large enough to allow the structure of the nut element to pass there through, but smaller than the plate 520 of the nut element. It should be noted that the borehole may be shaped other than round to accommodate installation and retaining the fastener elements. For example, the bore hole may be "T" shaped with the nut element resting in the bottom of the "T" as illustrated in FIGS. 5A and 8A. In some embodiments, the hole in the steel is not be round and is shaped like a key hole (as shown in FIG. 5A) or elliptical so that the round fastener can be inserted through it. Generally, a hole is round if there is back side (earthen wall side) access. The retaining element 525 is positioned on the opposing side of the steel wall and engages the nut element 550 through the bore hole 610 the use of locking tabs 550a, 550b, (further illustrated below with respect to FIGS. 22 through 33), which fit through slots 528a, 528b on the retaining tab to engage locking tabs 526a, 526b. Retaining element 525 thus holds the nut element 510 in place in the steel wall 175, sandwiching the steel wall 175 between the plate 520 and backing plate 545 of the elements while the wall is placed in its position against the earthen material (of after the wall is in place where the composite panel is installed after the steel wall). The composite panel 150 is placed such that a borehole 620 aligns with the borehole 610 and the nut element 550 can be passed through the borehole 620 into engagement with the retaining element 525 and the nut element 510. It should be understood that the borehole 620 may be created (drilled) after placement of the composite panel. Once the bolt element is positioned in the borehole 610 and the shaft 556 and locking wings 558 pass through to the back (earthen material) side of the nut element, the bolt element is rotated so that the locking wings 558 engage locking tabs 562, 564 on the nut element, as illustrated in FIG. 7. This creates a "twist lock" engagement between the bolt element and nut element, securing the composite panel in place.

Figure 11:
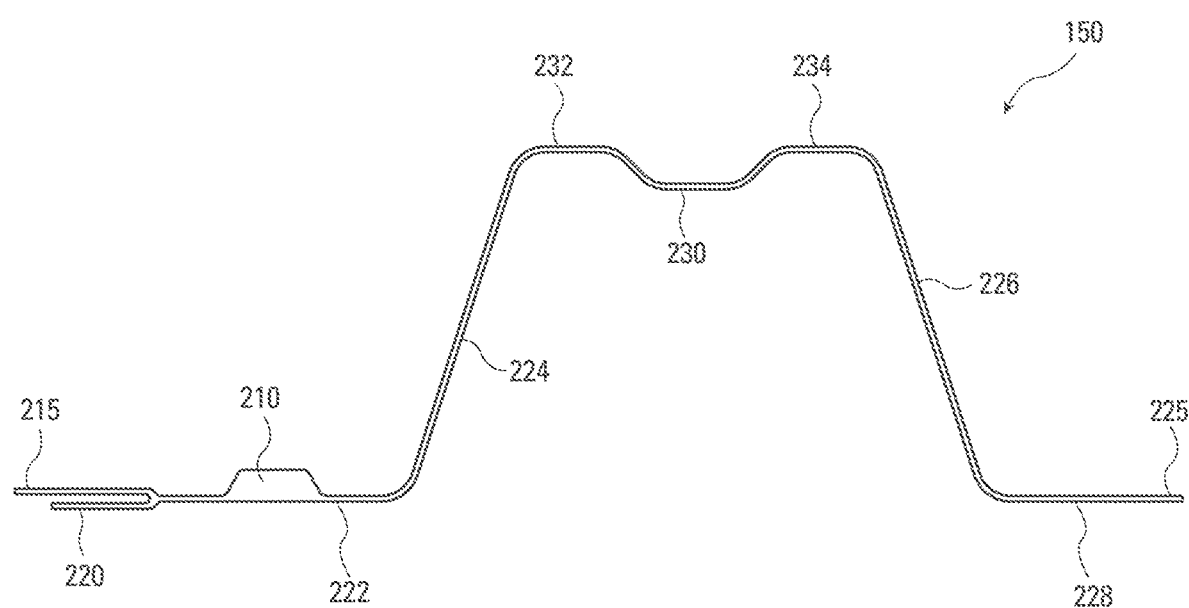
FIG. 11 is a top view a composite panel.
Figures 12, 13:
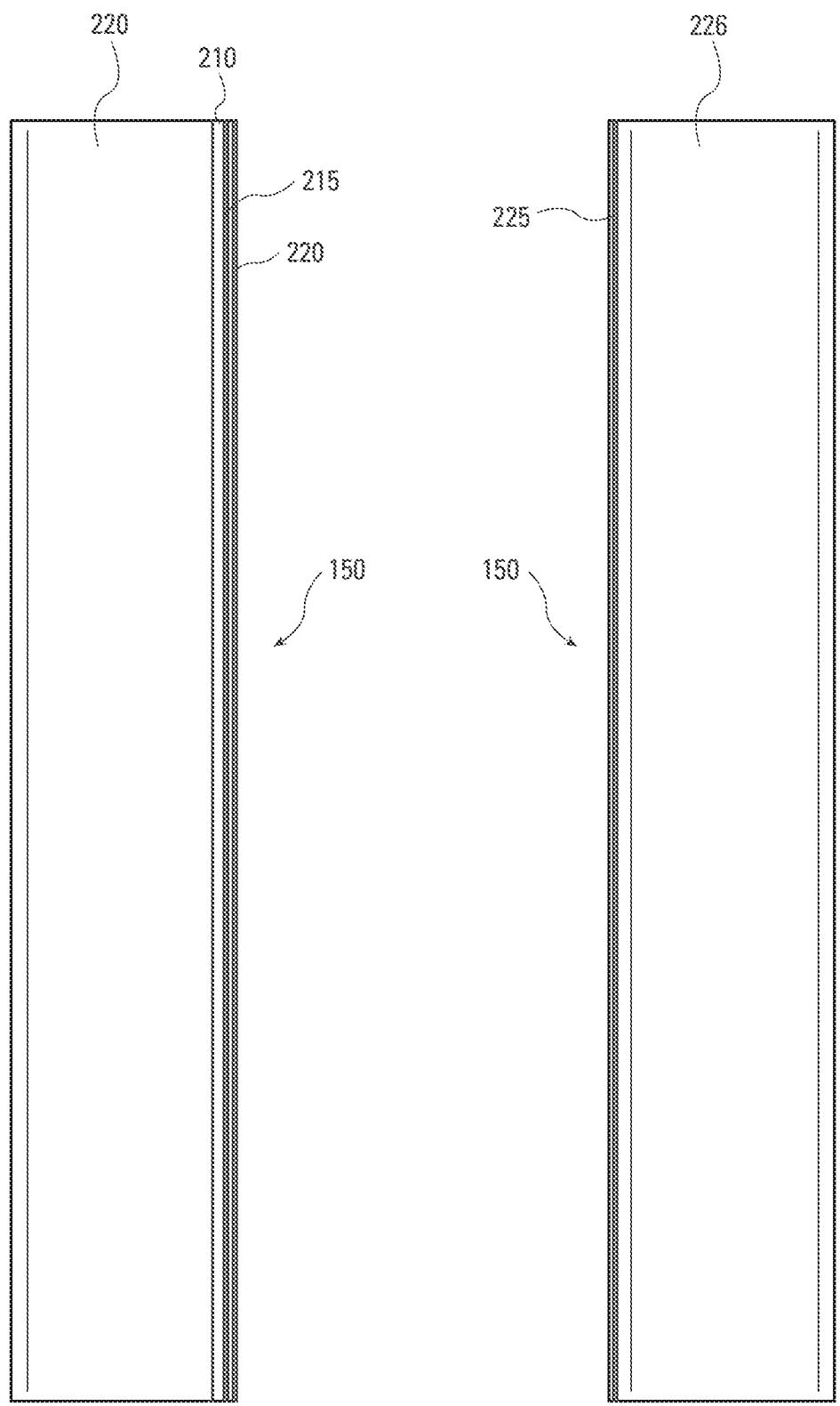
FIGS. 12 and 13 are side views a composite panel.
Figure 14:
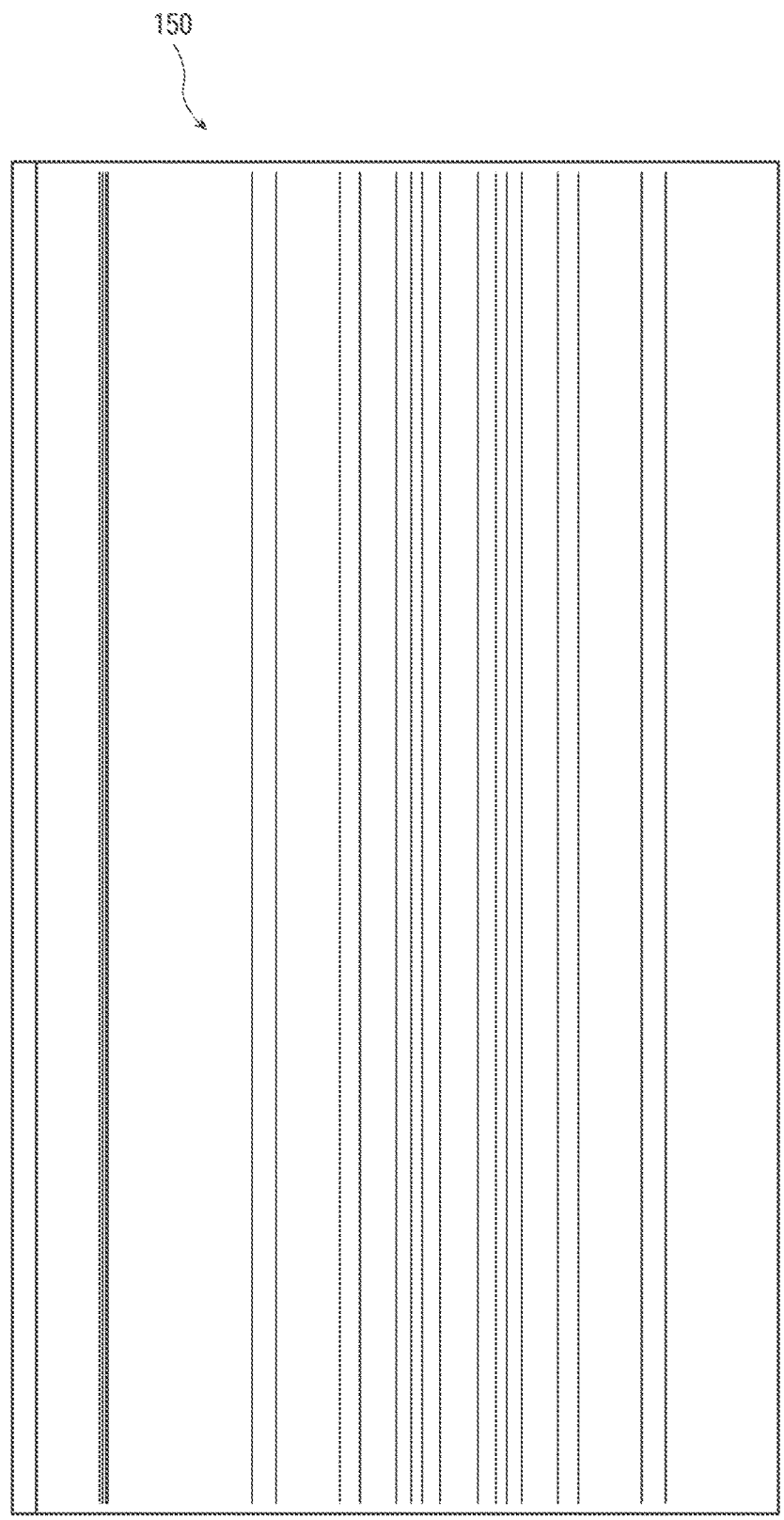
FIGS. 14 and 15 are plan views of a composite panel.
Figure 15:
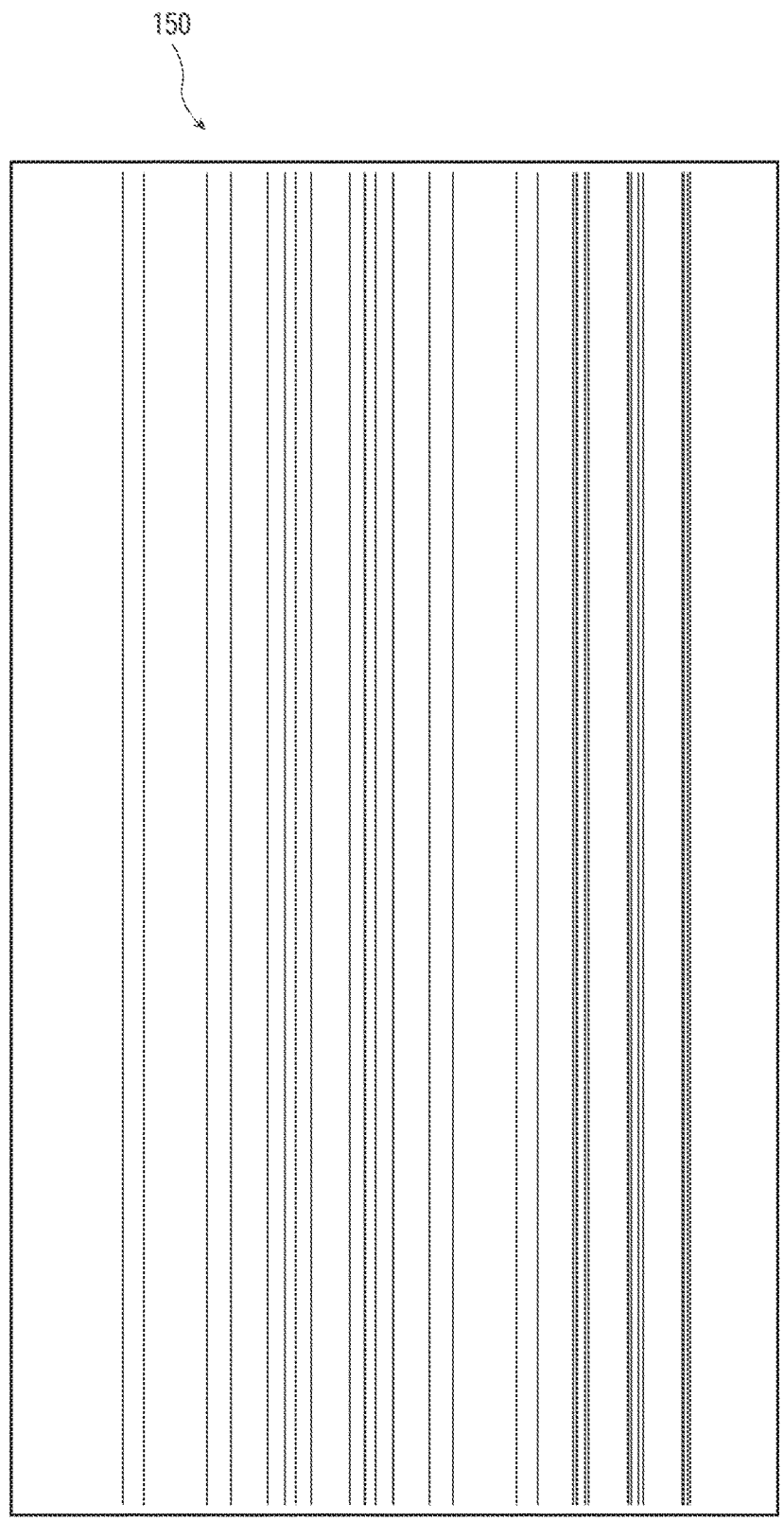

FIGS. 11 through 15 illustrate various views of one embodiment of the composite panel 150. FIG. 11 is a top view, FIGS. 12 and 13 side views, and FIGS. 14 and 15 plan views of the composite panel 150. As illustrated therein, a mechanical connection can be made between respective ones of adjacent panels using a tongue and groove feature.

One end 224 of the composite panel 150 may be inserted in a groove defined by walls 215 and 220 in an adjacent panel. As such each panel includes a corresponding end tongue and groove formation of end 225 and walls 215, 220. Each panel 150 may also include a continuous rib closure 210, and a series of walls which when coupled to adjacent panels forms a corrugated structure. For example, a divisional panel includes walls 222, 224, 232, 230, 234, 226, and 228. Walls 224 and 226 are angled with respect to walls 222 and 228, and define a same angle with walls 232 and 234. Wall 230 is indented with respect walls 232 and 234, and all walls are joined by a rounded corner. Various other structures for the composite panel may be utilized in accordance with the present technology, depending on the shape and structure of the steel wall to which the panel is to be applied.

Figure 16:
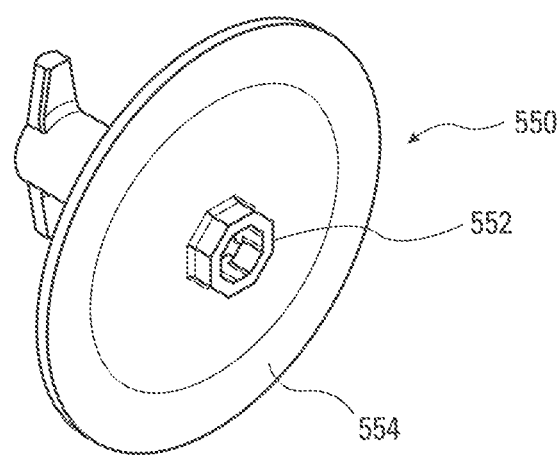
FIG. 16 is a back perspective view of a bolt element.
Figure 17:
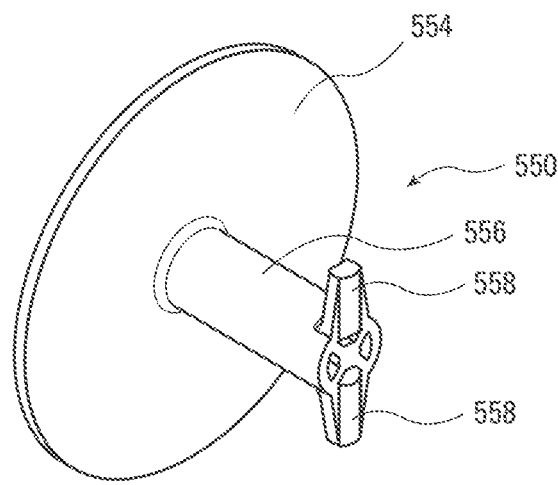
FIG. 17 is a front perspective view of a bolt element.
Figure 18:
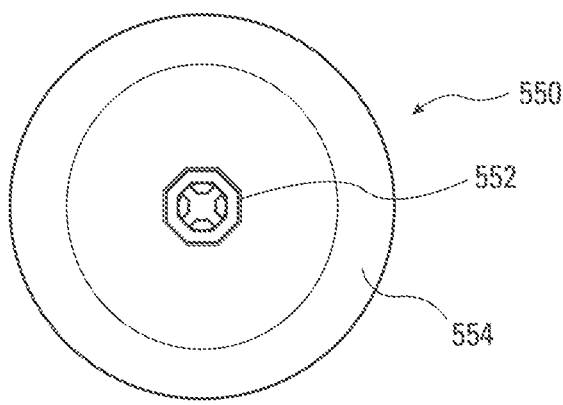
FIG. 18 is a rear plan view of a bolt element.
Figure 19:
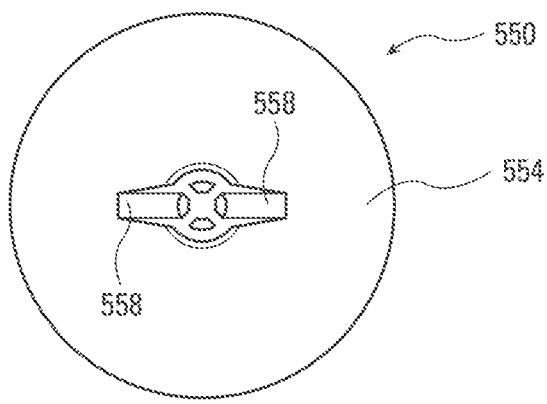
FIG. 19 is a front plan view of a bolt element.
Figure 20:
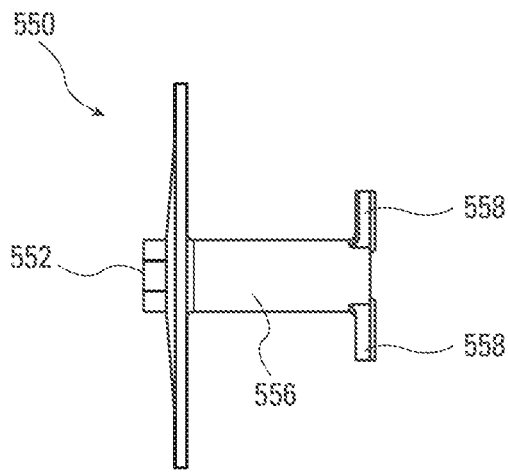
FIG. 20 is a first side view of a bolt element.
Figure 21:
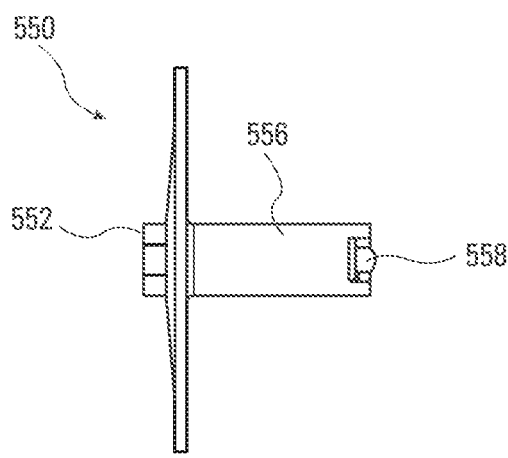
FIG. 21 is a second, rotated side view of a bolt element.

FIGS. 16 through 21 illustrate the bolt element 550. FIG. 16 is a back perspective view of a bolt element. FIG. 17 is a front perspective view of a bolt element. FIG. 18 is a rear plan view of a bolt element. FIG. 19 is a front plan view of a bolt element. FIG. 20 is a first side view of a bolt element. FIG. 21 is a second, rotated side view of a bolt element.

As illustrated therein, bolt element 550 includes a head flange 554 having a top surface and a bottom surface, with the bottom surface engaging the composite panel 150 by abutting the panel 150 around a borehole 610 to secure the composite panel in place as discussed above. A nut 552 is formed in and centered in the upper surface of the head flange 554 and joined to shaft 556. Shaft 556 is cylindrical and extends from the bottom surface of the head flange 554. Shaft 556 has locking wings 558 formed at the distal end thereof. Nut 552 has both a socket insert and an exterior, hexagonal head, allowing for various types of tools to be used to twist the bolt element 550 with respect to the nut element 520 and the retaining element 525. Locking wings 558 extend outwardly at 180 degrees with respect to each other from the cylindrical shaft 556. As discussed below, the length of shaft 556 is such that, when inserted into the nut element 520 and the retaining element 540, the locking wings pass through both the nut element and the retaining element and engage a back, earthen facing surface of the nut element 520. When rotated ninety degrees relative to the nut element, the locking wings secure the bolt element 550, and hence the composite panel, in place.

Each of elements 550, 525, and 510 can be formed from various types of materials including liquid-crystal polymers (LCPs), glass filled nylon, polysulfone (PSU), polyethersulfone (PES) and polyether ether ketone (PEEK) thermoplastic polymer, all formed by injection molding.

Figure 22:
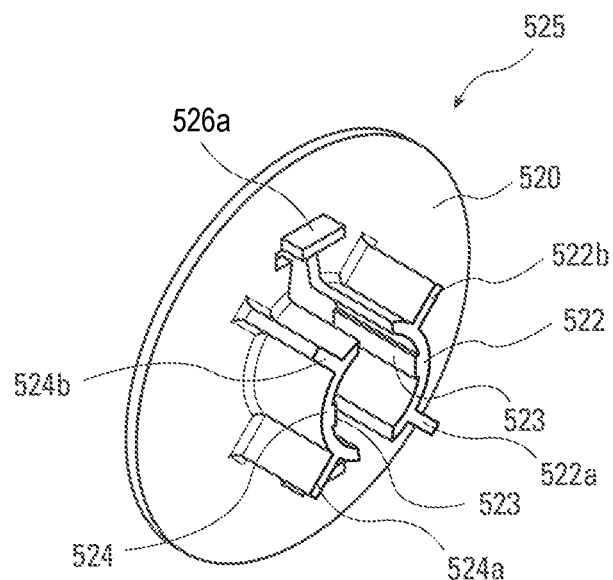
FIG. 22 is a front perspective view of a retaining element.
Figure 23:
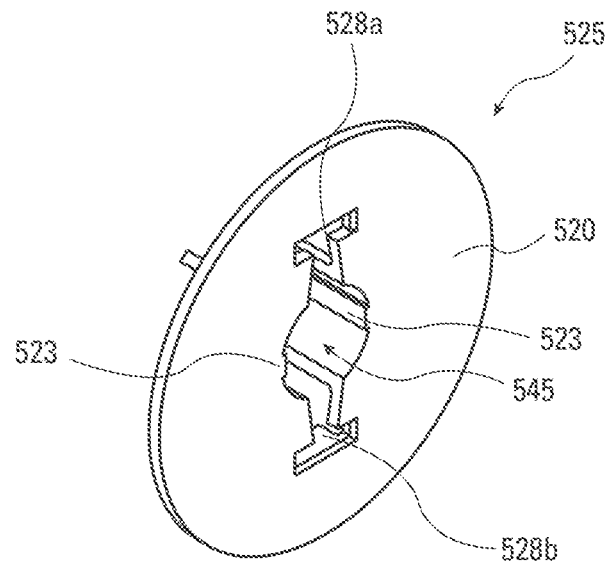
FIG. 23 is a back perspective view of a retaining element.
Figure 24:
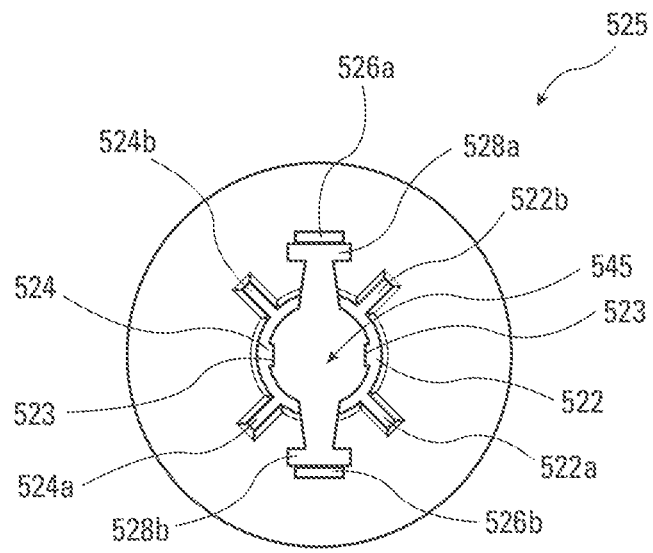
FIG. 24 is a front plan view of a retaining element.
Figure 25:
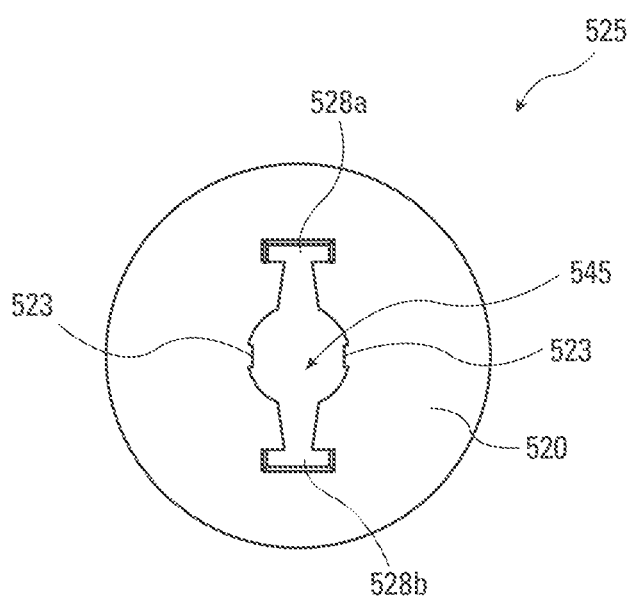
FIG. 25 is a rear plan view of a retaining element.
Figure 26:
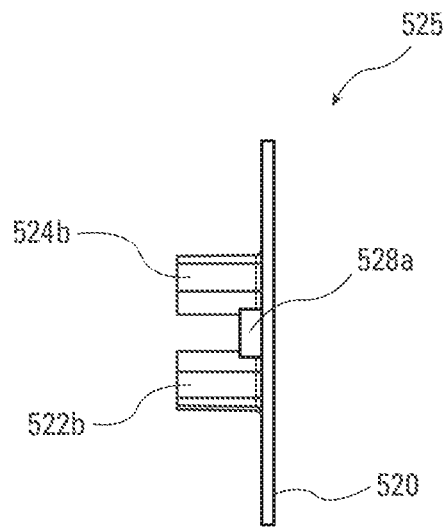
FIG. 26 is a first side view of a retaining element.
Figure 27:
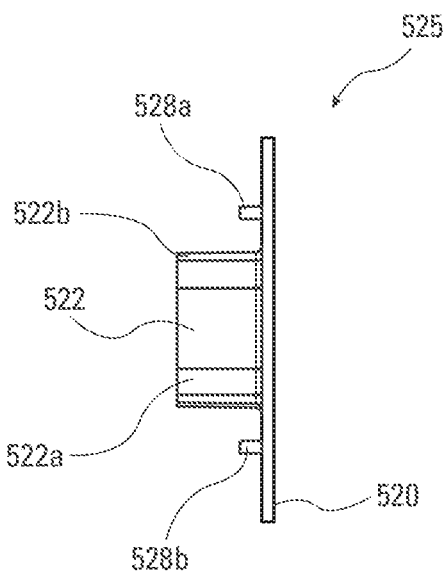
FIG. 27 is a second, rotated side view of a retaining element.
Figure 28:
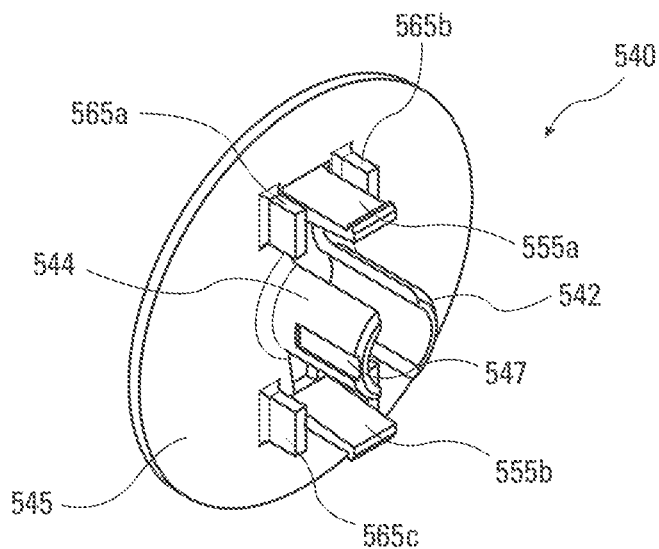
FIG. 28 is a front perspective view of a nut element.

FIGS. 22 through 27 illustrate the structure of the retaining element 525. FIG. 22 is a front perspective view of a retaining element. FIG. 23 is a back perspective view of a retaining element. FIG. 24 is a front plan view of a retaining element. FIG. 25 is a rear plan view of a retaining element. FIG. 26 is a first side view of a retaining element. FIG. 27 is a second, rotated side view of a retaining element.

As illustrated therein, retaining element 525 includes a base plate or flange 520 upon which are formed to arcuate walls 522, 524, spacer walls 522a, 522b, 524a and 524B, each respectively associated with an arcuate wall 522, 524. Locking tabs 526a and 526b are formed on either side of a channel 547. The channel takes the respective shape of the arcuate walls 522, 524, and has extensions leading to tabs 526a and 526b which are sized to fit the locking arms 555a and 555b on the nut element 540, discussed below with respect to FIGS. 28 through 33. Locking arms 555a and 555b each include an angled end tab which engages the locking tabs 526a and 526b in a snap fit relationship, the angled ends of the tabs 526a, 526b allowing the arms 555a, 555b to move inwardly to pass over the tabs as the retaining element is pushed over the nut element. As will be noted, the channel 547 allows passage of the locking wings 558 of the bolt element to pass there through on their way to engagement with the rear side of the nut element discussed below with respect to FIGS. 28 through 33. The angled walls include alignment ribs 523 on the interior thereof which engage alignment grooves 527 on the nut element. The spacer walls 522a-522d maintain the spacing between the steel wall and the composite panel to allow the cementitious material to fill in the gap or space 115 between the 2 walls.

Figure 29:
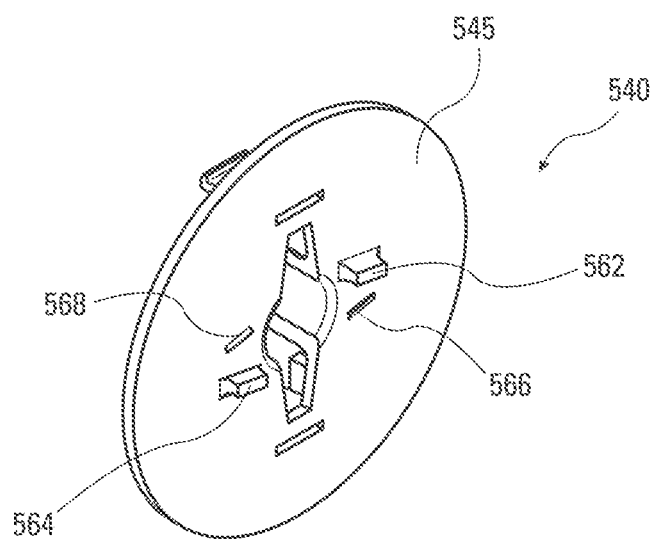
FIG. 29 is a back perspective view of a nut element.
Figure 30:
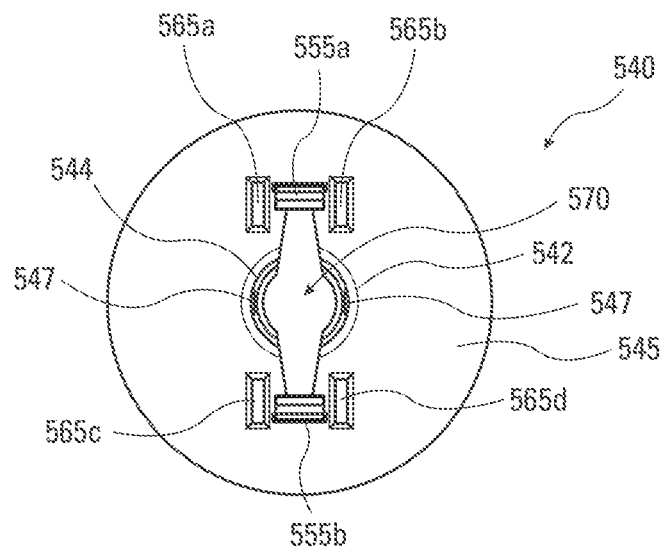
FIG. 30 is a front plan view of a nut element.
Figure 31:
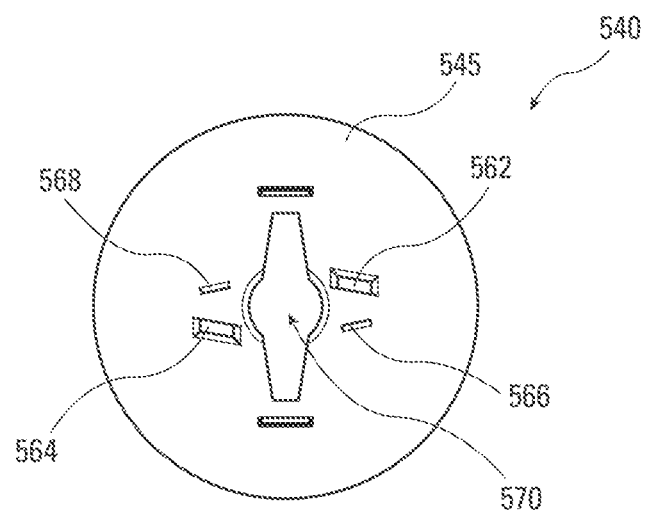
FIG. 31 is a rear plan view of a nut element.
Figure 32:
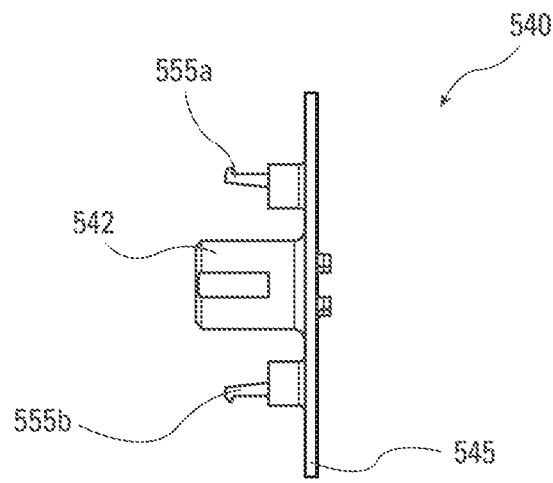
FIG. 32 is a first side view of a nut element.
Figure 33:
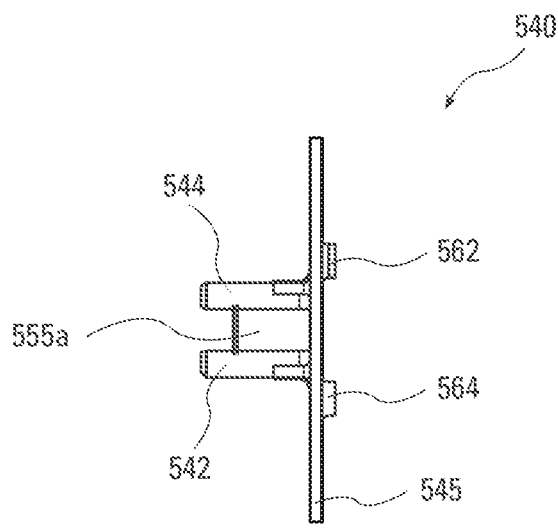
FIG. 33 is a second, rotated side view of a nut element.

The nut element shown in FIGS. 28 through 33, FIG. 28 is a front perspective view of a nut element. FIG. 29 is a back perspective view of a nut element. FIG. 30 is a front plan view of a nut element. FIG. 31 is a rear plan view of a nut element. FIG. 32 is a first side view of a nut element. FIG. 33 is a second, rotated side view of a nut element.

The nut element 540 includes a backing plate 545 upon which structures of the nut element are formed. The locking tabs 555a, 555b, spacer tabs 565a-565d, and arcuate receiving walls 542 and 544, are all formed on the backing plate 545. A channel 570 is defined between the arcuate walls 542, 544 and the locking arms 555a, 555b. The channel is shaped to receive the locking wings 558 of the bolt element. On the rear side (the earthen side) of the backing plate 545, lock tabs 562, 564, and shorter, angled locking ramps 566, 568 are positioned such that a 90° rotation of the bolt element will rotate the locking wings over the locking ramps 566, 568 as shown in FIG. 7 and into a locked engagement with the locking tabs 562, 564 of the nut element. As noted above, the locking arms 555a and 555b are passed through the slots 528a, 528b in channel 547.

During installation, the nut element is placed on the earthen side of the steel wall with the locking tabs passing through the bore 610 along with the arcuate walls 542 and 544. As the retaining element is slid such that the walls 544 and 542 and the locking arms 555a and 555b pass into the channel 547 (slots 528a and 528b) of the retaining element, the locking arms will engaged the tabs 526a and 526b, thereby the locking retaining element and the nut element in position.

FIGS. 34 through 40 illustrate a second embodiment of the seawall system which includes alternative fasteners and fastening techniques to secure a composite panel to a steel wall to allow cementitious grout or epoxy 120 to be installed therein between.

As illustrated in FIGS. 36 through 40, a second embodiment of the composite panel 180 is generally identical to composite panel 150 with the exception that panel 180 further includes mounting bosses 3612, 3214, 3216, 3618, which are positioned on, for example, panel walls 224 and 226. The mounting bosses 3612, 3214, 3216, 3618 provide both a spacer to ensure a gap 115 between the steel wall 175 and the composite panel 180, and a structurally rigid mounting location for the fasteners. Various embodiments of other fasteners are disclosed in FIGS. 41 through 106.

Figure 34:
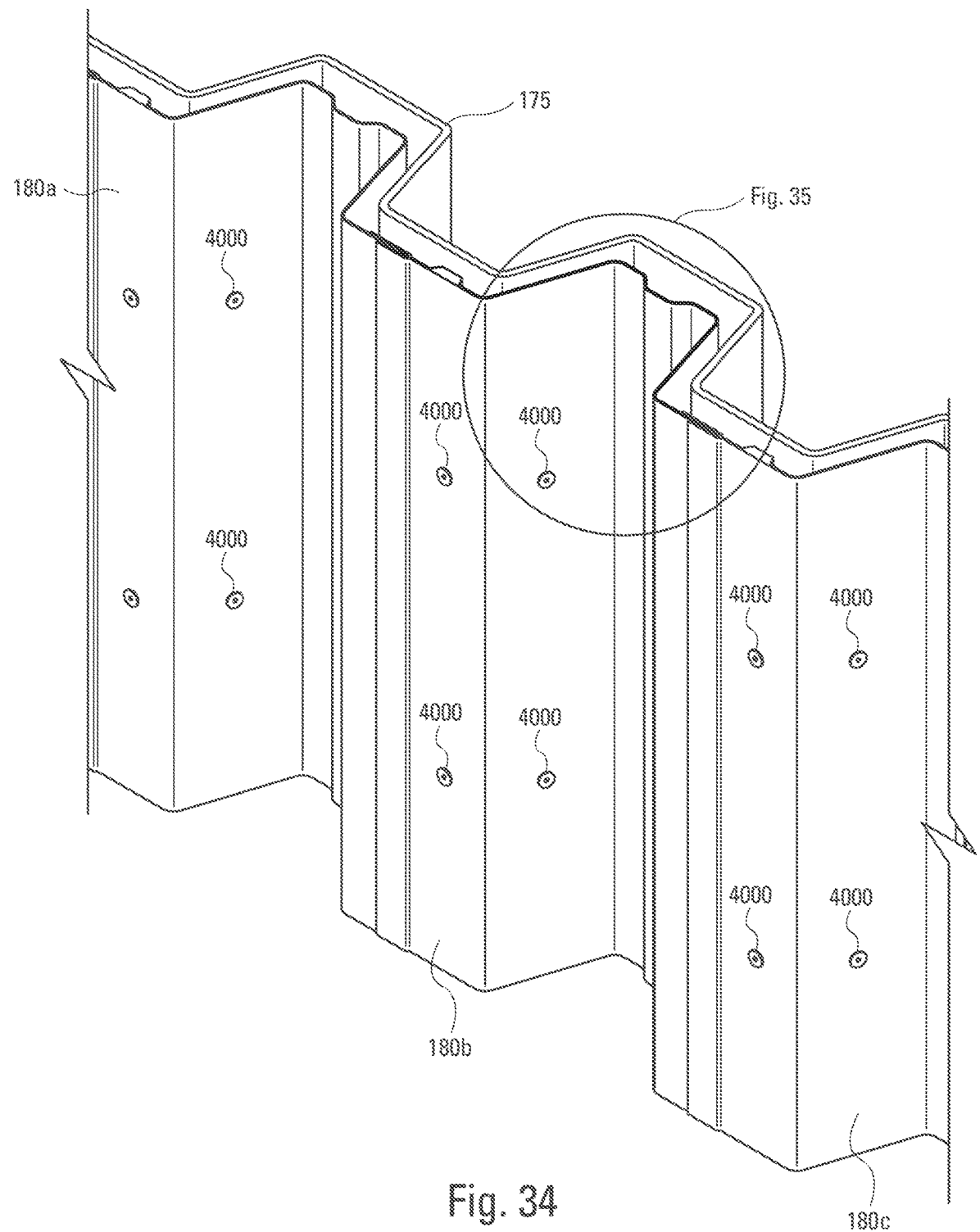
FIG. 34 is a perspective view of another seawall assembly.
Figure 35:
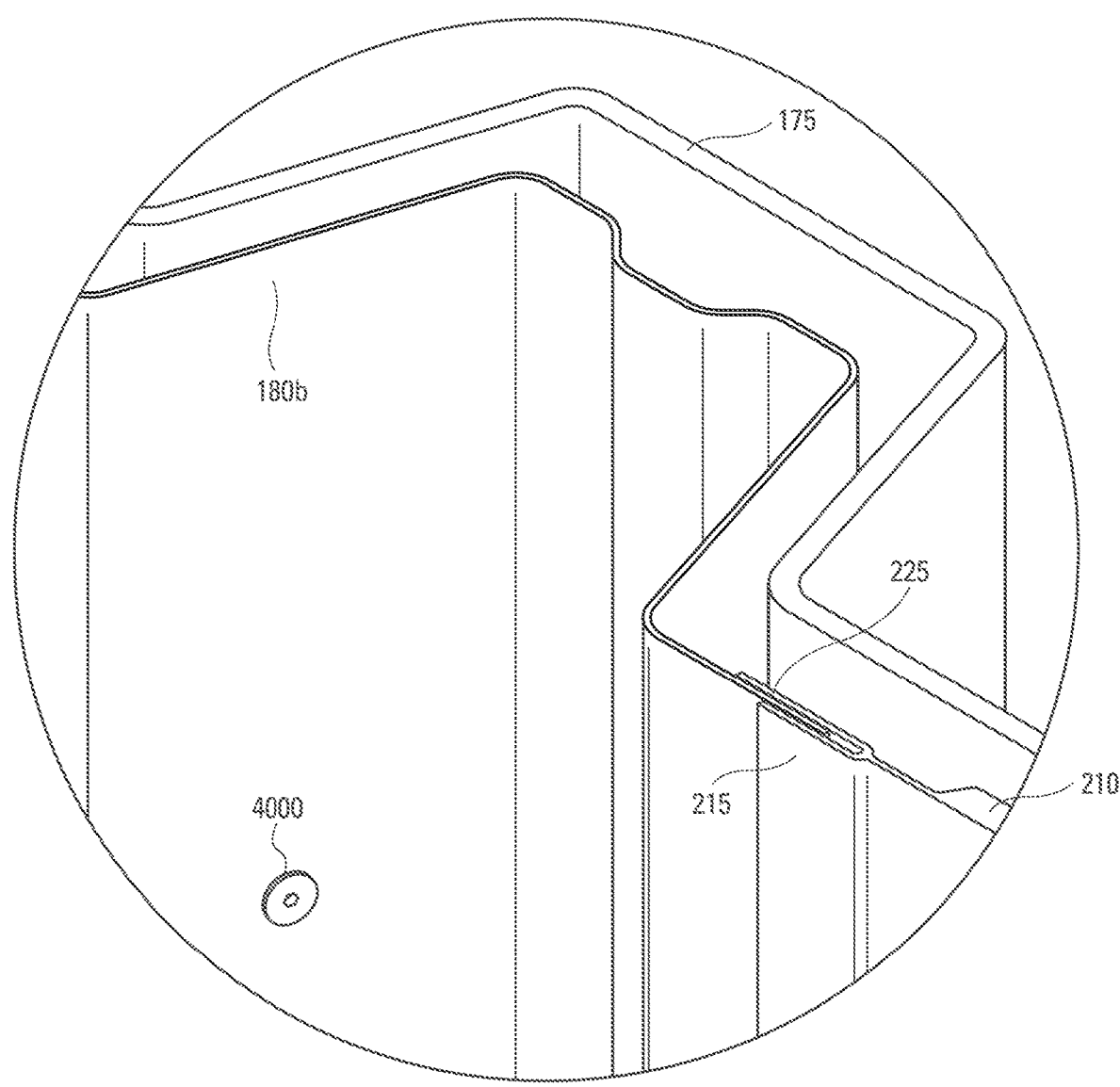
FIG. 35 is an enlarged perspective view of a portion of FIG. 34.

FIG. 34 is a perspective view, and FIG. 35 an enlarged perspective view, of the composite panel 180, fasteners 4000, and the steel wall 175. FIG. 34 is a perspective view of a seawall assembly.

Figure 36:
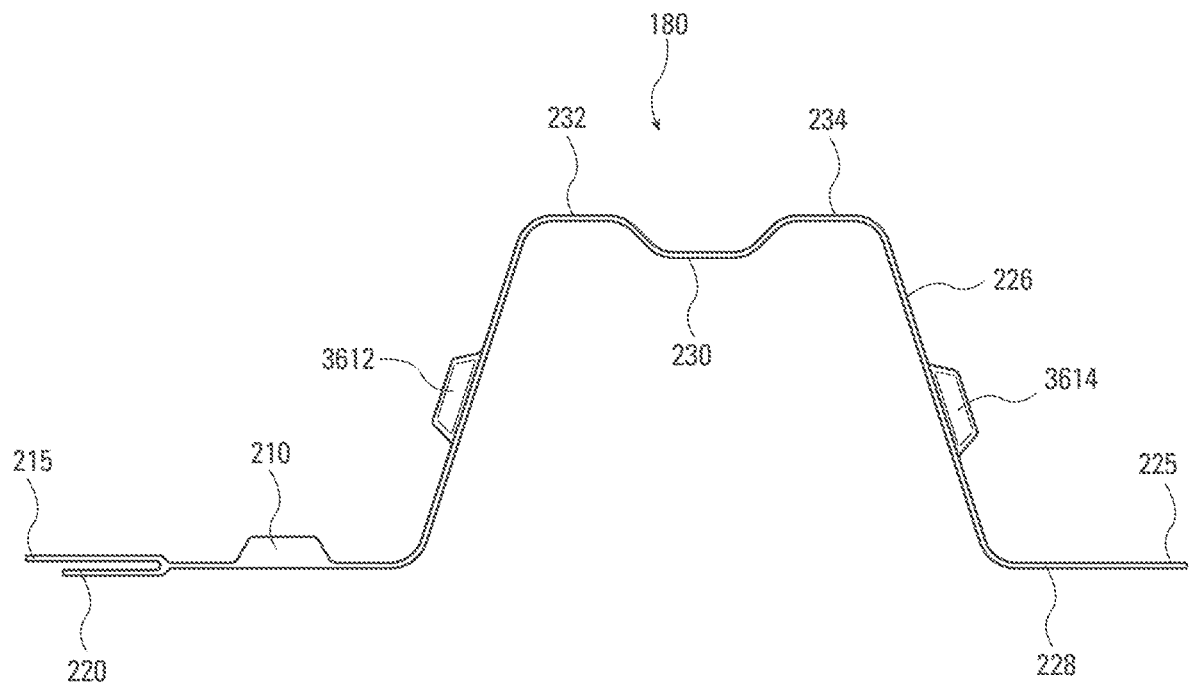
FIG. 36 is a top view of the seawall assembly illustrated in FIGS. 34 and 35.
Figure 37:
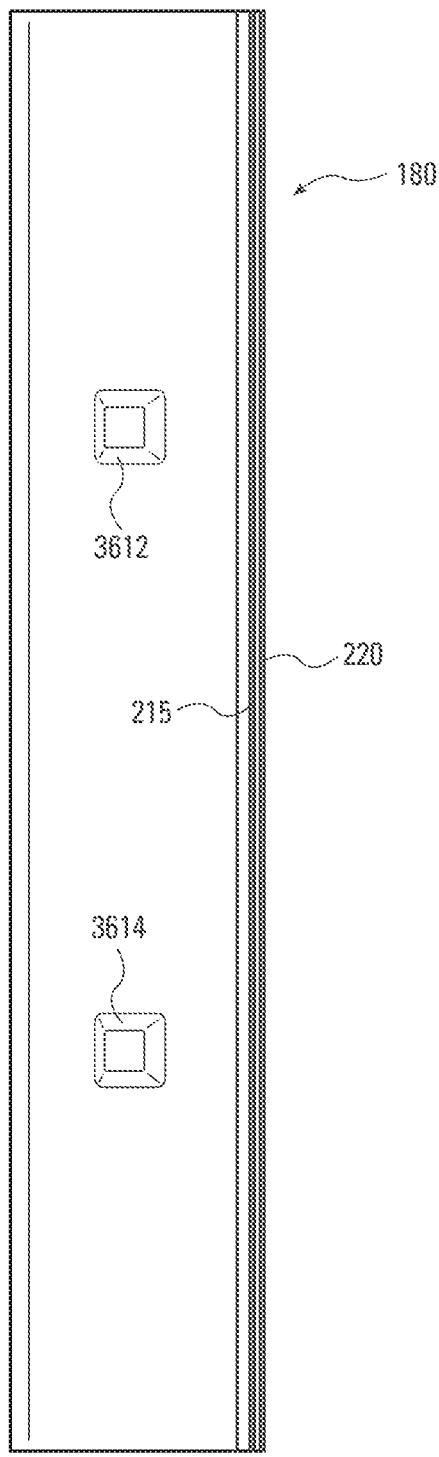
FIG. 37 and FIG. 38 are individual panel views of one corrugation of a second embodiment of a composite panel including mounting bosses.
Figure 38:
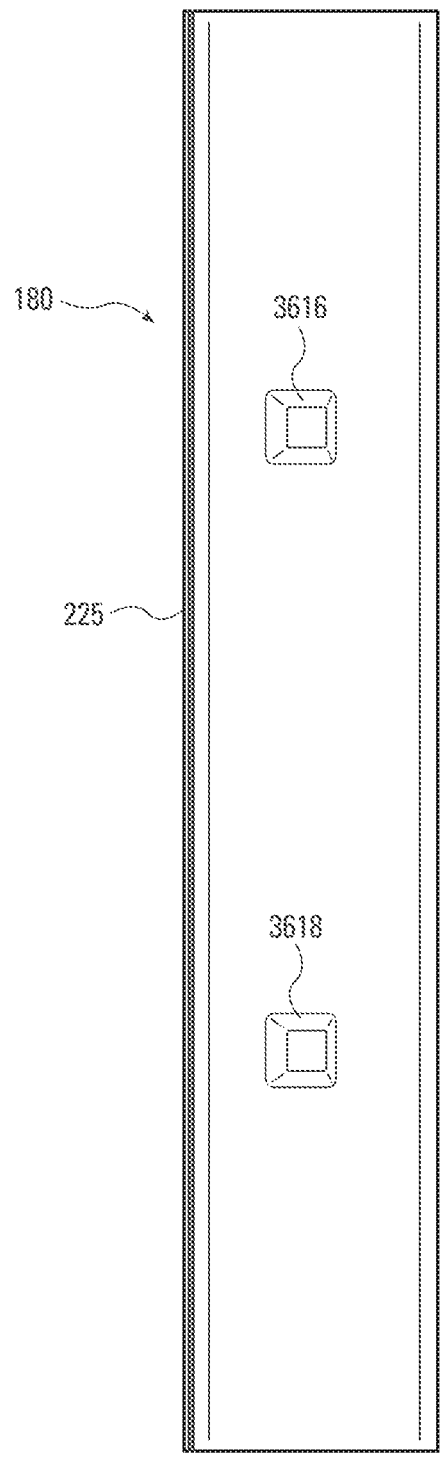
Figure 39:
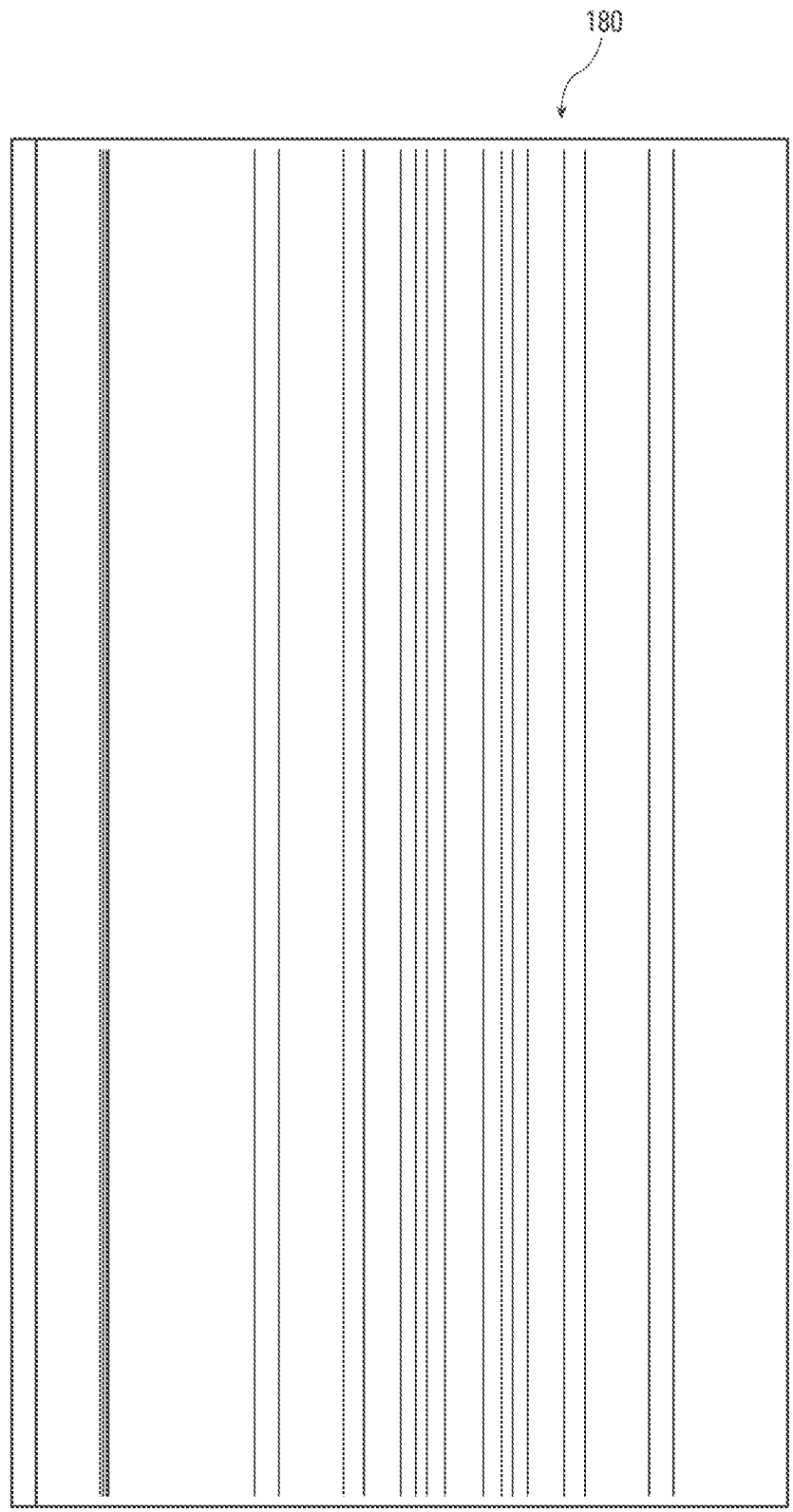
FIG. 39 and FIG. 40 are plan views of a second embodiment of a composite panel including mounting bosses.
Figure 40:
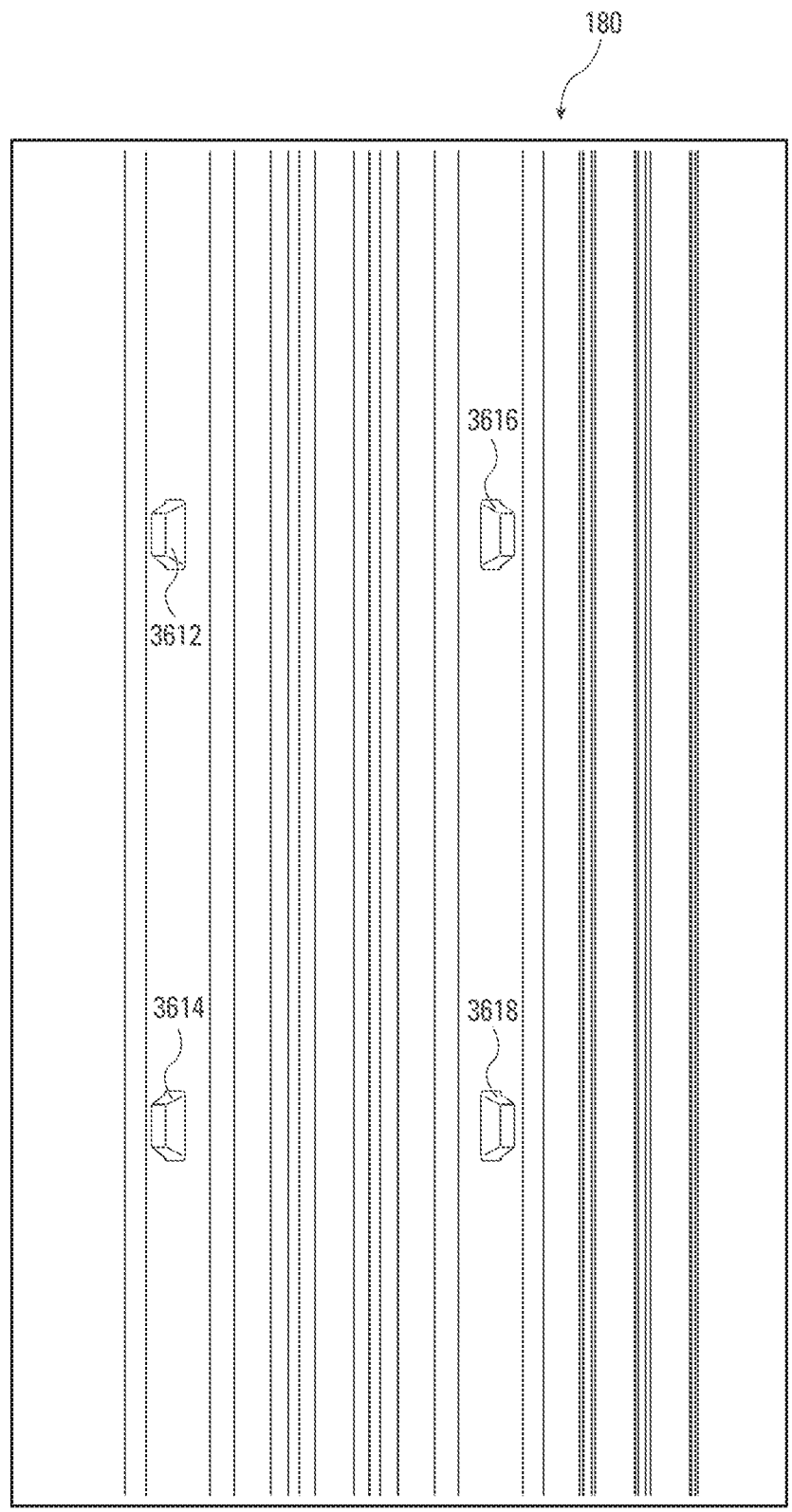

FIG. 36 is a top view of the seawall assembly illustrated in FIGS. 34 and 35. FIG. 37 and FIG. 38 are individual panel views of one corrugation of a second embodiment of a composite panel 180 including mounting bosses. FIG. 39 and FIG. 40 are plan views of a second embodiment of a composite panel including mounting bosses.

Mounting bosses 3612, 3214, 3216, 3618 may be formed as part of the composite panel and are generally solid bosses. In another alternative, the fasteners illustrated in FIGS. 41-106 may be used in composite panel 150, without the bosses. The bosses are generally square, but may be formed of any shape, and extend above a surface of the walls 224 and 226. The bosses may be positioned in other walls of the composite panel.

Figure 41:
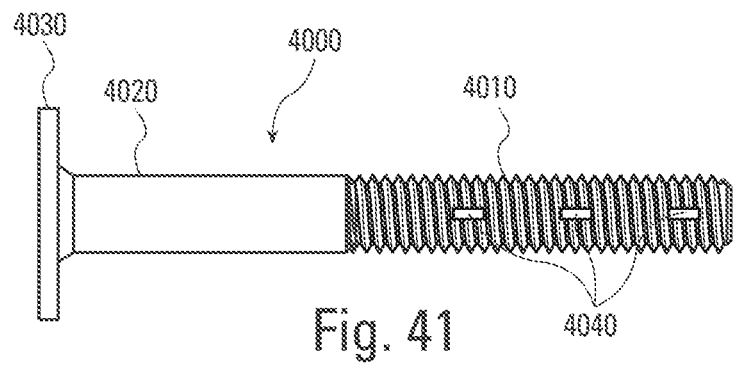
FIG. 41 is a first plan view of a fastener in accordance with the present technology.
Figure 42:
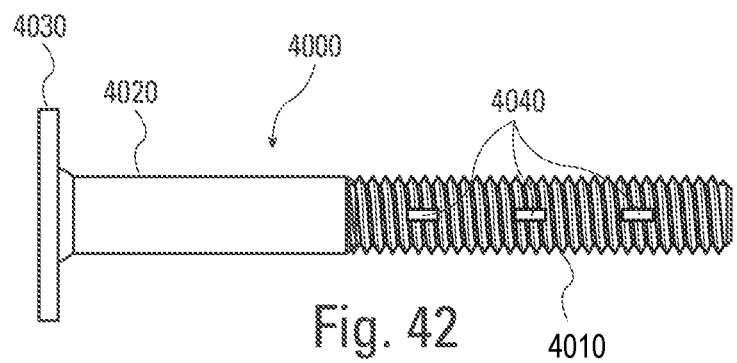
FIG. 42 is a second, rotated plan view of a fastener in accordance with the present technology.
Figure 43:
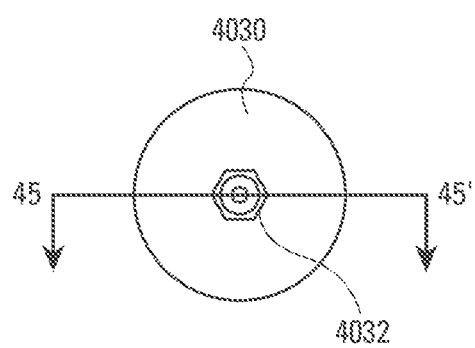
FIG. 43 is a top plan view of the fastener of FIG. 41.
Figure 44:
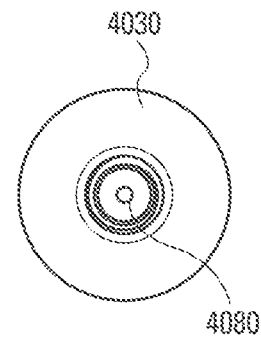
FIG. 44 is a bottom plan view of the fastener of FIG. 41.
Figure 45:
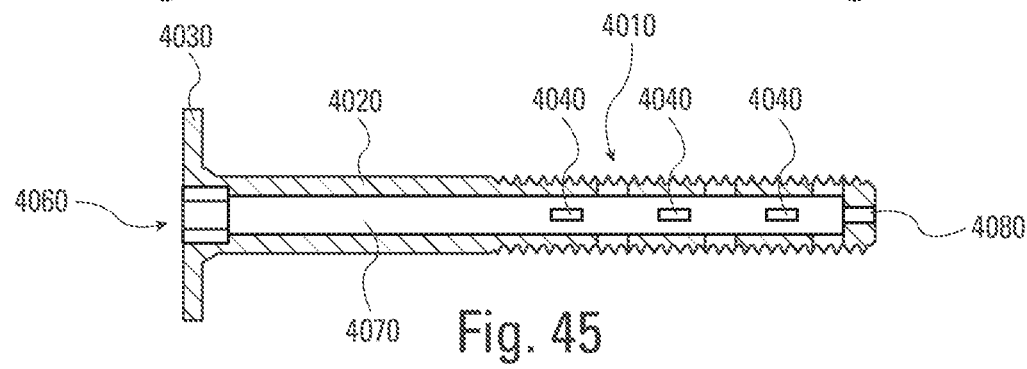
FIG. 45 is a cross-sectional view along line 45-45' of FIG. 43.

FIGS. 41 through 45 illustrate a first embodiment of an alternative fastener for use in the present technology. FIG. 41 is a first plan view of a fastener in accordance with the present technology. FIG. 42 is a second, rotated plan view of a fastener in accordance with the present technology. FIG. 43 is a top plan view of the fastener of FIG. 41. FIG. 44 is a bottom plan view of the fastener of FIG. 41. FIG. 45 is a cross-sectional view along line 45-45' of FIG. 43

As shown therein, a fastener 4000 includes a threaded region 4010 and a non-threaded region 4020, as well as a head 4030. Head 4030 includes a socket 4032 which a tool may engage to rotate the fastener 4000. Threaded region 4010 includes a plurality of slots 4040 and bore 4080 which allow material which is injected into a channel 4070 at a first end 4060 to exit the fastener 4000. FIGS. 41 and 42 show two views of the fastener 4000, with the fastener in FIG. 42 rotated 90 degrees with respect to the view in FIG. 41.

Figure 46:
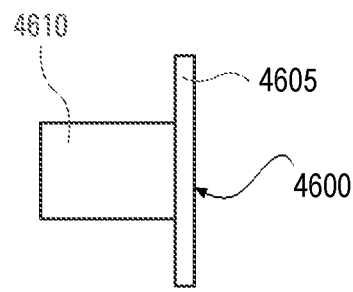
FIG. 46 is a first plan view of a nut used with the fastener of FIG. 41.
Figure 47:
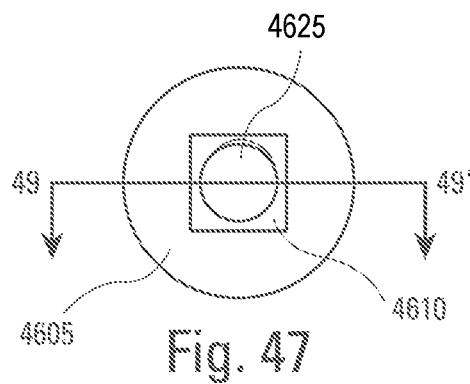
FIG. 47 is a top plan view of the nut of FIG. 46.
Figure 48:
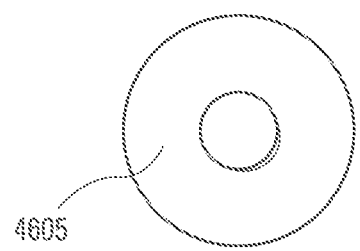
FIG. 48 is a bottom plan view of the nut of FIG. 46.
Figure 49:
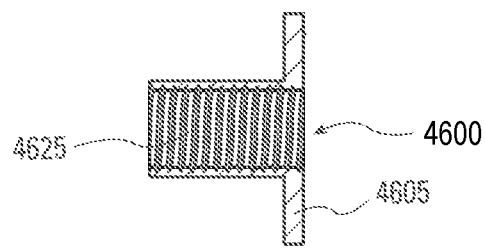
FIG. 49 is a cross-sectional view along line 49-49' of FIG. 47.

Illustrated in FIGS. 46-49 is a nut element 4600, which may be utilized with a fastener 4000. FIG. 46 is a first plan view of a nut used with the fastener of FIG. 41. FIG. 47 is a top plan view of the nut of FIG. 46. FIG. 48 is a bottom plan view of the nut of FIG. 46. FIG. 49 is a cross-sectional view along line 49-49' of FIG. 47.

The nut includes a flange surface 4605 upon which a boss 4610 is formed. The boss 4610 houses a threaded channel 4625. The channel 4625 is open at both ends, to allow the threaded portion 4010 of the fastener 4000 to pass there through as illustrated in FIGS. 55 and 57.

Figure 50:
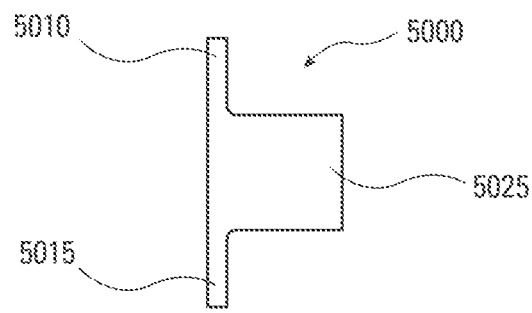
FIG. 50 is a first side view of a spacer used with the fastener of FIG. 41.
Figure 51:
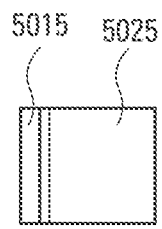
FIG. 51 is a second side view of a spacer used with the fastener of FIG. 41.
Figure 52:
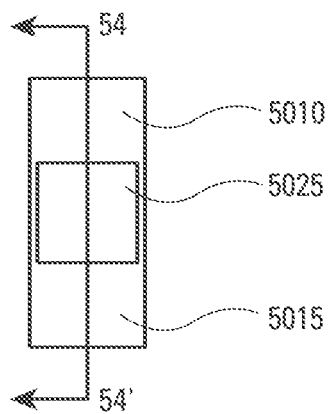
FIG. 52 is a top plan view of the spacer of FIG. 50.
Figure 53:
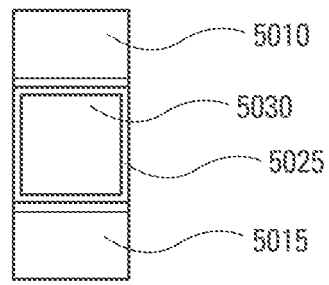
FIG. 53 is a bottom plan view of the spacer of FIG. 50.
Figure 54:
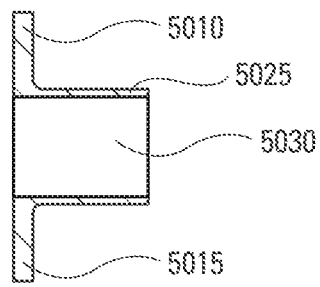
FIG. 54 is a cross-sectional view along line 54-54' of FIG. 52.

A spacer 5000 is illustrated in FIGS. 50 through 54 and is used in conjunction with the nut element 4600. FIG. 50 is a first side view of a spacer used with the fastener of FIG. 41. FIG. 51 is a second side view of a spacer used with the fastener of FIG. 41. FIG. 52 is a top plan view of the spacer of FIG. 50. FIG. 53 is a bottom plan view of the spacer of FIG. 50. FIG. 54 is a cross-sectional view along line 54-54' of FIG. 52.

Spacer 5000 includes a first flange 5010 and a second flange 5015, as well as a boss 5025. Boss 5025 includes an internal channel 5030 which is sized such that internal channel 5030 may slide over the exterior of boss 4610 of the nut element 4600. This assembly is illustrated in FIG. 57. This allows fastener 4000 to be threaded within the interior threaded channel 4625 of the nut element 4600 with the spacer positioned over and engaged with the nut element 4600.

Figure 55:
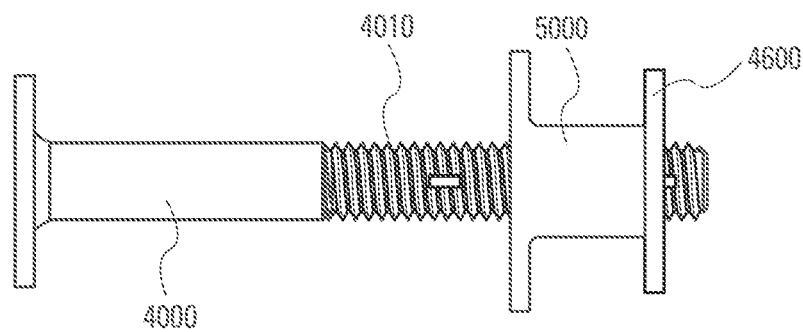
FIG. 55 is a first assembly view of a fastening system.
Figure 56:
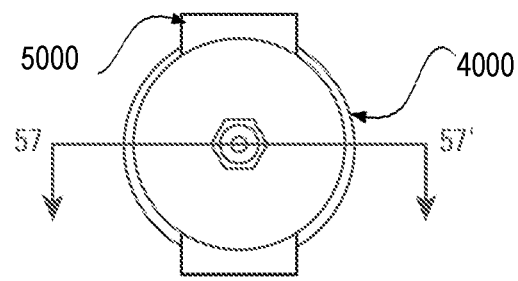
FIG. 56 is a second assembled view of a fastening system.
Figure 57:
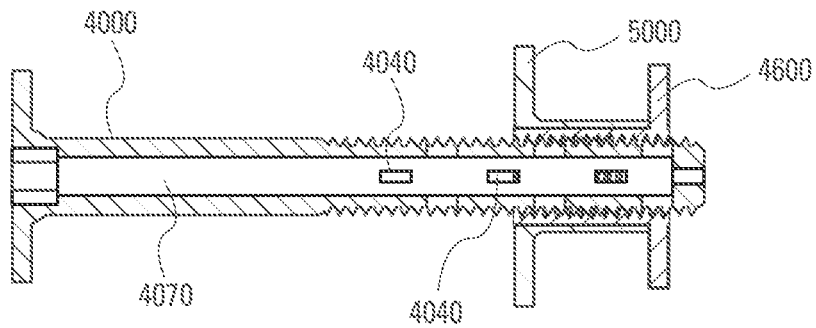
FIG. 57 is a cross-sectional view along line 57-57' of FIG. 56.
Figure 58:
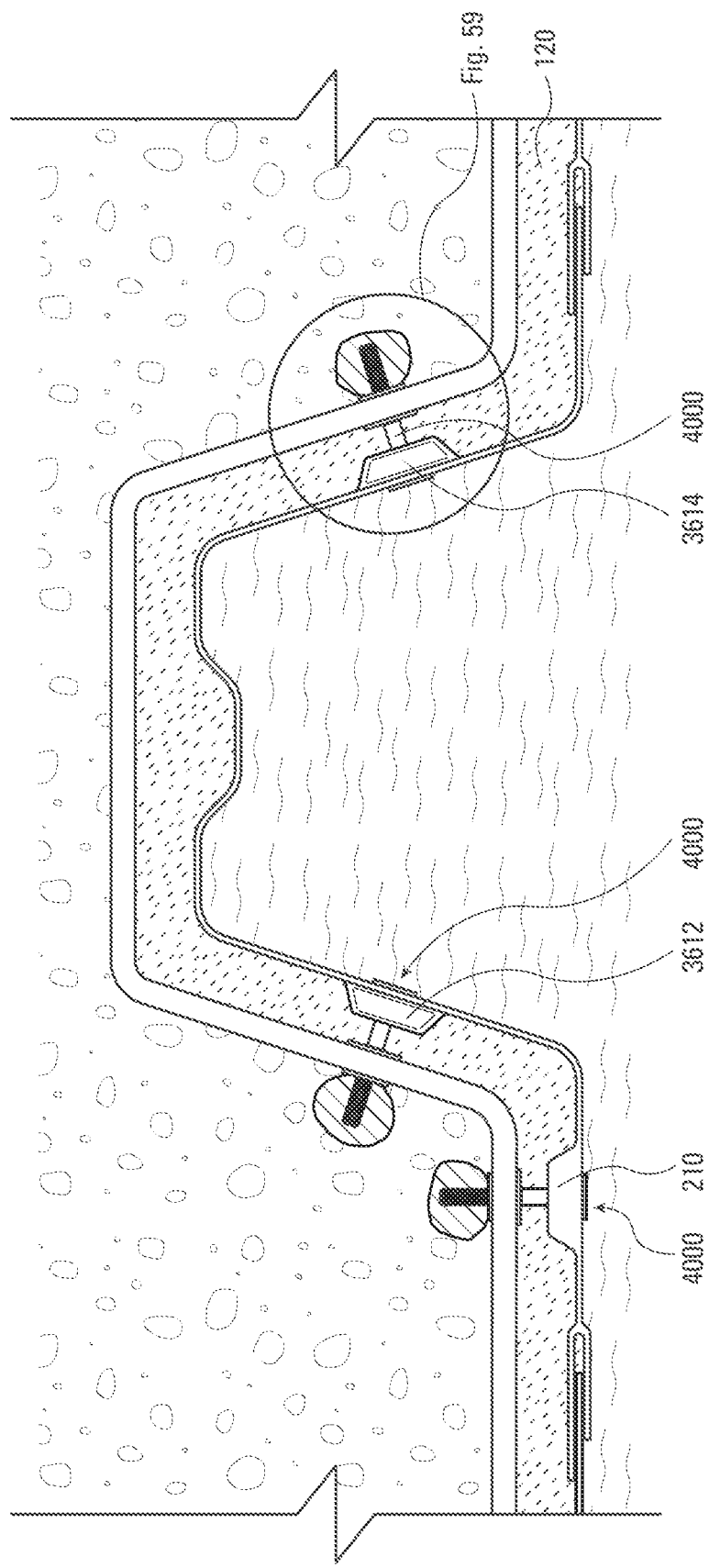
FIG. 58 is a top view of the fastener assembly of FIG. 55 installed in a marine environment.
Figure 59:
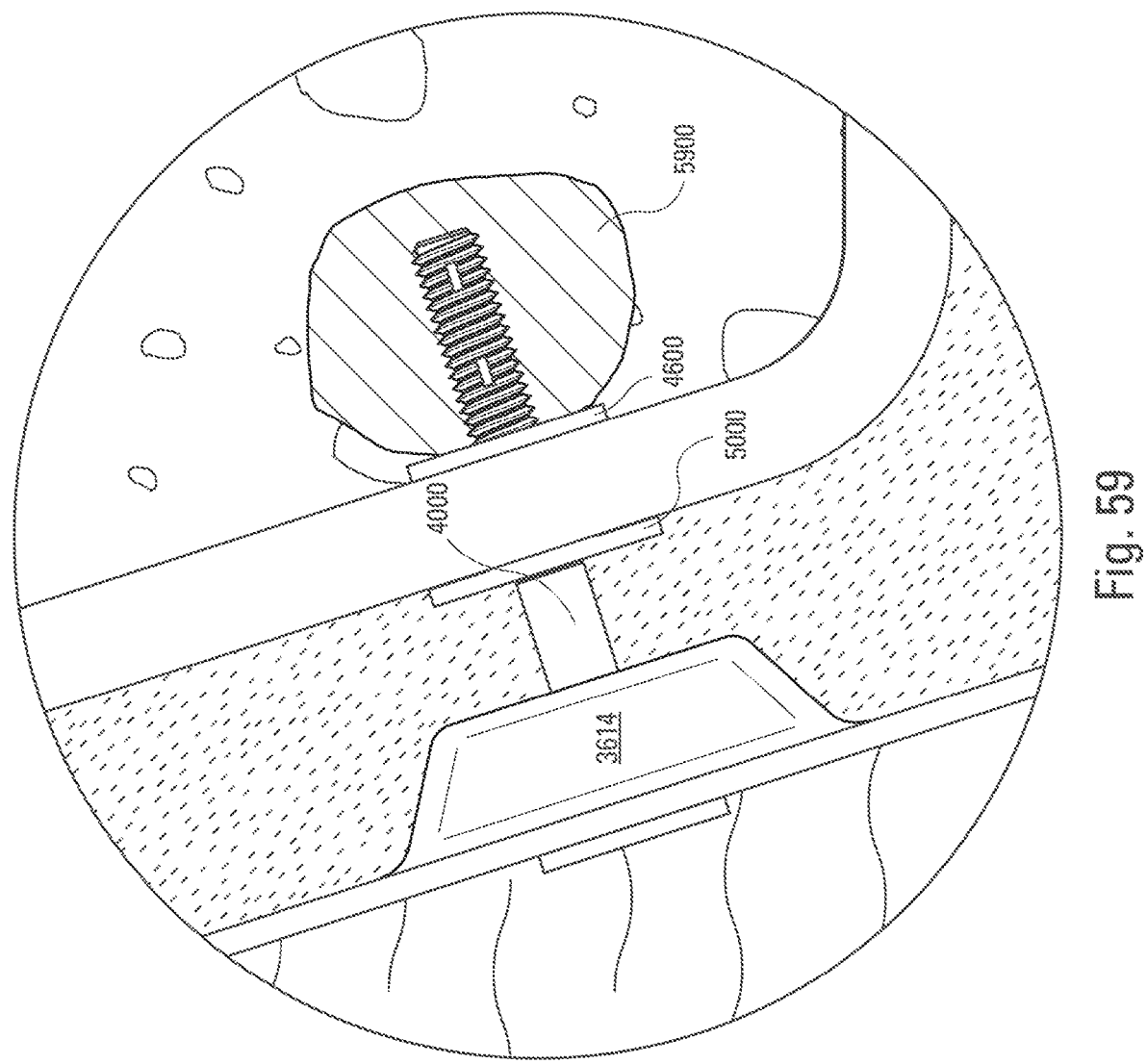
FIG. 59 is an enlarged view of a portion of FIG. 58.
Figure 60:
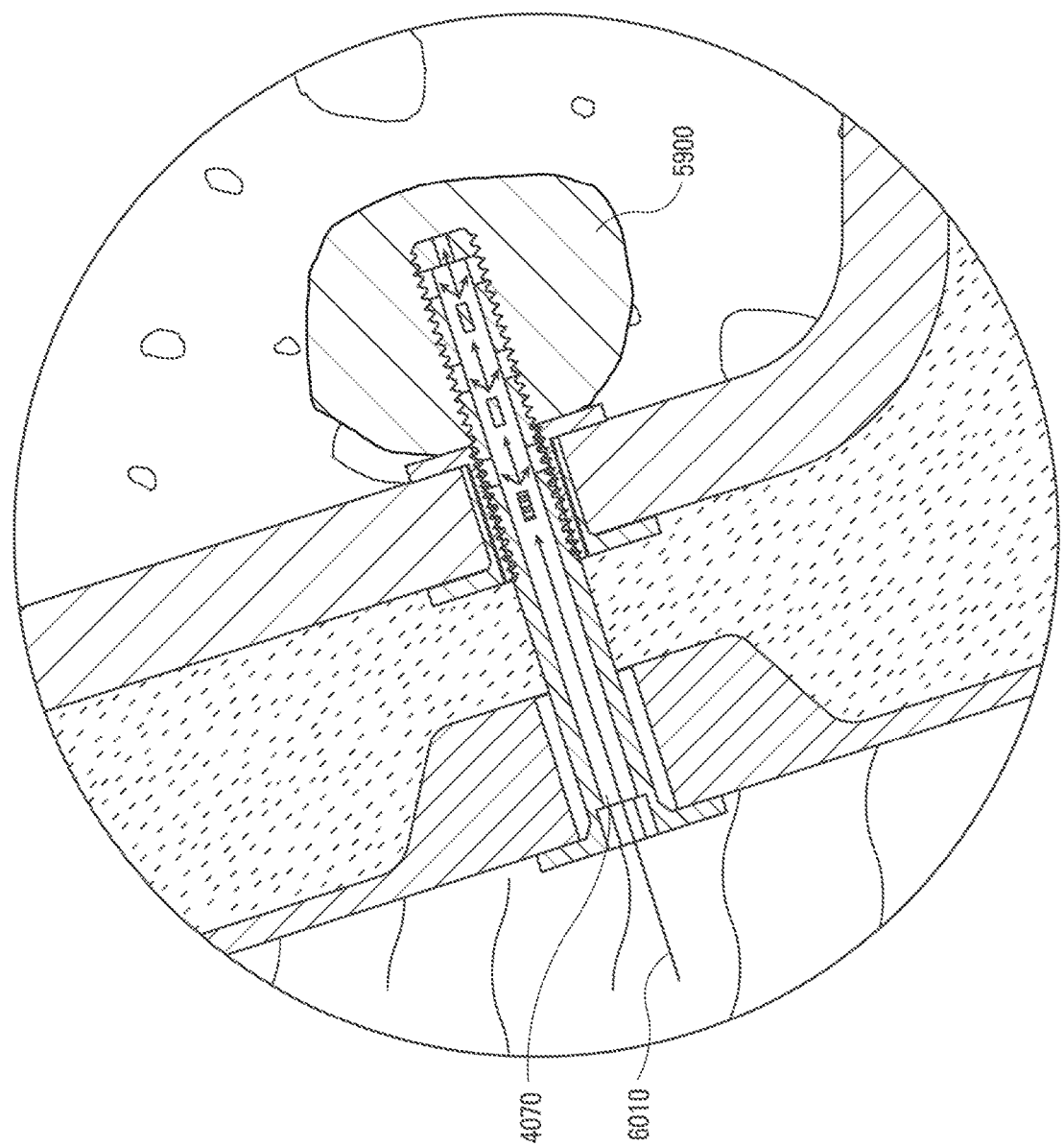
FIG. 60 is a cross-sectional view of the enlarged assembly view of FIG. 59.

FIGS. 55 through 60 illustrate the assembly of the fastening system using fastener 4000, spacer 5000, and nut element 4600. FIG. 55 is a first assembly view of a fastening system. FIG. 56 is a second assembled view of a fastening system. FIG. 57 is a cross-sectional view along line 57-57' of FIG. 56. FIG. 58 is a top view of the fastener assembly of FIG. 55 installed in a marine environment. FIG. 59 is an enlarged view of a portion of FIG. 58. FIG. 60 is a cross-sectional view of the enlarged assembly view of FIG. 59. FIGS. 55-60 illustrate a marine environment protection system.

As illustrated in FIGS. 58-60, the nut element 4600 may be positioned on the earthen side of the steel wall 175 with the spacer element 5000 fitted onto the nut element from an opposing side of the steel wall in a bore hole (similar to but smaller than bore hole 620) in the steel wall in a manner similar to that of nut element 540 and retaining element 525. This holds the nut element 4600 in place during installation of the composite panel 180. The bores including the nut element 4600 and spacer elements 5000 in the steel wall 175 are aligned with corresponding boreholes the mounting bosses 3612, 3214, 3216, 3618. The fastener 4000 is passed through the borehole the mounting bosses and is screwed in to the nut element 4600 in the steel wall. Thereafter, a tool containing an epoxy is inserted into the interior channel 4070 of the fastener 4000 and epoxy inserted into the channel. As illustrated in FIG. 60, the flow of the epoxy will exit the various bores 4040 and end of the fastener 4000 on the earthen side of the wall forming a region 5900 in the earthen material. This secures the fastening element 4000 in place, after which the cementitious grout or epoxy 120 can be provided in the space 115 between the steel wall and the panel.

As illustrated in FIG. 59, the space between the flanges 5010 and 5015 of the spacer element 5000, and flange 4605 of the nut element 4600, when assembled with the nut element 4600, is approximately the width or thickness of the steel wall 175.

FIGS. 61-80 illustrate another fastening system utilized in the seawall system. In this embodiment, a fastener 6000, nut element 6500, and spacer element 7000 are provided.

Figure 61:
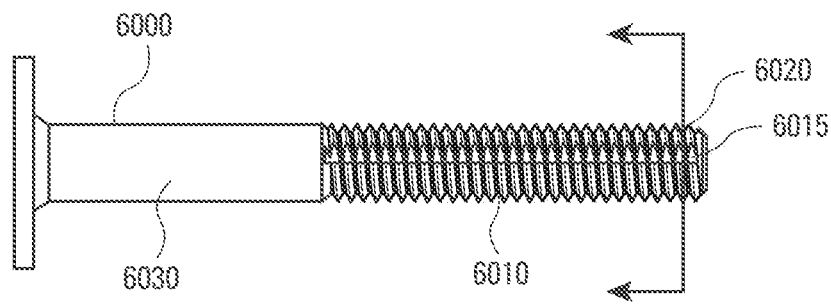
FIG. 61 is a plan view of another fastener in accordance with the present technology.
Figure 62:
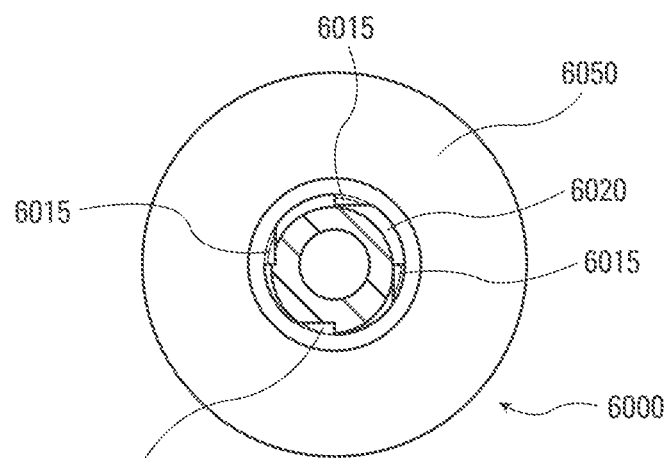
FIG. 62 is a bottom plan view of the fastener of FIG. 61.
Figure 63:
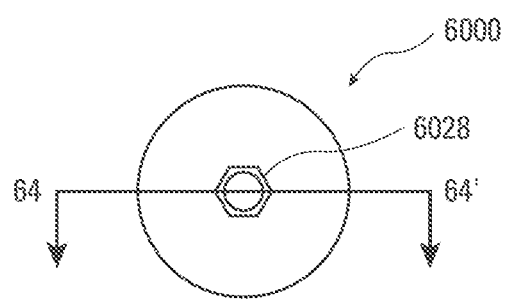
FIG. 63 is a top plan view of the fastener of FIG. 61.
Figure 64:
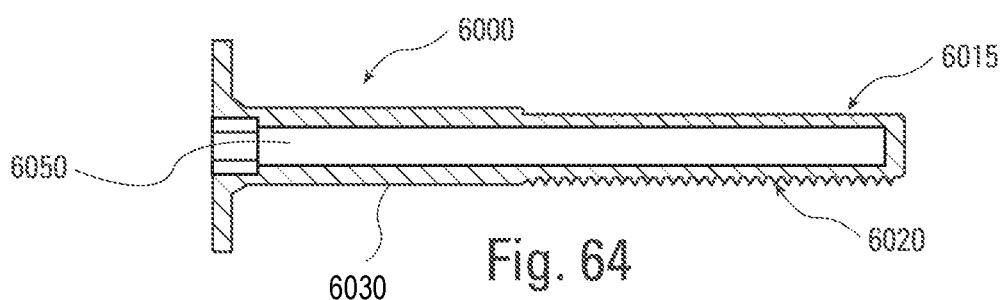
FIG. 64 is a cross-sectional view along line 64-64' of FIG. 63.

FIG. 61 is a plan view of another fastener in accordance with the present technology. FIG. 62 is a bottom plan view of the fastener of FIG. 61. FIG. 63 is a top plan view of the fastener of FIG. 61. FIG. 64 is a cross-sectional view along line 64-64' of FIG. 63.

As illustrated in FIG. 61 through 64, fastening element 6000 includes a non-threaded region 6030 and a threaded region 6010. The threaded region includes partial threads 6020 which are separated by notches 6015 at approximately each quarter turn of the thread. In should be understood that more or fewer notches may be utilized in accordance with the technology. A top portion of the fastener 6000 includes a hexagonal socket 6028. The nut allows tools to be utilized to rotate the fastener with respect to the nut element 6500. Fastener 6000 includes an interior channel 6050 which allows an epoxy to be inserted into the fastener 6000, once the fastener 6000 is in place in a seawall system.

Figure 65:
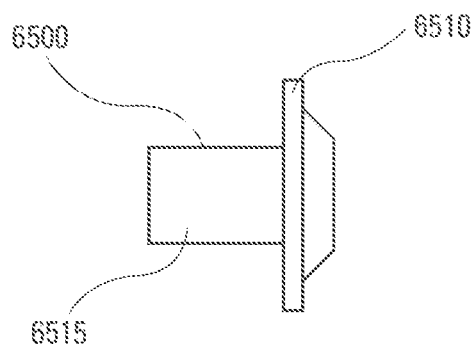
FIG. 65 is a side view of a nut used with the fastener of FIG. 61.
Figure 66:
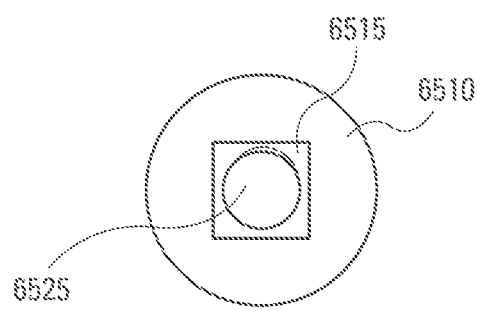
FIG. 66 is a top plan view of the nut of FIG. 65.
Figure 67:
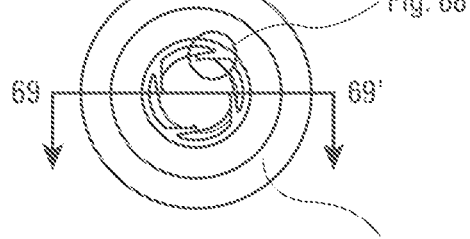
FIG. 67 is a bottom plan view of the nut of FIG. 61.
Figure 68:
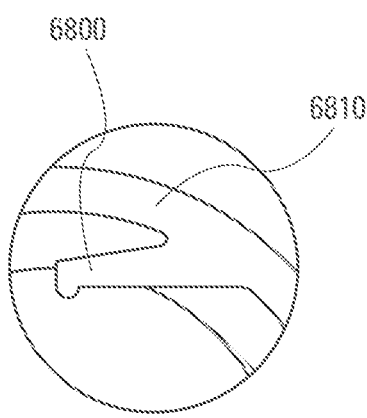
FIG. 68 is an enlarged view of a portion of FIG. 67.
Figure 69:
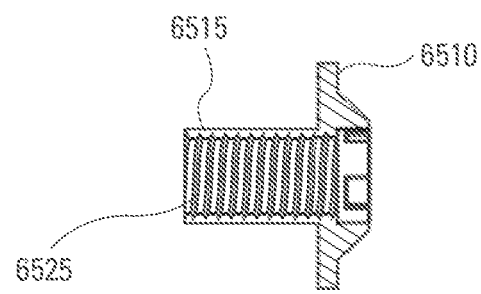
FIG. 69 is a cross-sectional view along line 69-69' of FIG. 67.
Figure 70:
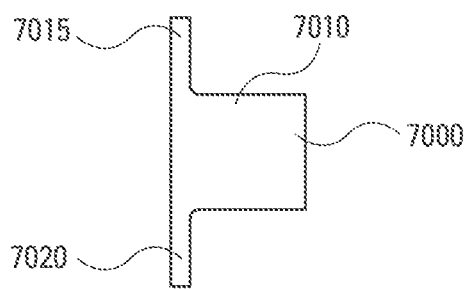
FIG. 70 is a first side view of a spacer used with the fastener of FIG. 61.
Figure 71:
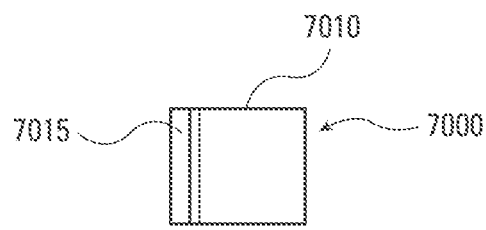
FIG. 71 is a second side view of a spacer used with the fastener of FIG. 61.
Figure 72:
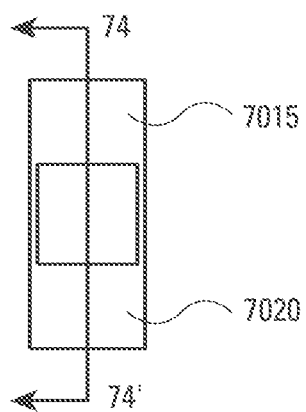
FIG. 72 is a bottom plan view of the spacer of FIG. 70.
Figure 73:
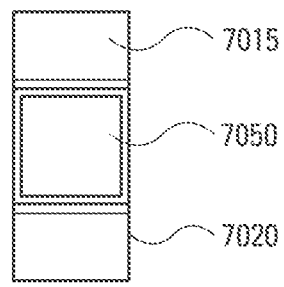
FIG. 73 is a top plan view of the spacer of FIG. 70.
Figure 74:
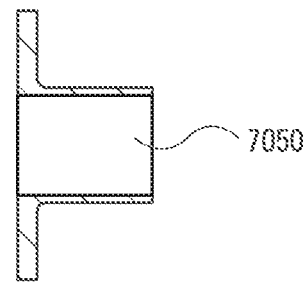
FIG. 74 is a cross-sectional view along line 74-74' of FIG. 72.

The nut element 6500 is illustrated in FIG. 65 through 69. FIG. 65 is a side view of a nut used with the fastener of FIG. 61. FIG. 66 is a top plan view of the nut of FIG. 65. FIG. 67 is a bottom plan view of the nut of FIG. 61. FIG. 68 is an enlarged view of a portion of FIG. 67. FIG. 69 is a cross-sectional view along line 69-69' of FIG. 67.

The nut element 6500 includes a flange 6510, and a boss 6515, which includes a threaded region 6525 within which are provided levers 6800 (four levers 6800 per turn) extending from thread 6810 which engage the notches 6015 in the fastener 6000 in the threaded region when the threaded region 6010 is inserted and rotated into the nut element 6500. The ratchet locking system thereby provides a spring like mechanism for the levers 6800 such that upon rotation of the fastener 6000 within the threaded region 6525 and the boss 6515 of the nut 6500, the nut will retain the fastener 6000, preventing reverse rotation of the fastener as the levers engage the notches 6015. When the fastener flange 6050 is in engagement with the composite panel 180, the fastener will retain the composite panel 180 relative to the steel wall 175.

FIGS. 70-74 illustrates spacer utilized with the ratchet nut 6500. The spacer 7000 is similar to the spacer discussed above with respect to the second embodiment of the fastener discussed herein, and thus includes a first flange 7015 and a second flange 7020, as well as a boss 7010. The boss 7010 includes an interior region 7050 which is sized to slip over the boss 6515 as illustrated in FIGS. 75 through 77.

Figure 75:
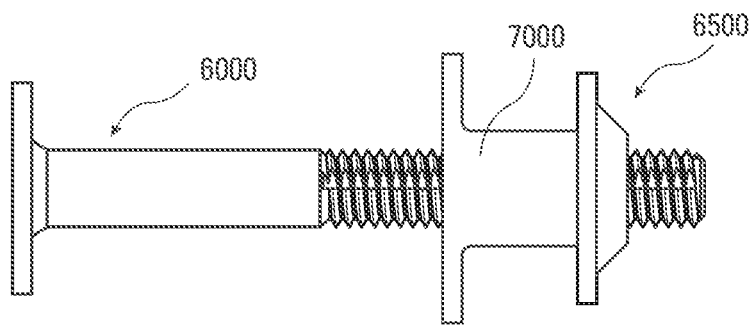
FIG. 75 is a first assembly view of a fastening system using the elements of FIGS. 61-74.
Figure 76:
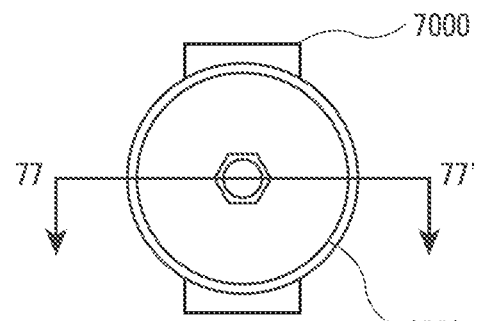
FIG. 76 is a second assembled view of a fastening system of FIG. 75.
Figure 77:
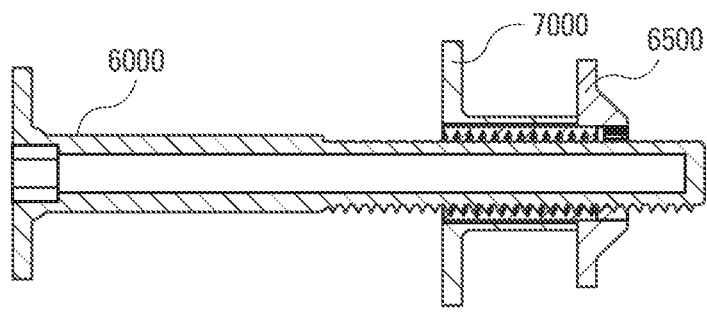
FIG. 77 is a cross-sectional view along line 77-77' of FIG. 76.
Figure 78:
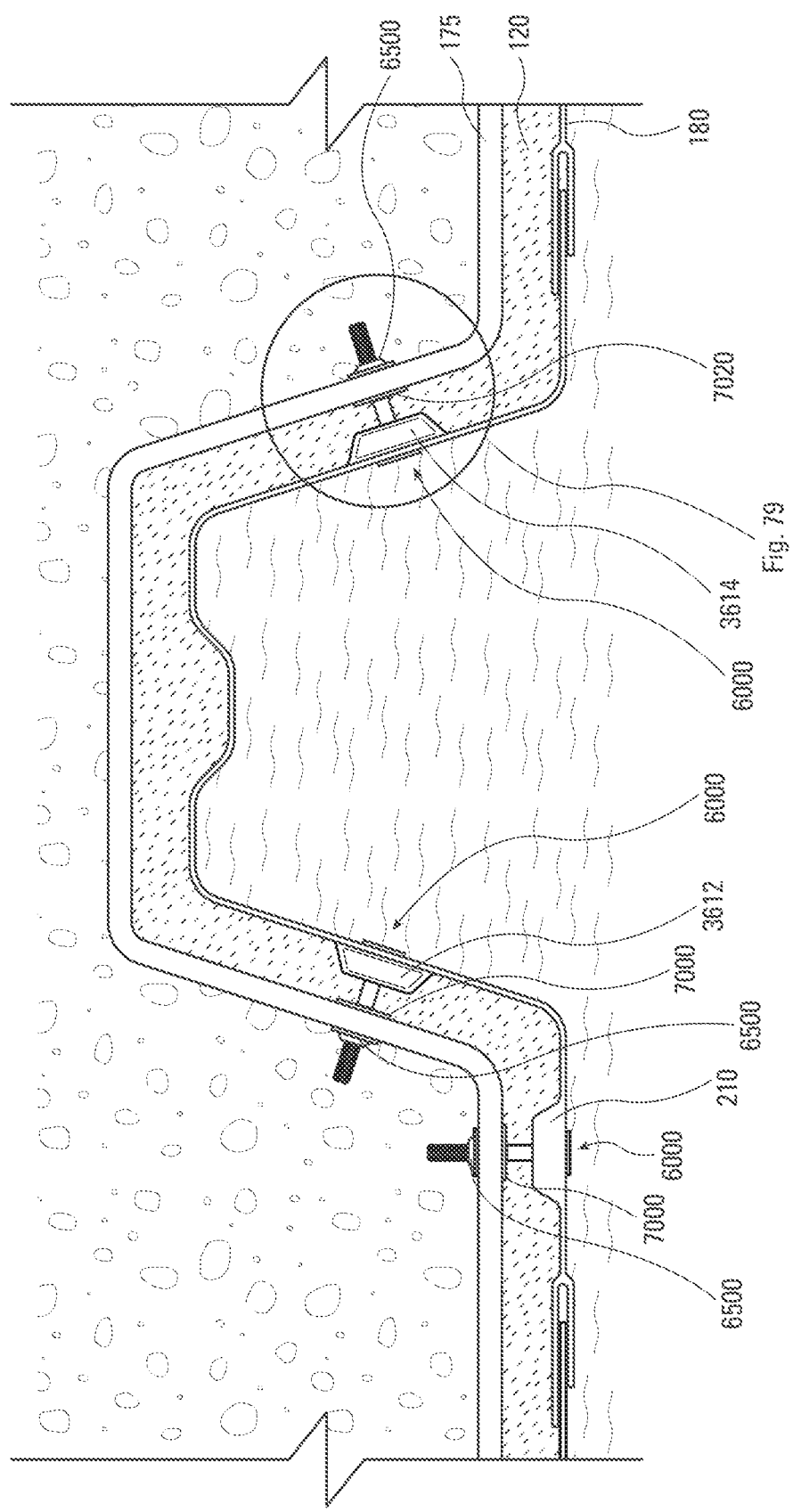
FIG. 78 is a top view of the fastener assembly of FIG. 75 installed in a marine environment.
Figure 79:
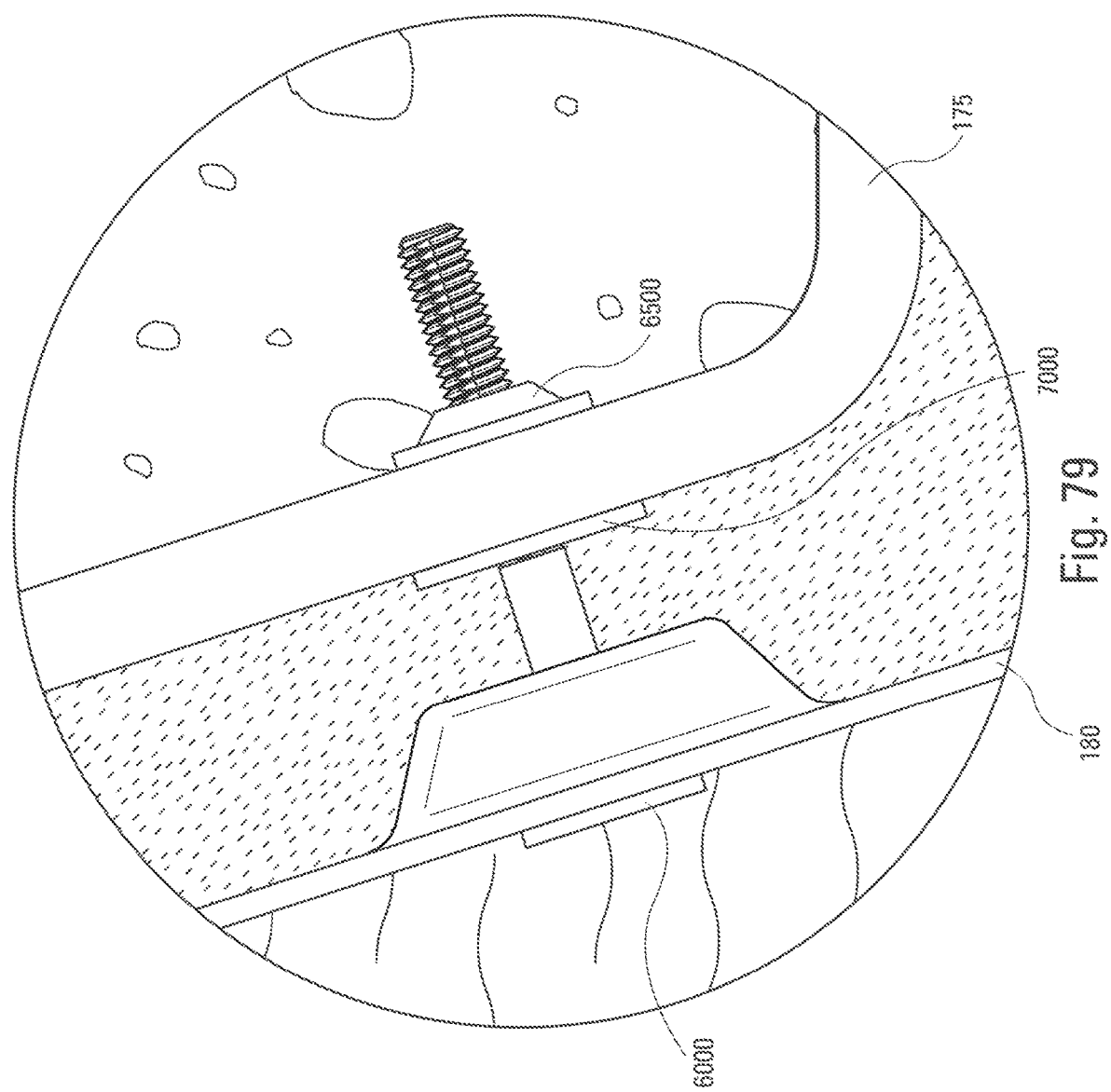
FIG. 79 is an enlarged view of a portion of FIG. 78.
Figure 80:
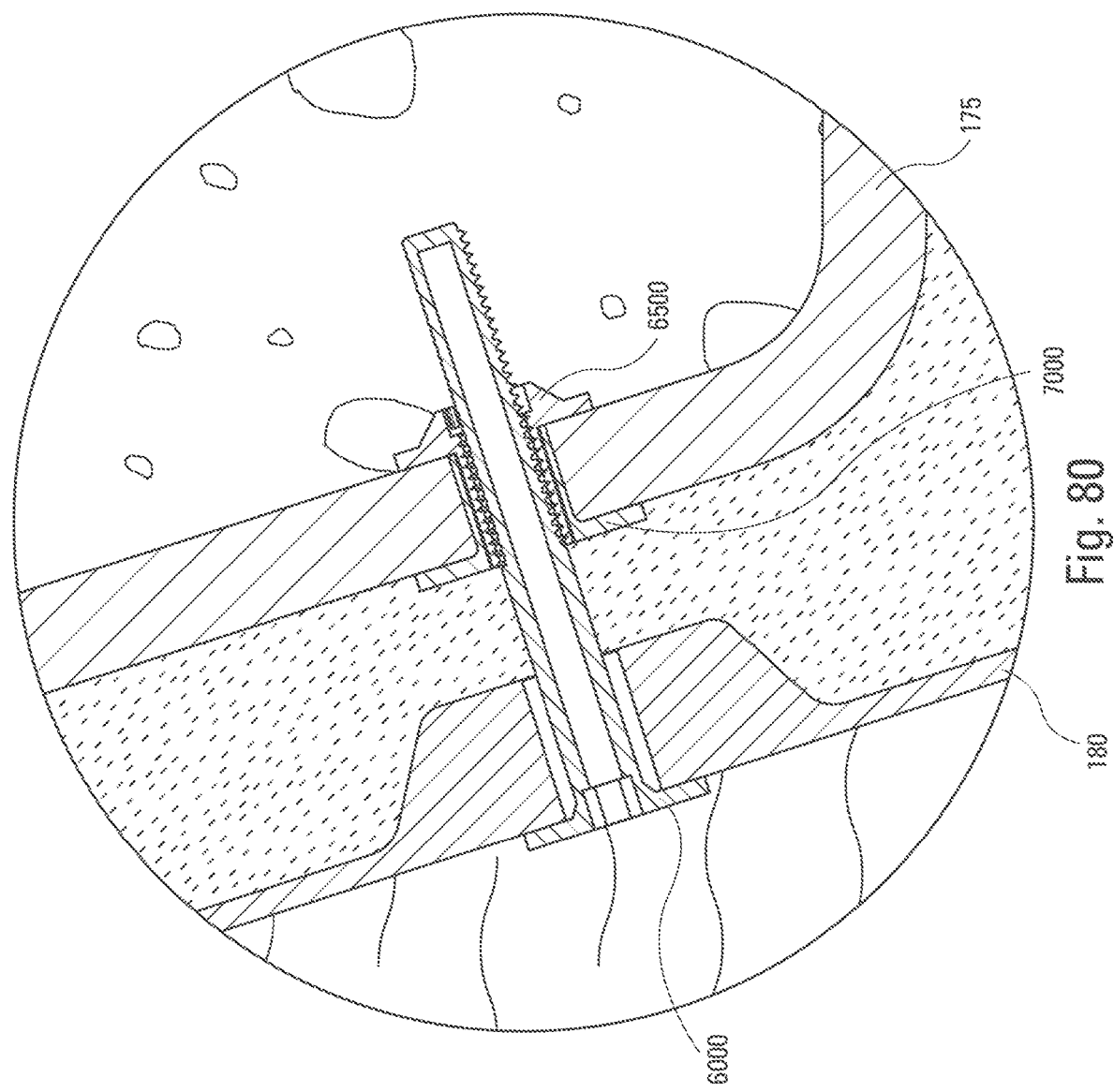
FIG. 80 is a cross-sectional view of the enlarged assembly view of FIG. 75.

FIGS. 75 to 77 illustrated an assembly of the fastener 6000, spacer 7000, and that element 6500. FIGS. 78 through 80 illustrate the fastener 6000, spacer 7000, and nut element 6500 when installed in a seawall system in accordance with the present technology. As shown therein, the nut element 6500 may be positioned on the earthen side of the steel wall 175 with the spacer element 7000 slid there over from an opposing side of the steel wall in a bore in the in a manner similar to that of the assembly of fastener 500. This holds the nut element 6500 in place during installation of the composite panel 180. The bores in the steel wall 175 are aligned with corresponding bores in the composite panel (for example in the mounting bosses) and the fastener 6000 passed through the bore in the composite panel and into the spacer 7000 and nut element 6500. Fastener 6000 is screwed into the nut element 6500, and epoxy is inserted into the interior channel 6050 of the fasteners 6000 to allow the epoxy to exit on the earthen side of the wall 175. This secures the fastening element in place, after which the cementitious grout or epoxy 120 can be provided in the space between the steel wall and the panel. This is illustrated in FIG. 80.

Figure 81:
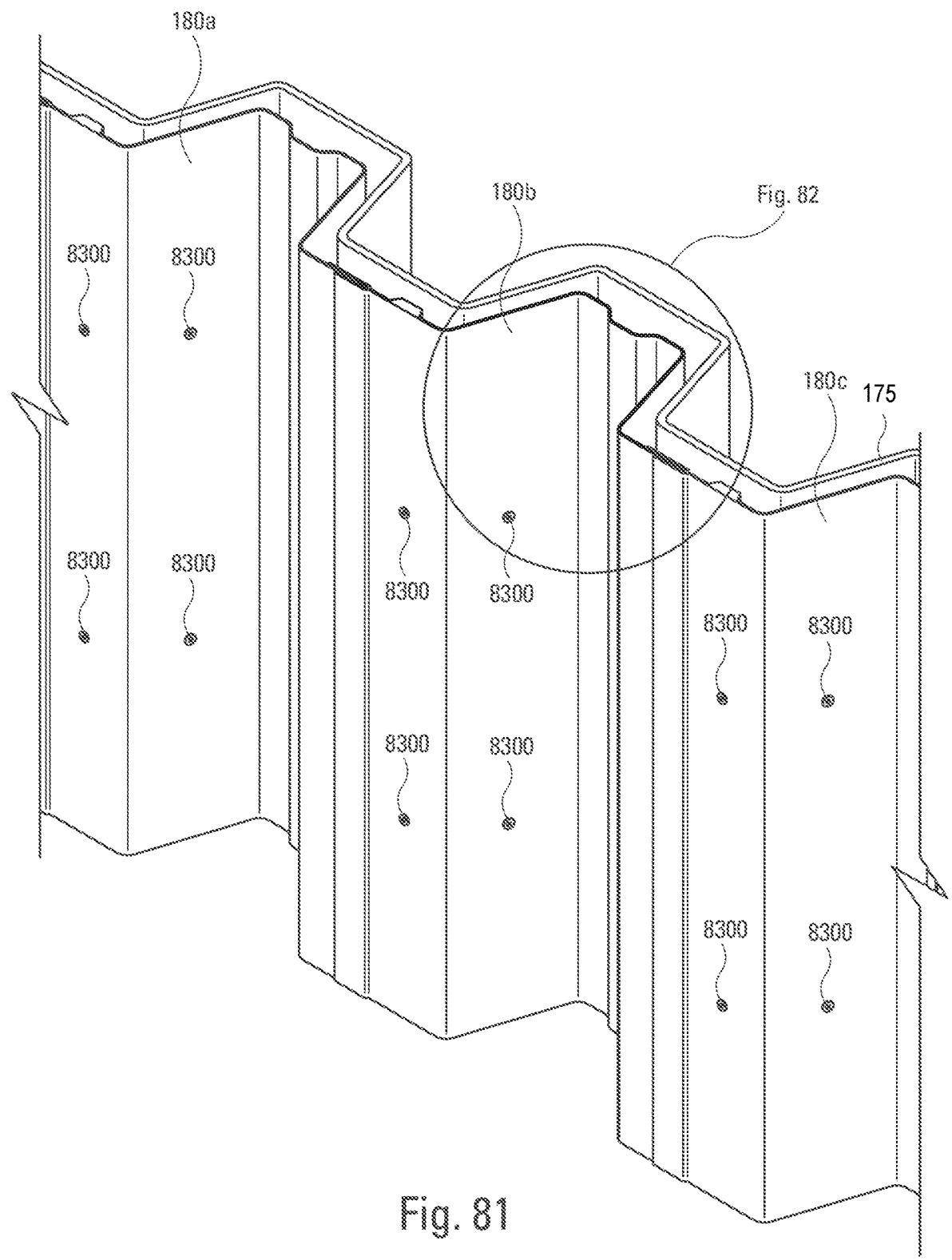
FIG. 81 is a perspective view of another seawall assembly.
Figure 82:
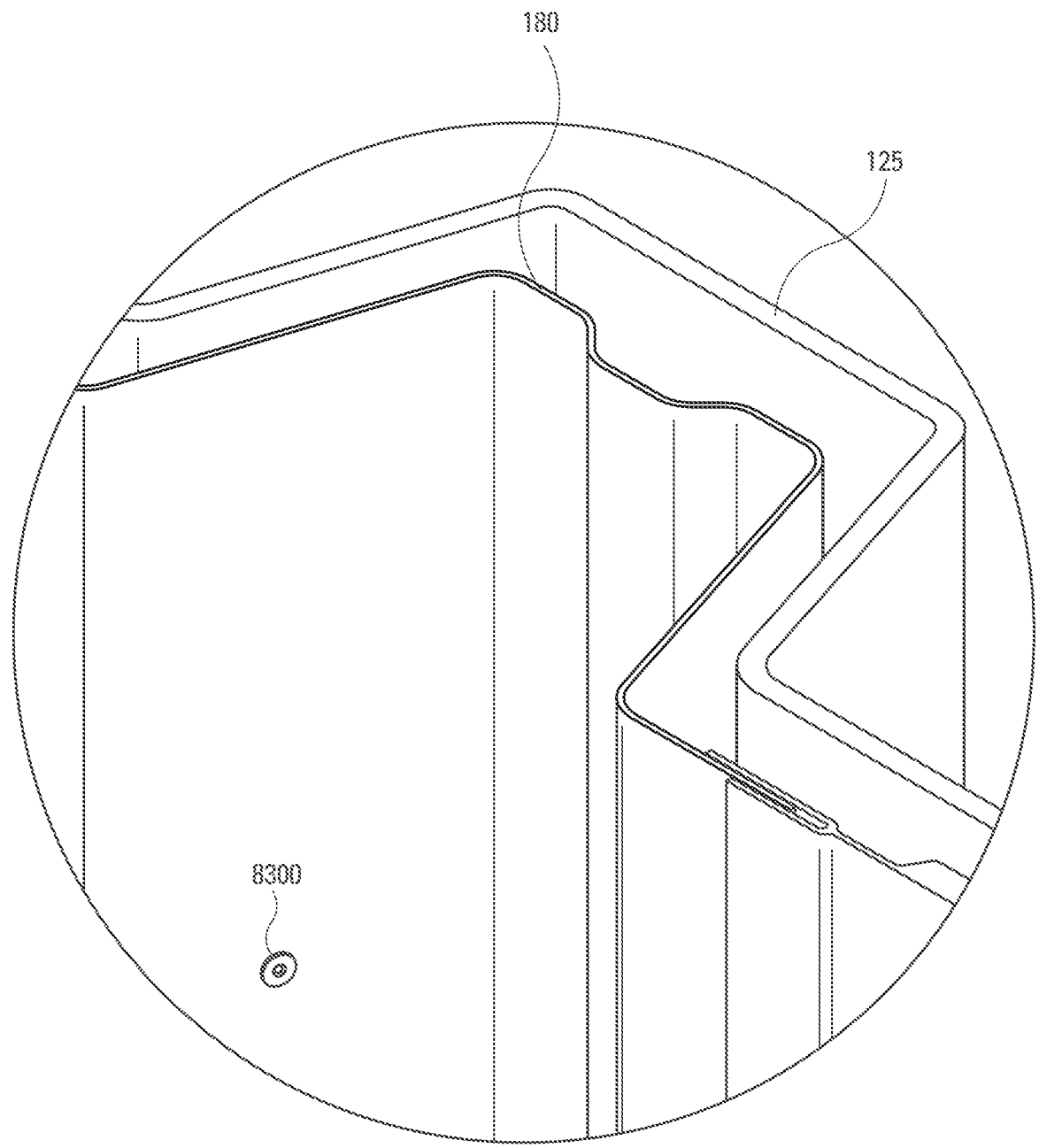
FIG. 82 is an enlarged perspective view of a portion of FIG. 81.
Figure 83:
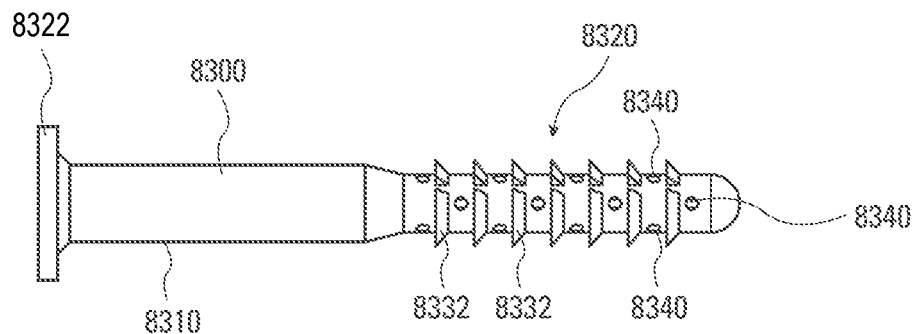
FIG. 83 is a plan view of another fastener in accordance with the present technology.
Figure 84:
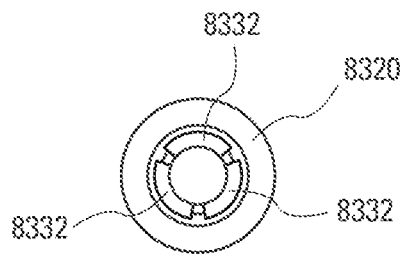
FIG. 84 is a bottom plan view of the fastener of FIG. 83.
Figure 85:
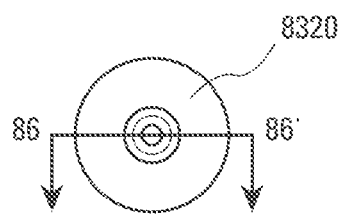
FIG. 85 is a top plan view of the fastener of FIG. 83.
Figure 86:
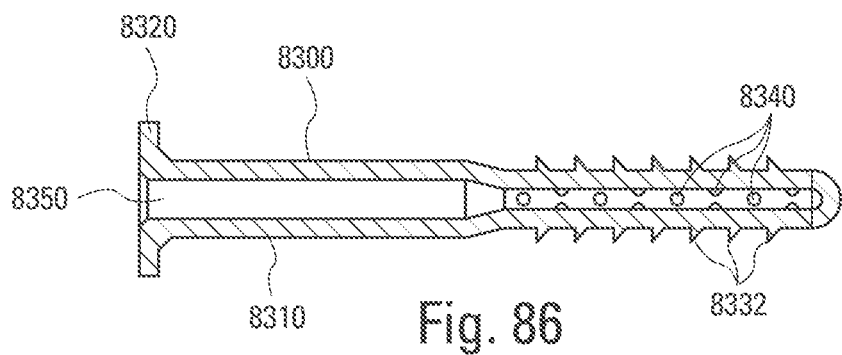
FIG. 86 is a cross-sectional view along line 86-86' of FIG. 85.

FIGS. 81 through 89 illustrate another embodiment of a fastening system for use in accordance with the present technology. FIGS. 81 and 82 are perspective views of the fastening system utilizing the steel wall 175 and the composite panel 180, formed of multiple composite panels 180a-c. FIG. 82 is an enlarged view of the portion of FIG. 81 indicated therein. As shown therein, a fastener 8300 is positioned in the wall and a similar position to that of the fastener 6000 of the previous embodiment.

Figure 87:
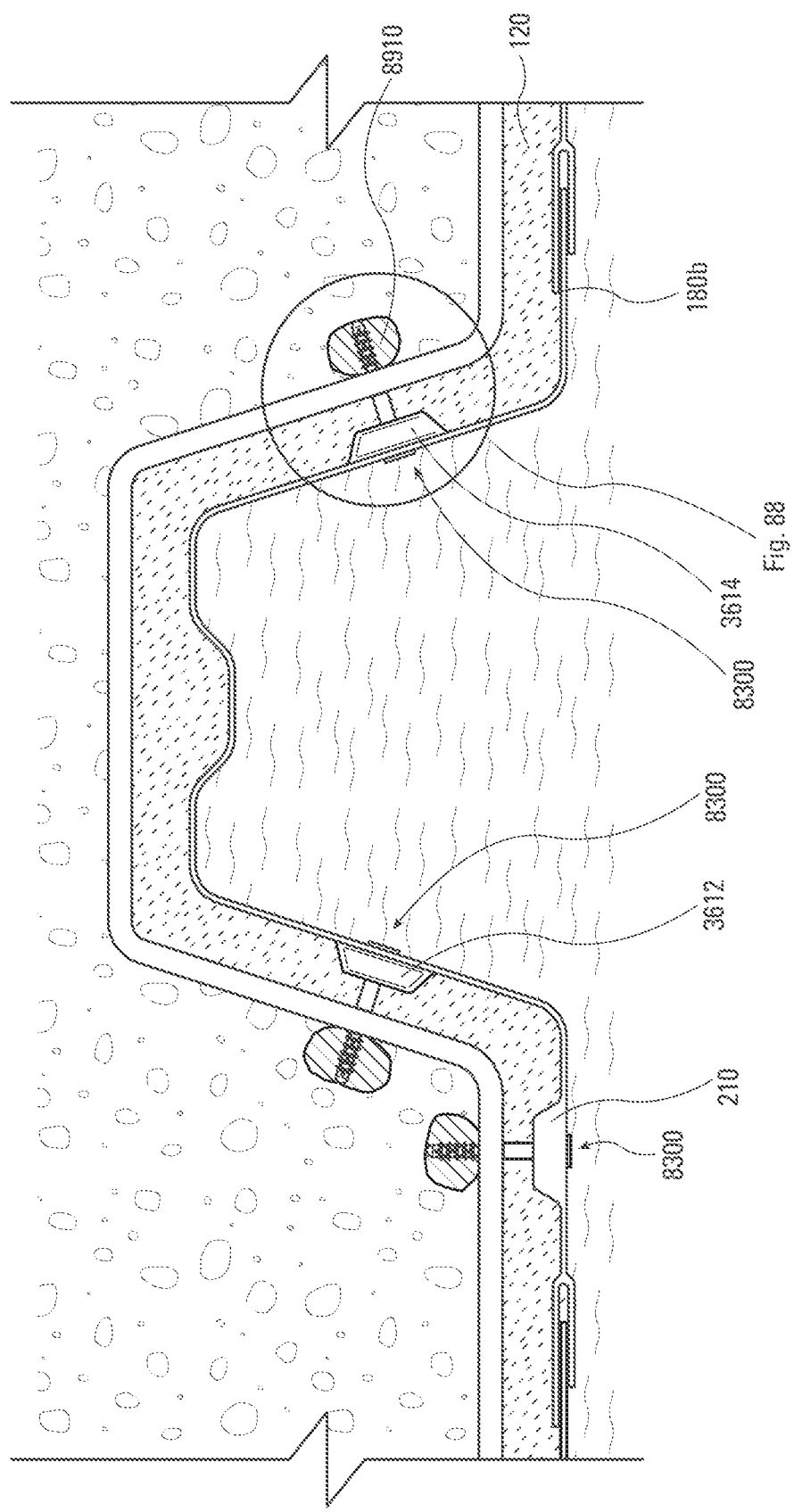
FIG. 87 is a top view of the fastener assembly of FIG. 84 installed in a marine environment.
Figure 88:
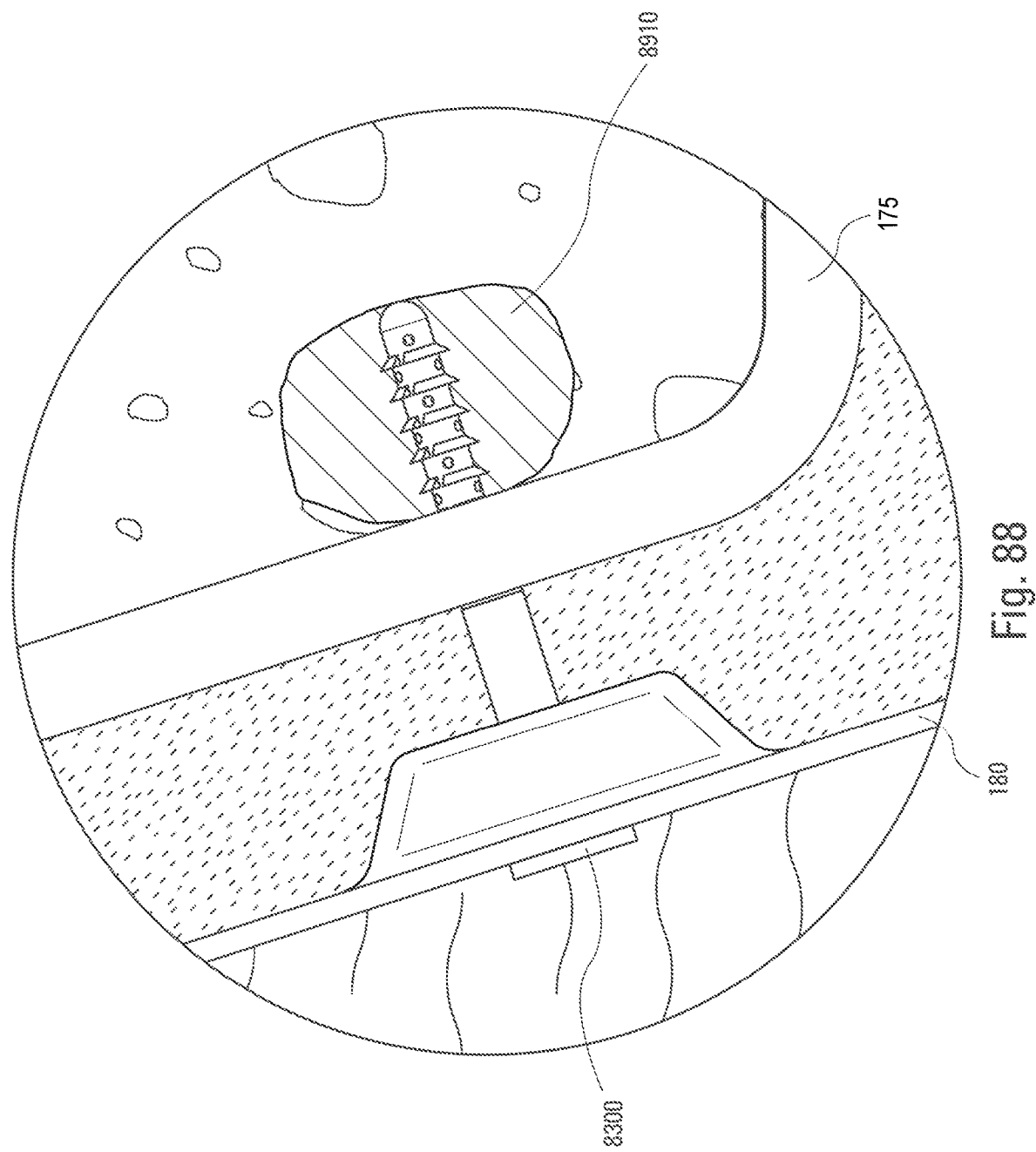
FIG. 88 is an enlarged view of a portion of FIG. 87.
Figure 89:
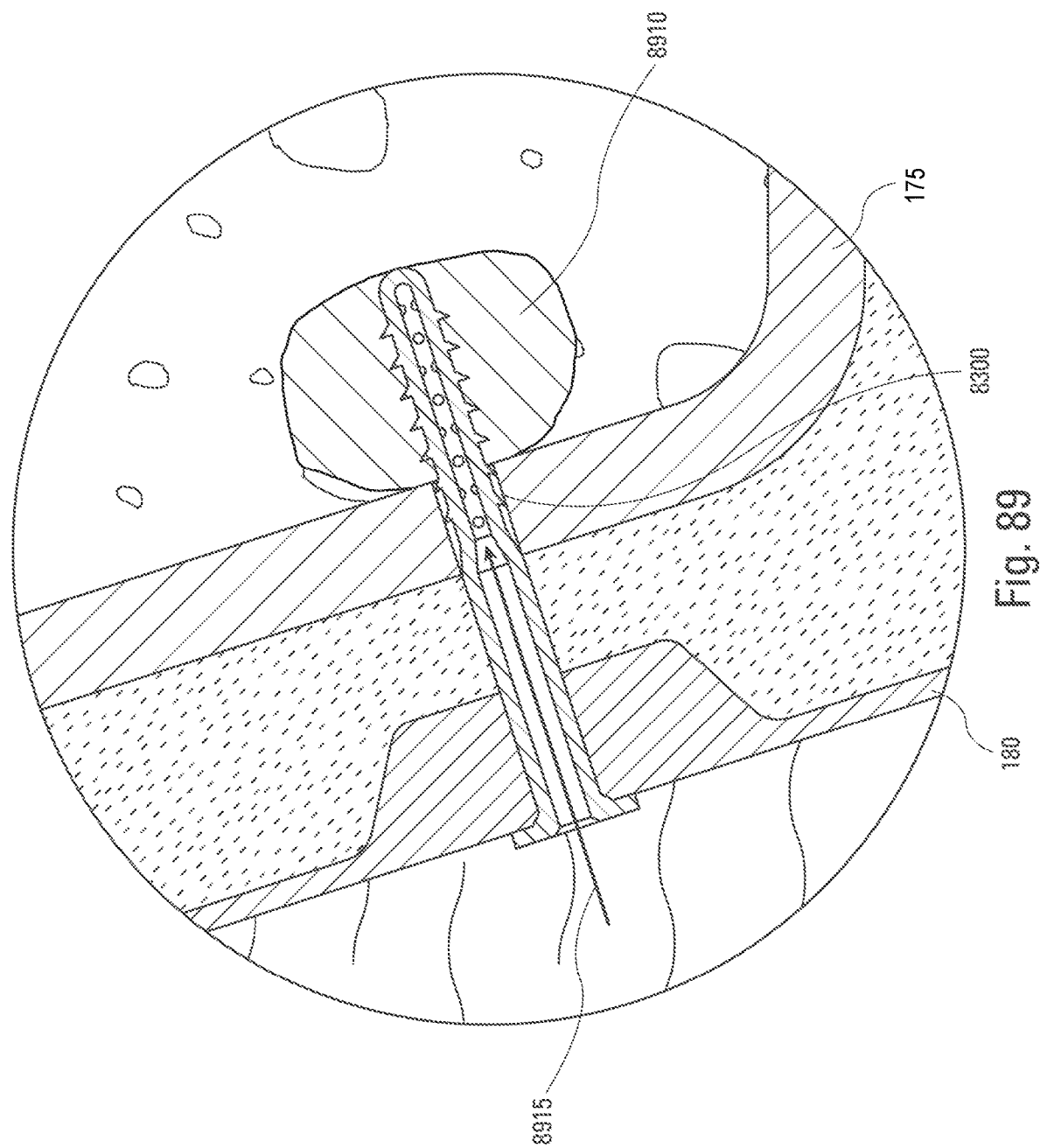
FIG. 89 is a cross-sectional view of the enlarged assembly view of FIG. 88.

The fastener 8300 in accordance with the present embodiment is illustrated in FIGS. 83 through 86. The fastener in this "peg" embodiment is utilized without a nut element. The fastener 8300 includes an unthreaded region 8310 and a notched region 8320. The notch region 8320 includes a plurality of angled fins 8332, only some of which are numbered in the FIGS. so as not to unduly obscure the drawing detail. Also included is a plurality of holes 8340 formed in the notched region 8320, which communicate with an interior chamber 8350 of the fastener 8300 illustrated in FIG. 86. The holes 8340, allow an epoxy to exit the peg fastener 8300 when the peg fastener 8300 is embedded into the earthen material behind the steel wall 175. Fastener 8300 includes a head 8322, which comprises a flange having a larger diameter than the non-threaded region. As illustrated in FIGS. 87 through 89, the peg fastener 8300 is supplied through the bores in the composite panel (for example in the mounting bosses of the composite panel) and through a corresponding borehole in the steel wall 175. No separate nut element needs to be installed into the steel panel 175 prior to installation of the composite panel. During installation, bores may be drilled simultaneously through the mounting boss and the steel wall, and the composite peg inserted there through. After which, an epoxy is inserted into the interior channel 8350 of the composite peg 8300 in the direction of arrow 8915, resulting in an epoxy earthen mixture 8910 on the earthen side of the steel wall 175. Subsequently, cementitious grout or epoxy 120 may be supplied in the gap 115 between the steel wall 175 and the composite panel 180.

Figure 90:
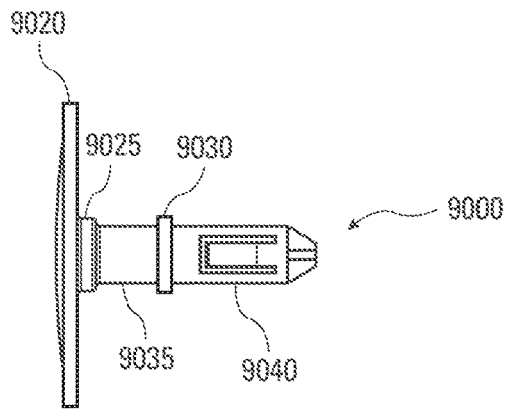
FIG. 90 is a first side view of another fastener in accordance with the present technology.
Figure 91:
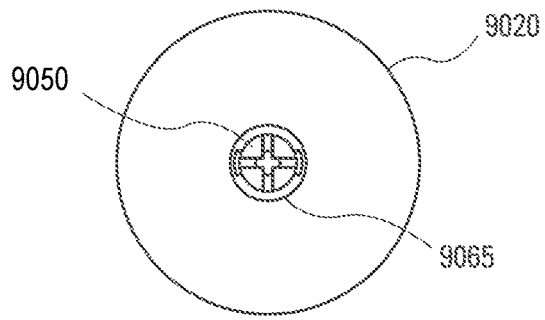
FIG. 91 is a top plan view of the fastener of FIG. 90.
Figure 92:
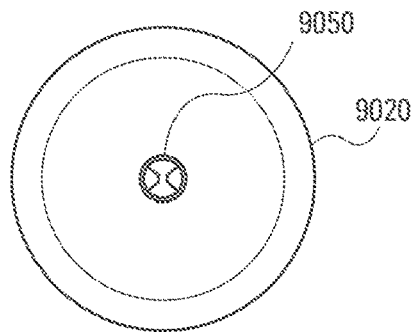
FIG. 92 is a bottom plan view of the fastener of FIG. 91.
Figure 93:
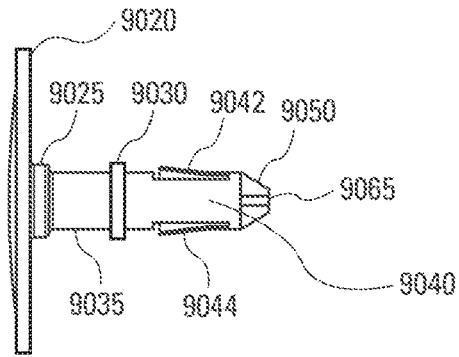
FIG. 93 is a second side view of the fastener of FIG. 90.
Figure 94:
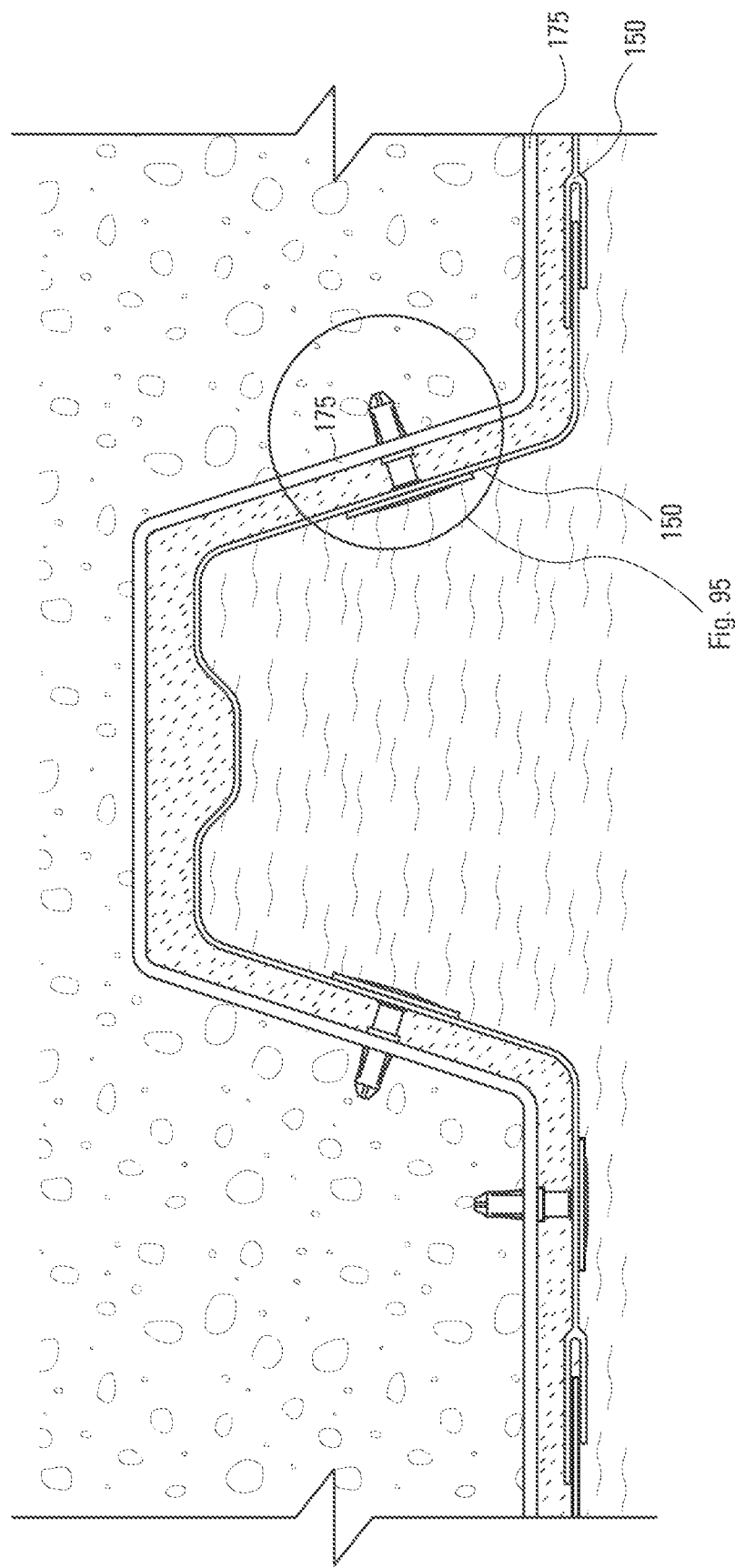
FIG. 94 is a top view of the fastener assembly of FIG. 90 installed in a marine environment.
Figure 95:
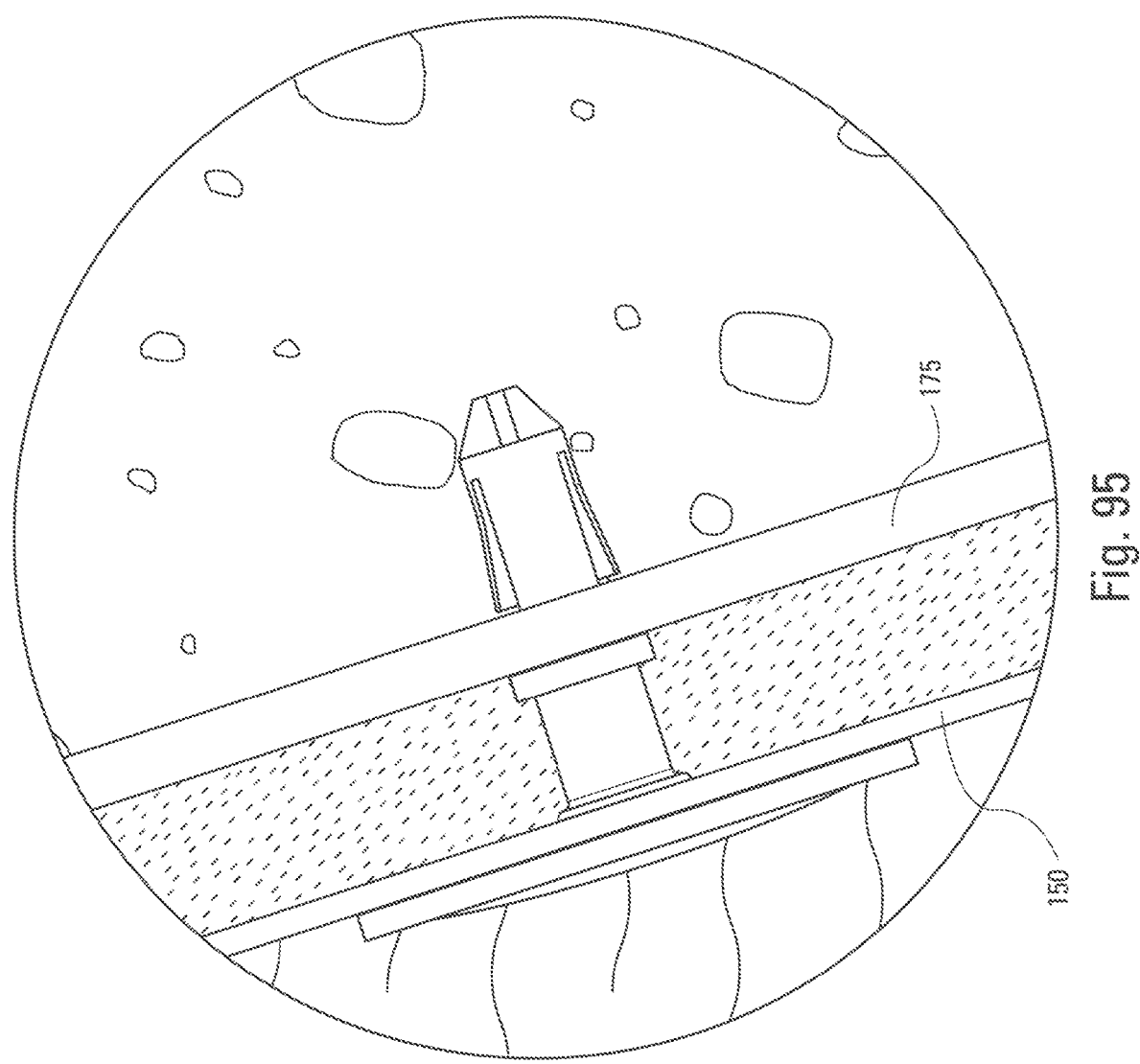
FIG. 95 is an enlarged view of a portion of FIG. 94.

FIGS. 90 through 95 illustrate another embodiment of a fastening system for use in accordance with the present technology. FIGS. 90 and 94 are side views (FIG. 94 rotated 90 degrees on an axis in the plane of the page passing through the center of the peg). FIG. 91 is a top view of the peg fastener 9000 and FIG. 92 is a bottom view of the peg fastener 9000. FIGS. 94 and 95 are a top view and enlarged top view of the fastening system utilizing peg fastener 9000 in conjunction the steel wall 175 and the composite panel 150, formed of multiple composite panels 150a-c. It is noted that in this embodiment, the composite panels 150 without mounting bosses may be used. FIG. 95 is an enlarged view of the portion of FIG. 94 indicated therein. As shown therein, a peg fastener 9000 is positioned in the composite and steel walls in a manner similar to that of the fastener 8300 of the previous embodiment. However, no epoxy need be used to secure the peg fastener 9000.

The peg fastener 9000 in accordance with the present embodiment of FIGS. 90 through 95 is a "peg" embodiment is utilized without a nut element. The peg fastener 9000 includes a head 9020 formed integrally with a shank comprising a first region 9035 and a second region 9040. A shoulder 9025 is provide between the first region 9035 and the head 9020. The shoulder 9025 can be utilized to center the peg fastener 9000 in a hole in the composite panel(s) 150. First region 9035 is separated from the second region 9040 by a retaining collar 9030. The collar 9030 abuts the steel panel during installation of the peg fastener 9000. Second region 9040 includes two flexible lever arms 9042 and 9044 which are biased outwardly from the second region 9040 and extend away from a surface of the second region 9040. Second region 9040 includes an end 9065 formed by conical walls 9050 Regions 9035 and 9040 have the same diameter but in an alternative embodiment may have different diameters.

As illustrated in FIGS. 94 and 95, the peg fastener 9000 is supplied through the bores in the composite panel (for example in the mounting bosses of the composite panel) and through a corresponding borehole in the steel wall 175. No separate nut element needs to be installed into the steel panel 175 prior to installation of the composite panel. During installation, bores may be drilled simultaneously through the mounting boss and the steel wall, and the composite peg inserted there through. The nominal diameter of the holes in the composite panel 150 and the steel wall 175 are 1 in. and 0.75 in., respectively. The arms 9042 and 9044 protrude from the shank and flex inward as the peg fastener 9000 is pressed through the steel wall 175. Once the arms pass through the steel wall hole, they relax and engage behind the steel wall for a permanent hold. Subsequently, cementitious grout or epoxy 120 may be supplied in the gap 115 between the steel wall 175 and the composite panel 150.

For the embodiment of FIGS. 90-95, several finite element analyses (FEA) were conducted to assess the mechanics of the basic design features and to estimate and load capacities that could be expected when the seawall peg is loaded by shear or tension. The initial FEA results reflect multiple design iterations with boundary conditions that do not always accurately reflect a live loading situation. After actual lab testing was conducted with prototype parts, the boundary conditions were adjusted and the model failure criteria was calibrated to be more a more accurate predictor.

Tension FEA analyses were conducted with the fastener 9000 installed in the steel wall 175 and the composite panel 150 pulling away from the steel wall 175. This created a pull-out scenario for the fastener 9000 and can be considered to simulate the hydrostatic pressure applied during the grout installation. These analyses show that at the time of failure, the greatest stress is in the shank immediately above the arms 9042 and 9044. This is the section of the shank with smallest net area and geometry that introduces points of stress concentration.

Shear FEA analyses were also conducted to mimic the weight of the composite panels 150 resting on the fastener 9000, thus loading fasteners in shear. The FEA deformations reveal that the peg can rotate and bend in the shank when loaded in shear. The shank bearing in the steel wall 175 between the retaining collar 9030 and the arms 9042, 9044 is subject to the greatest deformation and is highly stressed.

TABLE 1

FEA Simulation Results for Six Fastener 9000 Design Prototypes
FEA Simulations for Composite Peg

| FEA Analysis | Failure Mode | Peak Load (lbs) | Calibrated Model |
|---|---|---|---|
| 1 | Tensile break in shank wall | 1431 | No |
| 2 | Shear break in shank wall | 837 | No |
| 3 | Shear break in shank wall | 881 | No |
| 4 | Tensile break in shank wall | 1441 | No |
| 5 | Tensile break in shank wall | 922 | Yes |
| 6 | Tensile break in shank wall | 891 | Yes |

Initial FEA simulations were based on the nominal material specifications for mechanical and elastic properties as provided by the material data sheets. The FEA analyses yielded results that were greater than the actual load values.

Tensile pull out tests were also conducted. Specimens were loaded onto test plates with the arms 9042 and 9044 of the fastener 9000 engaged in a steel plate, while the head 9020 was supported in bearing on another steel surface. A load was applied at a displacement rate of 0.1 in./min. Table 2 shows the load results.

Three tensile specimens were tested, and the load range was 655±5 lb. The load-deflection behavior is illustrated in Table 2. The pegs exhibited linear load-deflection behavior, and failure was in the shank in the section above the snap arms and below the retaining collar.

TABLE 2

Tensile Test Results
Tensile Test Summary

| Test | Failure Mode | Peak Load (lbs) | Time to Load |
|---|---|---|---|
| 1 | Tensile Failure | 658 | 1.72 |
| 2 | Tensile Failure | 649 | 1.45 |
| 3 | Tensile Failure | 658 | 1.59 |

Specimens were tested in shear to ensure the fastener 9000 could support the load of the composite panel 150 hanging on them prior to the grout installation. The purpose of this test was to determine the shear strength of the fastener as installed while not assessing the strength of the back-filled assembly with the composite panel. In this setup, the peg was installed in a steel surface, and the composite panel was simulated by a steel surface as well. A wood block was used to simulate the spacing function of the grout and a low-friction slip sheet was placed between the steel and the wood (grout) layer. The wood block (grout layer) was supported on the fixture base so that it could not slip relative to the steel face of the sheet pile. In this setup, the shank was subjected to shear under the head and at the sheet pile because the hole was oversize in the wood (grout) layer. Load was applied at a displacement rate of 0.1 in./min.

Table 3 shows the shear load values and the load-deflection behavior. Typical failures were in the shank of the peg in the section above the snap arms and below the retaining ring, which is the section bearing in the steel sheet pile. This was shown to be the potential failure zone in the FIGS. 5 and 6 from the FEA work. The head-to-shank region was not the initial failure and was compromised only after gross displacement.

TABLE 3

Shear Test Results
Shear Test Summary

| Test | Failure Mode | Peak Load (lbs) | Time to Load |
|---|---|---|---|
| 1 | Shear Failure | 888 | 7.06 |
| 2 | Shear Failure | 491 | 4.41 |
| 3 | Shear Failure | 743 | 3.93 |

A seawall protection system includes an FRP jacket, grout, and a fastener that is referred to as a "fastener." Jacket and sheet pile holes are optimally aligned to facilitate installation and prevent fastener failure during grouting.

Figure 96:
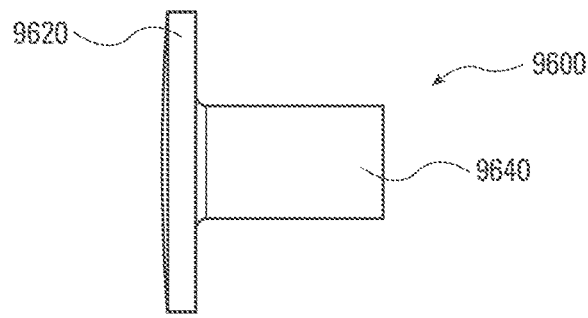
FIG. 96 is a first side view of another fastener in accordance with the present technology.
Figure 97:
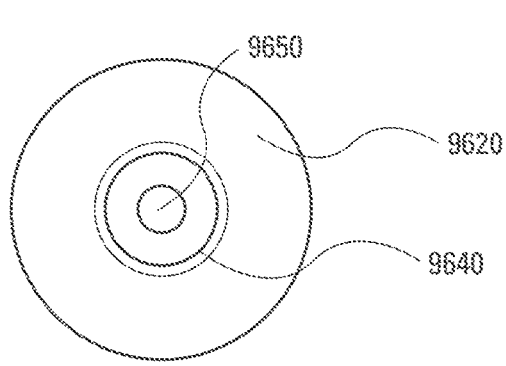
FIG. 97 is a top plan view of the fastener of FIG. 96.
Figure 98:
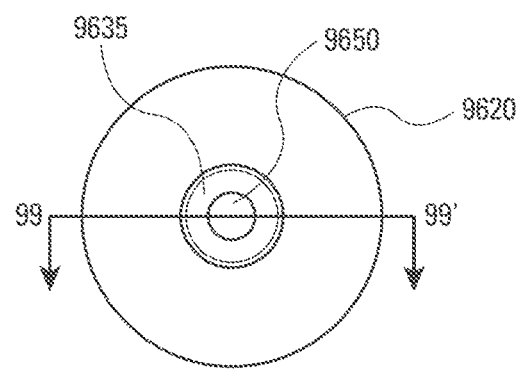
FIG. 98 is a bottom plan view of the fastener of FIG. 96.
Figure 99:
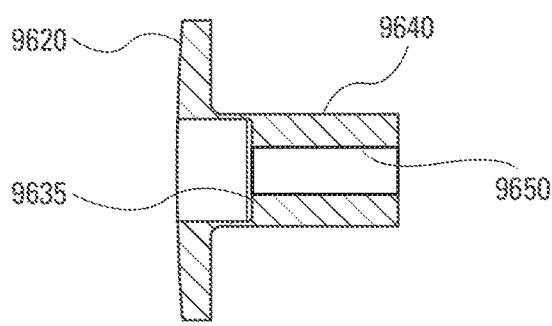
FIG. 99 is a cross-sectional view along line 99-99' of FIG. 85.
Figure 100:
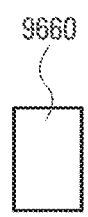
FIG. 100 is a side view of a cap used with the fastener of FIG. 96.
Figure 101:
FIG. 101 is a bottom view of a cap used with the fastener of FIG. 96.
Figure 102:
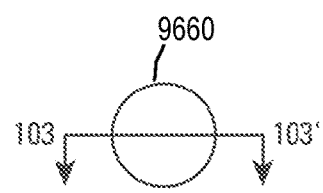
FIG. 102 is a top view of a cap used with the fastener of FIG. 96.
Figure 103:
FIG. 103 is a cross-sectional view along line 103-103' of FIG. 85.
Figure 104:
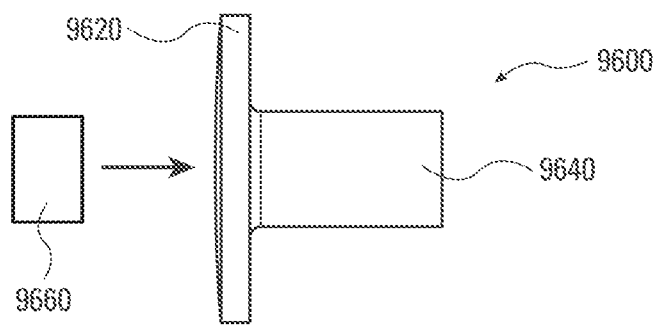
FIG. 104 is a side view of the fastener and plug illustrating placement of the plug in the fastener.
Figure 105:
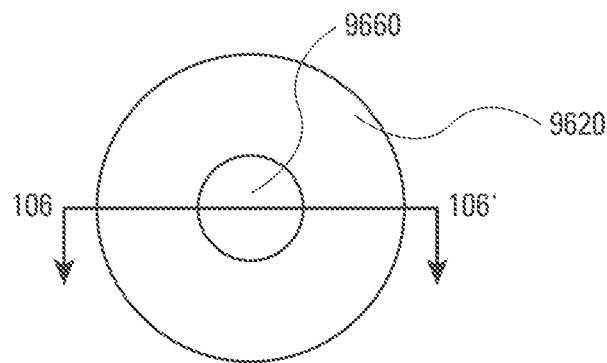
FIG. 105 is a top view of the fastener with the plug installed therein.
Figure 106:
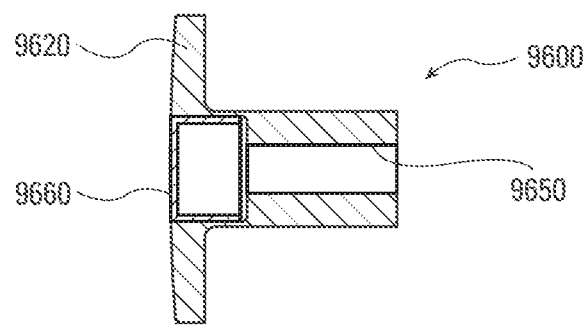
FIG. 106 is a cross-sectional view along line 106-106' in FIG. 105.
Figure 107:
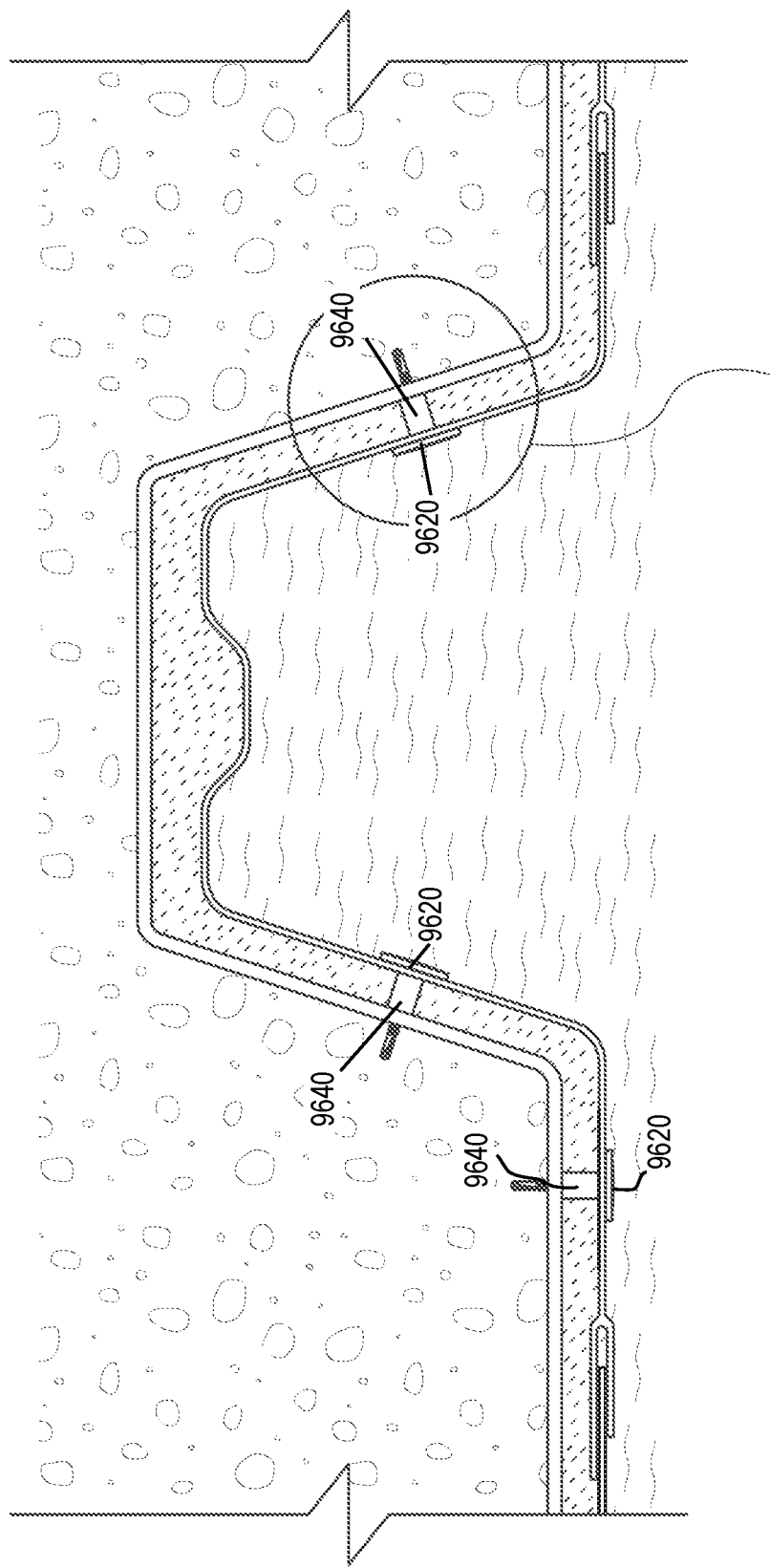
FIG. 107 is a tope view of the installed fastening system using the fastener of FIG. 96.
Figure 108:
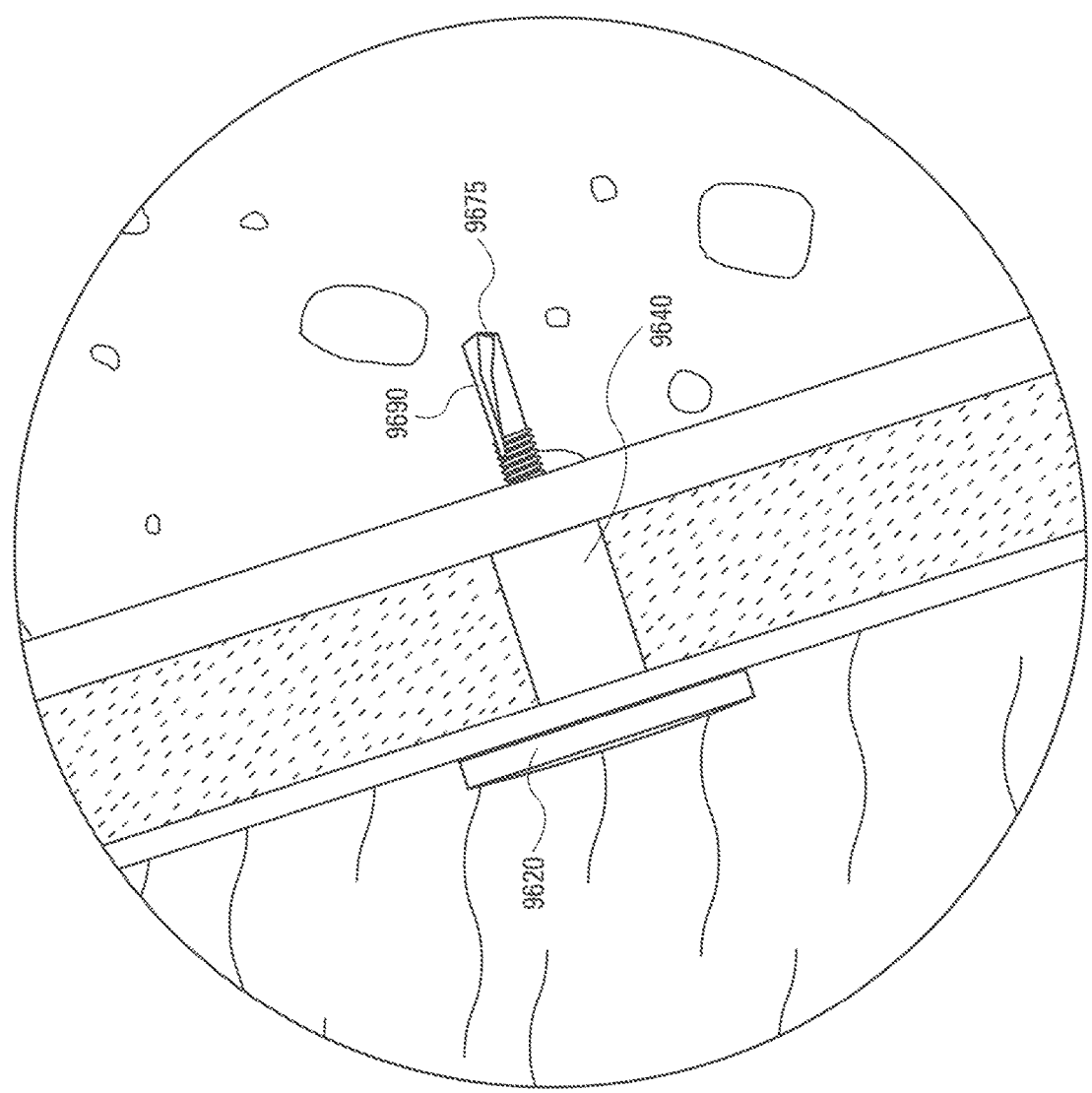
FIG. 108 is a partial, enlarged view of FIG. 107.

FIGS. 96-106 illustrate another embodiment of a fastener suitable for use with the present technology. In the embodiment of FIGS. 96-106, a steel tapping fastener or screw 9675 is used to hold the composite fastening element 9600 and the composite panel 150 in place. FIG. 96 is a side view of the fastening element 9600. FIGS. 97 and 98 are bottom and top views of the fastening element 9600. FIG. 99 is a cross-sectional view along line 99-99' in FIG. 98. FIGS. 100-101 are a side and bottom view, respectively, of an element plug 9660. FIG. 102 is a top view of the element plug 9660, and FIG. 103 is a cross-sectional view along line 103-103 in FIG. 102. FIG. 104 is a side view of the element 9600 and the plug 9660 illustrating placement of the plug in the element 9600. FIG. 105 is a top view of the element 9600 with plug 9660 installed therein. FIG. 106 is a cross-sectional view along line 106-106' in FIG. 105. FIGS. 107 and 108 are a top view and enlarged top view of the fastening system utilizing peg 9600 in conjunction the steel wall 175 and the composite panel 150, formed of multiple composite panels 150a-c. It is noted that in this embodiment, the composite panels 150 without mounting bosses may be used. FIG. 108 is an enlarged view of the portion of FIG. 107 indicated therein. As shown therein, a fastener 9600 is positioned in the composite and steel walls similar to the manner used in previous embodiments. However, the securing mechanism is screw 9675.

The fastener 9600 includes a head 9620 formed integrally with a shank 9640. The head 9620 includes a recess 9635 having a first diameter and which is adapted to receive a plug 9660. The recess 9635 is connected to a through-bore 9650.

Figure 109:
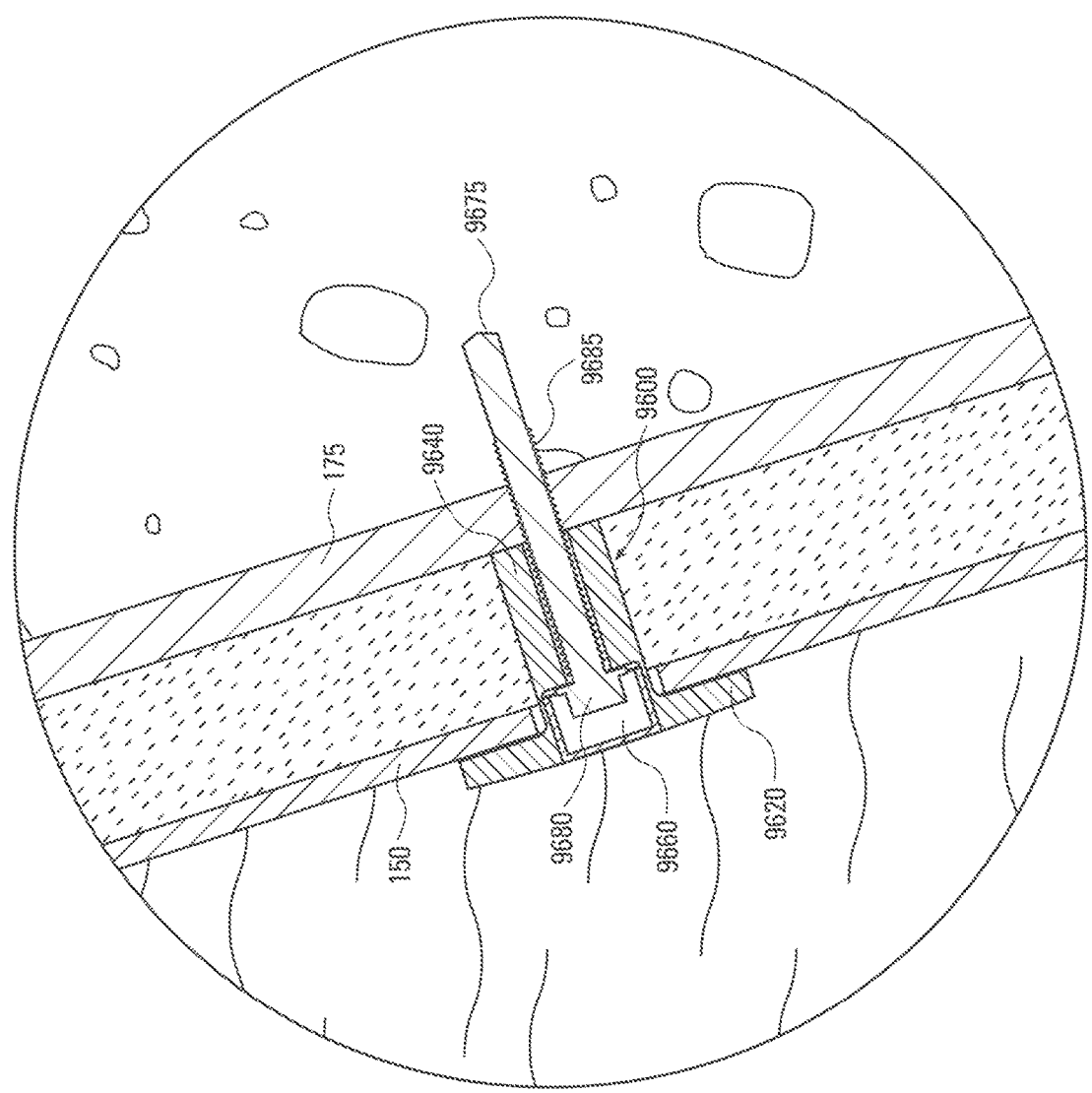
FIG. 109 is a partial, enlarged view of FIG. 107.

During assembly, the fastening element 9600 may be inserted in a pre-drilled hole in the composite panels 150 and the screw 9675 inserted into bore 9650 and recess 9635. As illustrated in FIGS. 108 and 109, a shank 9685 of the screw 9675 passes through the bore 9650 and a head 9680 of the screw 9675 abuts a base portion of the recess 9635 to secure the fastening element 9600 such that the head 9620 of the fastening element 9600 abuts the outer surface of the composite panel. Once the screw and element 9600 are in place as illustrated in FIG. 109, the plug 9660 is inserted into the recess 9635. The screw 9675 includes a self-drilling tip 9690 allowing the screw to self-tap a bore into the steel panel 175. Optionally, an underwater epoxy such as model FX-764 underwater paste available from Simpson Strong-Tie may be used to seal the screw in the recess 9635 prior to inserting the plug 9660. The recess is counter sunk and has a minimum ¹¹⁄₁₆" diameter by ½-inch depth to fully accept the screw and allow sealing with the underwater paste for corrosion protection. The bore 9650 may be a constant three-quarter inch diameter, and the head 9620 may have a diameter of two inches. The length of the shaft 9640 is approximately 1.25 inches.

The subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A marine environment wall protection system, comprising:
   a composite panel having a similar shape to a steel wall to which the composite panel is configured to be attached;
   a sealant material positioned between the composite panel and the steel wall; and
   at least one non-metal fastener having a shaft integrally formed with a head on one end of the shaft, the head and shaft integrally formed from a plastic material, the shaft having an opposing end, the head adapted to be disposed on one side of the composite panel, the opposing end of the shaft adapted to pass through a bore in the composite panel, the at least one non-metal fastener including
   an abutment portion integrally formed on the shaft between the opposing end and the head and adapted to engage a first side of the steel wall to provide a space between the composite panel and the steel wall, the at least one non-metal fastener having a first portion of the shaft and a second portion of the shaft, the first portion separated from the second portion by the abutment portion comprising a retaining collar; and
   a plurality of flexible lever arms integrally formed in the shaft, each arm having a first end attached in the shaft adjacent to the opposing end of the shaft, and each arm having to a second, free end, each lever arm connected to the shaft only at the first end and protruding from the shaft and biased outward from the shaft, the second free end adapted to flex inward to allow the shaft to pass through a bore in the steel wall, the second, free end relaxing after passing through the bore such that the second free end engages a second side of the steel wall, the shaft including a cylindrical portion between each second free end and the abutment portion.

2. The system of claim 1 wherein the at least one non-metal fastener is formed from one of liquid-crystal polymers, glass filled nylon, polysulfone (PSU), polyethersulfone (PES) or polyether ether ketone (PEEK) thermoplastic polymer.

3. The system of claim 1 wherein the at least one non-metal fastener has the shaft is configured to secure the composite panel to the steel wall during installation of the sealant material between the steel wall and the composite panel.

4. The system of claim 1 wherein the composite panel is comprised of a plurality of interlocking composite panel assemblies.

5. The system of claim 4 wherein each composite panel assembly has a first edge forming a tongue and a second edge forming a groove, each assembly connecting to an adjacent assembly by insertion of a respective tongue of one assembly into a groove of an adjacent panel.

6. The system of claim 1 wherein the sealant material is a cementitious grout or epoxy.

7. A fastener for a marine environment wall protection system, comprising:
   a head having a diameter; and
   a shaft integrally formed with the head at a first end of the shaft and with a diameter smaller than the diameter of the head, the head and shaft integrally formed from one of liquid-crystal polymers, glass filled nylon, polysulfone (PSU), polyethersulfone (PES) or polyether ether ketone (PEEK) thermoplastic polymer, the shaft having a second end opposing the first end, the head adapted to be disposed on one side of a composite panel, and the shaft including an integrally formed collar adapted to engage a first side of a steel wall and to provide a space between the composite panel and the steel wall,
   the fastener configured to secure the composite panel to the steel wall with a plurality of flexible lever arms integrally formed in the shaft between the second end and the collar, each lever arm having a first end coupled to the shaft adjacent to the second end of the shaft, and each lever arm having a second, free end and being connected to the shaft only by the lever arm the first end, each lever arm protruding from and biased away from the shaft, each second, free end adapted to flex toward the shaft to pass through a bore in the steel wall, and each second, free end adapted to relax after passing through the bore such that such free end engages a second side of the steel wall, the shaft including a cylindrical portion between each second free end and the collar.

8. The fastener of claim 7 wherein the fastener has a first portion of the shaft and a second portion of the shaft, the first portion separated from the second portion by the integrally formed collar.

9. The fastener of claim 7 wherein the head includes a bore passing therethrough, the bore adapted to receive a non-corroding screw.

10. The fastener of claim 9 wherein the head includes a recess connected to the bore, the recess receiving a cap covering the screw.

11. The fastener of claim 10 further including an underwater sealant provided in the recess and under the cap.

12. A marine environment wall protection system, comprising:
   a plurality of composite panels having a similar shape to a steel wall to which the composite panels are configured to be attached;
   a sealant material positioned between the composite panels and the steel wall; and
   a plurality of non-metal fasteners, each of the plurality of fasteners having a shaft having a first end and a second opposing end, the second end disposed through a bore in one of the plurality of composite panels and through a bore in the steel wall, each of the plurality of fasteners having a head adapted to be disposed on one side of the at least one of the plurality of composite panels, and the shaft including a collar integrally formed in the shaft adapted to engage a first side of the steel wall on an opposite side of the at least one of the plurality of composite panels, and a plurality of flexible lever arms integrally formed in the shaft, each arm having a first end attached in the shaft adjacent to the second opposing end of the shaft, and a second, free end and being connected to the shaft only by the first end of the lever arm and protruding above the shaft and biased outward from the shaft, the second, free end adapted to flex into the shaft to pass through the bore in the steel wall and relaxing to engage a second side of the steel wall after passing through the bore with a cylindrical portion between each second free end and the collar, each of the plurality of fasteners having the shaft integrally formed with the head, collar and plurality of arms.

\* \* \* \* \*

UNITED STATES PATENT AND TRADEMARK OFFICE
CERTIFICATE OF CORRECTION

| | | |
|---|---|---|
| PATENT NO. | : 12,163,301 B2 | Page 1 of 1 |
| APPLICATION NO. | : 15/922589 | |
| DATED | : December 10, 2024 | |
| INVENTOR(S) | : Leichti et al. | |

It is certified that error appears in the above-identified patent and that said Letters Patent is hereby corrected as shown below:

In the Claims

• Column 17, Line 46 (Claim 1): please replace "having to a" with --having a--

• Column 17, Line 61 (Claim 3): please replace "shaft is configured" with --shaft configured--

• Column 18, Line 29 (Claim 7): please replace "arm the" with --arm at the--

Signed and Sealed this
Fourth Day of February, 2025

Coke Morgan Stewart
*Acting Director of the United States Patent and Trademark Office*